United States Patent
Tatsumi et al.

(10) Patent No.: US 7,942,746 B2
(45) Date of Patent: May 17, 2011

(54) NETWORK GAME SYSTEM

(75) Inventors: Masaaki Tatsumi, Kyoto (JP); Seiki Ishihara, Kyoto (JP)

(73) Assignee: Nintendo Co. Ltd., Kyoto (JP)

( * ) Notice: Subject to any disclaimer, the term of this patent is extended or adjusted under 35 U.S.C. 154(b) by 986 days.

(21) Appl. No.: 11/783,161

(22) Filed: Apr. 6, 2007

(65) Prior Publication Data

US 2008/0220874 A1 Sep. 11, 2008

(30) Foreign Application Priority Data

Feb. 16, 2007 (JP) ................... 2007-037068

(51) Int. Cl.
*A63F 9/24* (2006.01)
(52) U.S. Cl. .................. 463/42; 463/9; 463/30; 463/33; 463/34; 463/40; 463/43; 709/201; 380/200; 380/201; 705/51; 705/64
(58) Field of Classification Search .................. 463/1–7, 463/30–34, 40–42, 9, 43; 709/201; 380/200, 380/201; 705/51, 64
See application file for complete search history.

(56) References Cited

U.S. PATENT DOCUMENTS

| | | | | |
|---|---|---|---|---|
| 6,482,092 | B1 * | 11/2002 | Tajiri et al. | 463/43 |
| 6,929,550 | B2 * | 8/2005 | Hisada | 463/42 |
| 2005/0202877 | A1 * | 9/2005 | Uhlir et al. | 463/43 |
| 2006/0287105 | A1 * | 12/2006 | Willis | 463/42 |
| 2007/0213975 | A1 * | 9/2007 | Shimoda et al. | 704/9 |
| 2008/0188309 | A1 * | 8/2008 | Moshal | 463/42 |
| 2009/0280894 | A1 * | 11/2009 | Kobayashi et al. | 463/30 |

* cited by examiner

*Primary Examiner* — Pierre Eddy Elisca
*Assistant Examiner* — Shahid Kamal
(74) *Attorney, Agent, or Firm* — Nixon & Vanderhye P.C.

(57) ABSTRACT

A distribution server distributes meteorological data to a first game apparatus. The first game apparatus obtains, from the distribution server, meteorological data corresponding to region data set by region data setting means and transmits the meteorological data to a second game apparatus. The first game apparatus executes an on-line game with the second game apparatus using the obtained meteorological data. The second game apparatus receives the meteorological data transmitted from the first game apparatus. Using the received meteorological data, the second game apparatus executes the on-line game with the first game apparatus.

29 Claims, 38 Drawing Sheets

| REGION CODE | | WEATHER CODE |
|---|---|---|
| COUNTRY CODE | DETAIL CODE | |
| 001 | 001 | 01 |
| 001 | 002 | 01 |
| ⋮ | ⋮ | ⋮ |
| 001 | 050 | 03 |
| 002 | 001 | 05 |
| ⋮ | ⋮ | ⋮ |

| 1741 | 1742 |
|---|---|
| COUNTRY CODE | COUNTRY NAME |
| 001 | U.S.A. |
| 002 | JAPAN |
| ⋮ | ⋮ |

| REGION CODE | | REGION NAME |
|---|---|---|
| COUNTRY CODE | DETAIL CODE | |
| 001 | 001 | WASHINGTON |
| 001 | 002 | CALIFORNIA |
| ⋮ | ⋮ | ⋮ |
| 001 | 050 | HAWAII |
| 002 | 001 | HOKKAIDO |
| ⋮ | ⋮ | ⋮ |

| 1761 | 1762 |
|---|---|
| WEATHER CODE | WEATHER INFORMATION |
| 001 | FINE |
| 002 | FINE, SOMETIMES CLOUDY |
| 003 | RAINING |
| ⋮ | ⋮ |

514

| | 5141 | 5142 | 5143 |
| --- | --- | --- | --- |
| | APPARATUS NAME | ADDRESS INFORMATION | PLAYER DATA |
| | AAA | xxx.xxx.xxx.xxx:9999:123456789012 | WINNING RATIO: 50% |
| | BBB | xxx.xxx.xxx.xxx:9999:123456789567 | WINNING RATIO: 60% |

FIG. 39

| | |
|---|---|
| ☀ | OPPONENT CANDIDATE A |
| ⛅ | OPPONENT CANDIDATE B |
| ☀ | OPPONENT CANDIDATE C |
| 🌧 | OPPONENT CANDIDATE D |
| 🌧 | OPPONENT CANDIDATE E |
| 🌨 | OPPONENT CANDIDATE F |

| APPARATUS NAME | ADDRESS INFORMATION | PLAYER DATA | REGION CODE |
|---|---|---|---|
| AAA | xxx.xxx.xxx.xxx:9999:123456789012 | WINNING RATIO 50% | 001001 |
| BBB | xxx.xxx.xxx.xxx:9999:123456789567 | WINNING RATIO 60% | 001002 |

NETWORK GAME SYSTEM

CROSS REFERENCE TO RELATED APPLICATION

The disclosure of Japanese Patent Application No. 2007-37068, filed on Feb. 16, 2007, is incorporated herein by reference.

BACKGROUND OF THE INVENTION

1. Field of the Invention

The present invention relates to a network game system, and more specifically to a network game system including a plurality of game apparatuses connected to a network so as to be mutually communicable and a distribution server connected to the plurality of game apparatuses via the network for distributing data to the plurality of game apparatuses.

2. Description of the Background Art

Conventionally, apparatuses for performing realistic simulations using traffic, weather forecast or other information have been disclosed (for example, Japanese Laid-Open Patent Publication No. 2001-22264; hereinafter, referred to as "patent document 1"). Such an apparatus is operated as follows. Traffic information, meteorological information, sports event broadcast information or other information which is publicly provided is obtained via various communication mediums such as the Internet or the like. The obtained data is combined with basic data for performing various simulations, and simulations are performed on a display screen. Thus, a racing game reflecting actual traffic information can be played, or a freeway driving simulator or the like to be used in a driving school can be provided.

However, the apparatus disclosed in patent document 1 has the following problem. For example, even if traffic information or meteorological information as described above is provided to a game apparatus, only information corresponding to the data on the place, time or the like which is set in the game apparatus is usable.

SUMMARY OF THE INVENTION

Therefore, a network game system is disclosed herein including a plurality of game apparatuses connected with each other, by which a game is played by the game apparatuses in the state where the meteorological state in a specific geographical region which is set in one of the game apparatuses is reflected on a virtual game space of another of the game apparatuses.

The reference numerals, additional explanations and the like in parentheses in this section of the specification indicate the correspondence with the embodiments described later for easier understanding of the present invention, and do not limit the present invention in any way.

A first aspect of an embodiment of the present invention is directed to a network game system comprising a plurality of game apparatuses (3) communicable to each other; and a distribution server (40) connected to at least a first game apparatus (3a) which is one of the plurality of game apparatuses via a communication network, the distribution server being capable of distributing region-by-region meteorological data. The distribution server comprises distribution means (43, 44) for distributing region-by-region meteorological data stored thereon to the first game apparatus. The first game apparatus comprises region data setting means (10), meteorological data obtaining means (18); meteorological data transmission means (18); and first game processing means (10). The region data setting means sets region data. The meteorological data obtaining means obtains, from the distribution server, meteorological data corresponding to the region data set by the region data setting means. The meteorological data transmission means transmits the meteorological data obtained by the meteorological data obtaining means to a second game apparatus (3b), which is different from the first game apparatus, among the plurality of game apparatuses. The first game processing means executes an on-line game with the second game apparatus using the meteorological data obtained by the meteorological data obtaining means. The second game apparatus comprises meteorological data receiving means (18); and second game processing means (10). The meteorological data receiving means receives the meteorological data transmitted from the meteorological data transmission means. The second game processing means executes the on-line game with the first game apparatus using the meteorological data received by the meteorological data receiving means. With the above-described structure, the first game apparatus obtains meteorological data from the distribution server. At this point, the first game apparatus may receive a plurality of pieces of meteorological data corresponding to a plurality of pieces of region data from the distribution server and obtain meteorological data matching its own region data from the received meteorological data, or may transmit its own region data to the distribution server and receive meteorological data matching the region data from the distribution server. The second game apparatus may also set region data and obtain meteorological data corresponding to the region data from the distribution server. The first game apparatus typically includes meteorological information presentation means for using the meteorological data obtained by the meteorological data obtaining means to present the meteorological information to the player (typically, displays the meteorological information on the screen), but does not need to include this means. The user or the player starts the meteorological information presentation means and thus can learn the meteorological information of his/her own region using the meteorological data obtained by the meteorological data obtaining means. In the case where a plurality of pieces of meteorological data corresponding to a plurality of pieces of region data are received from the distribution server (i.e., in the case where meteorological data of the regions other than its own region is received), the game apparatus can present the player with meteorological information of the regions other than his/her own region. For example, the meteorological information presentation means is a meteorological information display program stored on a disc 4 or a flash memory 17. A CPU 10 executes this program to present the meteorological information to the player. A disc 4 (same or different from the disc having the meteorological information display program stored thereon) or the flash memory 17 have a communication game program (this program causes the CPU 10 to act as the first game processing means or the second game processing means) stored thereon. The CPU 10 executes this program to allow the communication game to be played. The meteorological information display program may be stored on the game apparatus in a nonvolatile manner, and the communication program may be stored on the disc 4. The player may selectively start the meteorological information display program or the communication program. A program included in the meteorological information display program may cause the CPU 10 to act as the region data setting means, and the communication program may not include a program for causing the CPU 10 to act as the region data setting means. The first game apparatus and the second game apparatus communicate with each other via a network, via a server or directly without using a server. The first game apparatus and the second game apparatus each receive operations by the respective player for playing a communication game. The first game apparatus and the second game apparatus are connected with each other and perform the communication game by transmitting/receiving a connection request and a response thereto to/from each other directly or via a server. The meteorological data transmission means and the meteorological data receiving means of the respective game apparatuses may transmit/receive the meteorological data to/from each other directly or a via a server. The first game processing means and the second game processing means perform the communication game, both using the meteorological data obtained by the meteorological data obtaining means of the first game apparatus. The first game apparatus uses the meteorological data obtained by its own meteorological data obtaining means and also transmits the meteorological data to the second game apparatus. The second game apparatus receives the meteorological data from the first game apparatus and uses the received meteorological data.

In a second aspect based on the first aspect, the second game apparatus further comprises selection means (10) for presenting meteorological information to a player using the meteorological data received by the meteorological data receiving means and selecting whether or not to execute the on-line game with the first game apparatus based on an operation performed by the player; and first connection means (18) for, when the selection means selects to execute the on-line game with the first game apparatus, connecting the second game apparatus to the first game apparatus. The second game processing means communicates with the first game apparatus connected to the second game apparatus by the first connection means to execute the on-line game. The first game apparatus further comprises second connection means for connecting the first game apparatus to the second game apparatus which has selected by the selection means to execute the on-line game with the first game apparatus. The first game processing means communicates with the second game apparatus connected to the first game apparatus by the second connection means to execute the on-line game. For example, when the player of the first game apparatus performs an operation for playing a communication game with another game apparatus, the meteorological data transmission means of the first game apparatus transmits the meteorological data to the second game apparatus via a server or directly without using a server. The meteorological data receiving means of the second game apparatus receives the meteorological data, and while presenting the player with meteorological information using the meteorological data, urges the player to select whether or not to play the communication game with the first game apparatus. Thus, the player can select the game apparatus to play the communication game with, in consideration of the meteorological data used in the communication game. The meteorological data receiving means may receive the meteorological data from a plurality of first game apparatuses, and while presenting the player with the meteorological information based on each piece of the meteorological data, urge the player to select whether or not to play the communication game with any of the first game apparatuses. The first game apparatus may transmit user name data together with the meteorological data, and the second game apparatus may receive the meteorological data and the username data, and while presenting the player with the meteorological information and user name information based on the meteorological data and the user name data, urge the player to select. The first connection means and the second connection means connect the respective game apparatuses by directly transmitting/receiving the respective identification information to/from each other directly or via a server.

In a third aspect based on the first aspect, the first game apparatus further comprises region data transmission means (18) for transmitting the region data set by the region data setting means to the second game apparatus. The second game apparatus further comprises region data receiving means (18) for receiving the region data; selection means (10) for presenting region information to a player using the region data received by the region data receiving means and selecting whether or not to execute the on-line game with the first game apparatus based on an operation performed by the player; and first connection means (18) for, when the selection means selects to execute the on-line game with the first game apparatus, connecting the second game apparatus to the first game apparatus. The second game processing means communicates with the first game apparatus connected to the second game apparatus by the first connection means to execute the on-line game. The first game apparatus further comprises second connection means (18) for connecting the first game apparatus to the second game apparatus which has selected by the selection means to execute the on-line game with the first game apparatus. The first game processing means communicates with the second game apparatus connected to the first game apparatus by the second connection means to execute the on-line game. For example, when the player of the first game apparatus performs an operation for playing a communication game with another game apparatus, the region data transmission means of the first game apparatus transmits the region data to the second game apparatus via a server or directly without using a server. The region data receiving means of the second game apparatus receives the region data, and while presenting the player with region information using the region data, urges the player to select whether or not to play the communication game with the first game apparatus. Thus, the player can select the game apparatus to play the communication game with, referring to the region information which is the basis of the meteorological data used in the communication game. The region data receiving means may receive the region data from a plurality of first game apparatuses, and while presenting the player with the region information based on each piece of the region data, urge the player to select whether or not to play the communication game with any of the first game apparatuses. The first game apparatus may transmit user name data together with the region data, and the second game apparatus may receive the region data and the user name data, and while presenting the player with the region information and user name information based on the region data and the user name data, urge the player to select. The region data transmission means and the region data receiving means of the respective game apparatuses may transmit/receive the region data to/from each other directly or via a server.

In a fourth aspect based on the first aspect, the distribution means is capable of distributing meteorological data to each of the plurality of game apparatuses. The second game apparatus further comprises region data setting means (10) for setting region data; and first meteorological data obtaining means (18) for obtaining, from the distribution server, meteorological data corresponding to the region data set by the region data setting means. The first game apparatus further comprises region data transmission means (18) for transmitting the region data obtained by the region data setting means to the second game apparatus. The second game apparatus further comprises region data receiving means for receiving the region data; second meteorological data obtaining means (18) for obtaining, from the distribution server, meteorological data corresponding to the region data received by the region data receiving means; selection means (10) for presenting meteorological information to a player using the meteorological data obtained by the second meteorological data obtaining means and selecting whether or not to execute the on-line game with the first game apparatus based on an operation performed by the player; and first connection means (18) for, when the selection means selects to execute the on-line game with the first game apparatus, connecting the second game apparatus to the first game apparatus. The second game processing means communicates with the first game apparatus connected to the second game apparatus by the first connection means to execute the on-line game. The first game apparatus further comprises second connection means for connecting the first game apparatus to the second game apparatus which has selected by the selection means to execute the on-line game with the first game apparatus. The first game processing means communicates with the second game apparatus connected to the first game apparatus by the second connection means to execute the on-line game. For example, when the player of the first game apparatus performs an operation for playing a communication game with another game apparatus, the region data transmission means of the first game apparatus transmits the region data to the second game apparatus via a server or directly without using a server. The region data receiving means of the second game apparatus receives the region data. The second meteorological data obtaining means obtains meteorological data corresponding to the region data, and while presenting the player with meteorological information using the meteorological data, urges the player to select whether or not to play the communication game with the first game apparatus. Thus, the player can select the game apparatus to play the communication game with, referring to the meteorological data used in the communication game. The region data receiving means may receive the region data from a plurality of first game apparatuses, and the second meteorological data obtaining means may obtain meteorological data corresponding to each piece of the region data, and while presenting the player with the meteorological information based on each piece of the meteorological data, urge the player to select whether or not to play the communication game with any of the first game apparatuses. The first game apparatus may transmit user name data together with the region data, and the second game apparatus may receive the region data and the user name data, and while presenting the player with the meteorological information and user name information based on the meteorological data and the user name data, urge the player to select.

In a fifth aspect based on the first aspect, the network game system further comprises a matching server (50) for matching at least two of the plurality of game apparatuses. The matching server matches the first game apparatus and the second game apparatus to each other as connection targets based on a predetermined condition.

In a sixth aspect based on the first aspect, the first game apparatus further comprises connection request receiving means (18); and connection permission transmission means (18). The connection request receiving means receives a connection request signal from the second game apparatus. The connection permission transmission means transmits a connection permission signal in response to the connection request signal to the second game apparatus. The second game apparatus further comprises address storage means (17); connection request transmission means (18); and connection permission receiving means (18). The address storage means stores a network address of the first game apparatus. The connection request transmission means transmits the connection request signal to the network address of the first game apparatus. The connection permission receiving means receives, from the first game apparatus, the connection permission signal in response to the connection request signal.

In a seventh aspect based on the first aspect, the meteorological data is data on weather.

In an eighth aspect based on the first aspect, the meteorological data is data on temperature.

In a ninth aspect based on the first aspect, the meteorological data obtaining means obtains the meteorological data by executing an application program which is different from a game program executed by the first or second game processing means.

In a tenth aspect based on the ninth aspect, the network game system further comprises dedicated application execution means for executing the application program which is different from the game program executed by the first or second game processing means. The region data is changeable only by executing the application program by the dedicated application execution means.

In an eleventh aspect based on the tenth aspect, the region data includes data by a first classification and data by a second classification. The data by the first classification represents a country in which a corresponding game apparatus is located. The data by the second classification represents a region in the country in which the corresponding game apparatus is located. The dedicated application program is capable of changing only the data by the second classification.

A twelfth aspect of an embodiment of the present invention is directed to a network game system comprising a plurality of game apparatuses (3) communicable to each other; and a distribution server (40) connected to the plurality of game apparatuses via a communication network, the distribution server distributing region-by-region meteorological data. The distribution server comprises distribution means for distributing meteorological data to each of the plurality of game apparatuses. Each of the plurality of game apparatuses comprises region data setting means (10) for setting region data; and first meteorological data obtaining means (18) for obtaining, from the distribution server, meteorological data corresponding to the region data set by the region data setting means. Among the plurality of game apparatuses, a first game apparatus and a second game apparatus execute an on-line game. The first game apparatus comprises region data transmission means for transmitting the region data to the second game apparatus; and first game processing means for communicating with the second game apparatus to execute the on-line game with the second game apparatus using the meteorological data obtained by the first meteorological data obtaining means of the first game apparatus. The second game apparatus comprises region data receiving means for receiving the region data from the first game apparatus; second meteorological data obtaining means for obtaining, from the distribution server, meteorological data corresponding to the region data received by the region data receiving means; and second game processing means for communicating with the first game apparatus to execute the on-line game with the first game apparatus using the meteorological data obtained by the second meteorological data obtaining means. With such a structure, the first game apparatus and the second game apparatus are connected with each other and play a communication game by, for example, one of the game apparatuses transmitting a connection request and the other responding thereto. Alternatively, the first game apparatus and the second game apparatus may be connected with each other via a matching server and play the communication game. In the former case, the game apparatus which transmitted the connection request may be second game apparatus, and the game apparatus responded thereto may be the first game apparatus. Namely, the meteorological data corresponding to the region data of the game apparatus which responded to the received connection request is used in the communication game. Alternatively, the meteorological data corresponding to the region data of which game apparatus is to be used may be selected by the player.

In a thirteenth aspect based on the twelfth aspect, the network game system further comprises a matching server (50) for matching at least two of the plurality of game apparatuses. The matching server matches the first game apparatus and the second game apparatus to each other as connection targets based on a predetermined condition.

In a fourteenth aspect based on the twelfth aspect, the first game apparatus further comprises connection request receiving means (18); and connection permission transmission means (18). The connection request receiving means receives a connection request signal from the second game apparatus. The connection permission transmission means transmits a connection permission signal in response to the connection request signal to the second game apparatus. The second game apparatus further comprises address storage means (17); connection request transmission means (18); and connection permission receiving means (18). The address storage means stores a network address of the first game apparatus. The connection request transmission means transmits the connection request signal to the network address of the first game apparatus. The connection permission receiving means receives, from the first game apparatus, the connection permission signal in response to the connection request signal.

In a fifteenth aspect based on the twelfth aspect, the first game apparatus further comprises connection request waiting information transmission means for transmitting connection request waiting information to a predetermined server or the second game apparatus, the connection request waiting information representing a state of waiting for a connection request from other game apparatuses. The second game apparatus further comprises connectable apparatus obtaining means; connectable apparatus display means; and selection means. The connectable apparatus obtaining means obtains connection request waiting information regarding at least one of the plurality of game apparatuses. The connectable apparatus display means displays, in a list on a screen, information on the at least one game apparatus represented by the obtained connection request waiting information. The selection means selects a desired game apparatus as the first game apparatus based on the displayed information on the at least one displayed game apparatus.

In a sixteenth aspect based on the fifteenth aspect, the connection request waiting information transmission means transmits the region data as a part of the connection request waiting information. The second meteorological data obtaining means obtains the meteorological data corresponding to the region data included in the obtained connection request waiting information. The connectable apparatus display means displays, on the screen, the obtained meteorological data as corresponding to the information on the game apparatus represented by the connection request waiting information.

In a seventeenth aspect based on the twelfth aspect, the meteorological data is data on weather.

In an eighteenth aspect based on the twelfth aspect, the meteorological data is data on temperature.

In a nineteenth aspect based on the twelfth aspect, the first meteorological data obtaining means and the second meteorological data obtaining means obtain the meteorological data by executing an application program which is different from a game program executed by the first or second game processing means.

In a twentieth aspect based on the nineteenth aspect, the network game system further comprises dedicated application execution means for executing the application program which is different from the game program executed by the first or second game processing means. The region data is changeable only by executing the application program by the dedicated application execution means.

In a twenty-first aspect based on the twentieth aspect, the region data includes data by a first classification and data by a second classification. The data by the first classification represents a country in which a corresponding game apparatus is located. The data by the second classification represents a region in the country in which the corresponding game apparatus is located. The dedicated application program is capable of changing only the data by the second classification.

In a twenty-second aspect based on the twelfth aspect, the second game apparatus further comprises communication region storage means (17); region display means (10); and region selection means (10). The communication region storage means stores at least one piece of the region data received by the region data receiving means in a nonvolatile manner. The region display means presents game data based on the region data stored on the communication region storage means such that game data is selectable by a player. The region selection means selects predetermined game data based on a selection operation by the player from the game data displayed by the region display means. The second game processing means executes game processing using the game data selected by the region selection means.

In a twenty-third aspect based on the twelfth aspect, the second game apparatus further comprises third meteorological data obtaining means for obtaining, from the distribution server, the meteorological data corresponding to region data set by the region data setting means of the second game apparatus. The second game processing means reflects the meteorological data obtained by the second meteorological data obtaining means and the meteorological data obtained by the third meteorological data obtaining means on a virtual game space when executing game processing.

A twenty-fourth aspect of an embodiment of the present invention is directed to a network game system comprising a plurality of game apparatuses communicable to each other; and a distribution server connected to the plurality of game apparatuses via a communication network, the distribution server distributing region-by-region meteorological data. The distribution server comprises distribution means for distributing meteorological data to each of the plurality of game apparatuses. Each of the plurality of game apparatuses comprises region data setting means for setting region data; and first meteorological data obtaining means for obtaining, from the distribution server, meteorological data corresponding to the region data set by the region data setting means. Among the plurality of game apparatuses, a first game apparatus and a second game apparatus execute an on-line game. The first game apparatus comprises region data transmission means for transmitting the region data to the second game apparatus; and first game processing means for communicating with the second game apparatus to execute the on-line game with the second game apparatus. The second game apparatus comprises second game processing means for communicating with the first game apparatus to execute the on-line game with the first game apparatus; region data receiving means for receiving the region data from the first game apparatus; region data storage means for storing the region data received by the region data receiving means; second meteorological data obtaining means for obtaining, from the distribution server, the meteorological data corresponding to the region data stored on the region data storage means; and third game processing means for executing a game using the meteorological data obtained by the second meteorological data obtaining means. The third game processing means may play a game without communicating with any other game apparatus or play the communication game in communication with the other game apparatuses. In the former case, the third game processing may selectively use the meteorological data obtained by the first meteorological data obtaining means or the meteorological data obtained by the second meteorological data obtaining means. In this case, the player may select which data to use. The first game processing means and the second game processing means may play the communication game using the meteorological data obtained by the first meteorological data obtaining means. The region data storage means may store a plurality of pieces of region data received by the region data receiving means. The region data storage means may store region data in a nonvolatile manner. The second meteorological data obtaining means may select any of the region data stored on the meteorological data storage means (or the selection may be conducted by the player), and obtain the meteorological data corresponding to the selected region data.

In a twenty-fifth aspect based on the twenty-fourth aspect, the network game system further comprises a matching server (50) for matching at least two of the plurality of game apparatuses. The matching server matches the first game apparatus and the second game apparatus to each other as connection targets based on a predetermined condition.

In a twenty-sixth aspect based on the twenty-fourth aspect, the first game apparatus further comprises connection request receiving means (18); and connection permission transmission means (18). The connection request receiving means receives a connection request signal from the second game apparatus. The connection permission transmission means transmits a connection permission signal in response to the connection request signal to the second game apparatus. The second game apparatus further comprises address storage means (17); connection request transmission means (18); and connection permission receiving means (18). The address storage means stores a network address of the first game apparatus. The connection request transmission means transmits the connection request signal to the network address of the first game apparatus. The connection permission receiving means receives, from the first game apparatus, the connection permission signal in response to the connection request signal.

In a twenty-seventh aspect based on the twenty-fourth aspect, the meteorological data is data on weather.

In a twenty-eighth aspect based on the twenty-fourth aspect, the meteorological data is data on temperature.

According to the first aspect, the player of a game apparatus, when playing an on-line game, can reflect the meteorological data, including the weather, of the region at the other end of the communication on the game processing executed by the game apparatus of the player. Thus, for example, when the weather of the region where the player of the second game apparatus lives is fine but it is raining in the region where the player of the first game apparatus at the other end of the communication, the weather of "raining" can be reflected on the game processing executed by the second game apparatus. As a result, the player of the second game apparatus feels as if he/she was playing in the region at the other end of the communication, which makes it more amusing to communicate with other game apparatuses. This promotes the player of each game apparatus to communicate with other players, which enhances the level of entertainment of the on-line game.

According to any one of the second through fourth aspects, when the player of the game apparatus is to select one of the other apparatuses with which he/she wishes to communicate, the information on the players of the other game apparatuses can be presented to the player.

According to the fifth aspect, the game apparatus to be connected with can be efficiently retrieved from unspecified game apparatuses.

According to the sixth aspect, the game apparatus can be connected directly to the other game apparatuses without using the matching server. Thus, the cost for the matching server can be saved.

According to the seventh or eighth aspect, the meteorological information on the region at the other end of the communication can be easily recognized by the player, which makes the on-line game more realistic and thus more exciting.

According to the ninth or tenth aspect, data for applications other than the game apparatus can be used for the game processing. Thus, data sharing is realized and thus development of games can be performed more efficiently.

According to the eleventh aspect, the player is prevented from unnecessarily changing the region data.

According to the twelfth aspect, the same effects as those of the first aspect are provided.

According to the thirteenth aspect, the game apparatus to be connected with can be efficiently retrieved from unspecified game apparatuses.

According to the fourteenth aspect, the game apparatus can be connected directly to the other game apparatuses without using the matching server. Thus, the cost for the matching server can be saved.

According to the fifteenth or sixteenth aspect, when the player of the game apparatus is to select one of the other game apparatuses with which he/she wishes to communicate, the information on the players of the other game apparatuses can be presented to the player.

According to the seventeenth or eighteenth aspect, the meteorological information on the region at the other end of the communication can be easily recognized by the player, which makes the on-line game more realistic and more exciting.

According to the nineteenth or twentieth aspect, data for applications other than the game apparatus can be used for the game processing. Thus, data sharing is realized and thus development of the games can be performed more efficiently.

According to the twenty-first aspect, the player is prevented from unnecessarily changing the region data.

According to the twenty-second aspect, the game can be set such that only one geographical region is selectable for the stage of, for example, the fight when the player plays the game for the first time after purchase but as the player repeats playing against different opponents, the player can select any of the regions of the past opponents. This keeps the player motivated to play, and the player can enjoy the same game many times without losing interest in the game.

According to the twenty-third aspect, while the game is played with the meteorological state of the region of the first game apparatus being reflected, the meteorological state of the region of the second game apparatus can also be reflected on the game. Thus, especially in an on-line game played by many players at the same time, each player can recognize the meteorological information of the region where each of the other players lives. This makes the on-line game more amusing.

According to the twenty-fourth aspect, as one game apparatus plays with more and more game apparatuses, the amount of region data stored thereon is increased. As a result, even when the game apparatus is not in communication with any other game apparatus, the player of the game apparatus can play using the meteorological data of the regions of the other players.

According to the twenty-fifth aspect, the game apparatus to be connected with can be efficiently retrieved from unspecified game apparatuses.

According to the twenty-sixth aspect, the game apparatus can be connected directly to the other game apparatuses without using the matching server. Thus, the cost for the matching server can be saved.

According to the twenty-seventh or twenty-eighth aspect, the meteorological information on the region at the other end of the communication can be easily recognized by the player, which makes the on-line game more realistic.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows an exemplary data structure of comprehensive weather data 173;

FIG. 14 shows an exemplary data structure of a country name master 174;

FIG. 15 shows an exemplary data structure of a region name master 175;

FIG. 16 shows an exemplary data structure of a weather information master 176;

FIG. 39 shows a screen displaying an exemplary list of selectable opponents according to the fourth embodiment;

FIG. 40 shows an exemplary data structure of a host list according to the fourth embodiment;

DESCRIPTION OF THE PREFERRED EMBODIMENTS

Before a detailed description of each of embodiments, a structure of a game apparatus commonly used in the following embodiments will be described.

(Overall Structure of the Game System)

Figure 1:
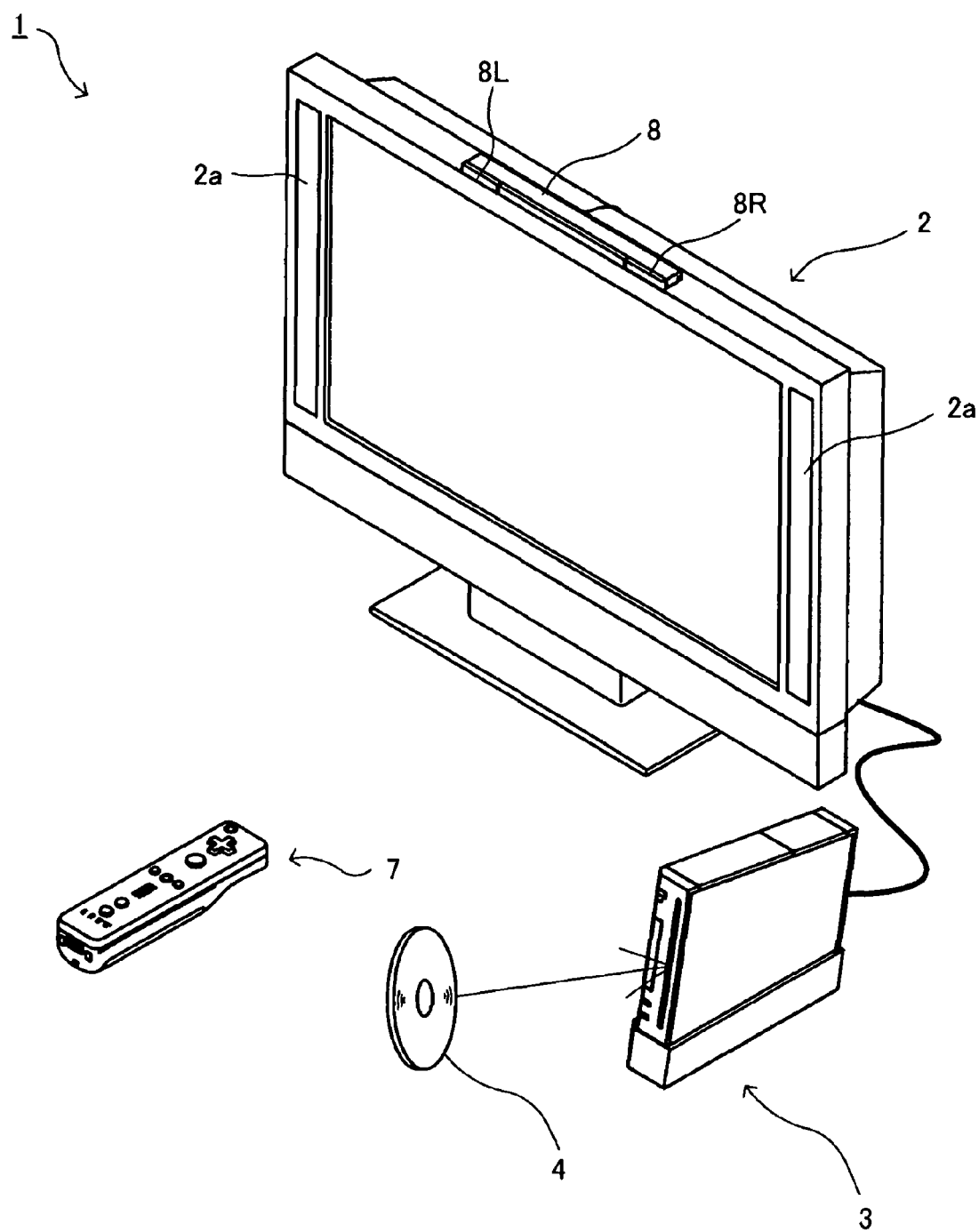
FIG. 1 is an external view of a game system 1 according to an embodiment of the present invention.

With reference to FIG. 1, a game system 1 including a game apparatus 3 according to an embodiment of the present invention will be described. FIG. 1 is an external view of the game system 1. Hereinafter, a game apparatus and a game program according to this embodiment will be described. In the following example, the game apparatus 3 is of an installation type. As shown in FIG. 1, the game system 1 includes a TV receiver 2 (hereinafter, referred to simply as a "TV") 2, the game apparatus 3, an optical disc 4, a controller 7, and a marker section 8. In the game system 1, game processing is executed by the game apparatus 3 based on a game operation performed using the controller 7.

On the game apparatus 3, the optical disc 4 is detachably mountable as an exemplary information storage medium exchangeably usable for the game apparatus 3. The optical disc 4 has stored thereon a game program to be executed by the game apparatus 3. The game apparatus 3 has an insertion opening for mounting the optical disc 4 on a front surface thereof. The game apparatus 3 reads and executes the game program stored on the optical disc 4 inserted into the insertion opening, and thus performs the game processing.

The game apparatus 3 is connected to the TV 2 as an exemplary display device via a connection cord. The TV 2 displays a game image obtained as a result of the game processing executed by the game apparatus 3. The marker section 8 is provided in the vicinity of a display screen of the TV 2 (above the display screen in FIG. 1). The marker section 8 includes two markers 8R and 8L respectively at two ends thereof. Specifically, the marker 8R (also the marker 8L) includes at least one infrared LED, and outputs infrared light forward from the TV 2. The marker section 8 is connected to the game apparatus 3, and the game apparatus 3 can control each of the infrared LEDs to be lit up or out.

The controller 7 is an input device for providing the game apparatus 3 with operation data indicating the particulars of the operation made thereon. The controller 7 and the game apparatus 3 are wirelessly communicable to each other. In this embodiment, the controller 7 and the game apparatus 3 are communicable to each other by, for example, the Bluetooth (registered trademark) technology. In other embodiments, the controller 7 and the game apparatus 3 may be connected with each other in a wired manner.

(Internal Structure of the Game Apparatus 3)

Figure 2:
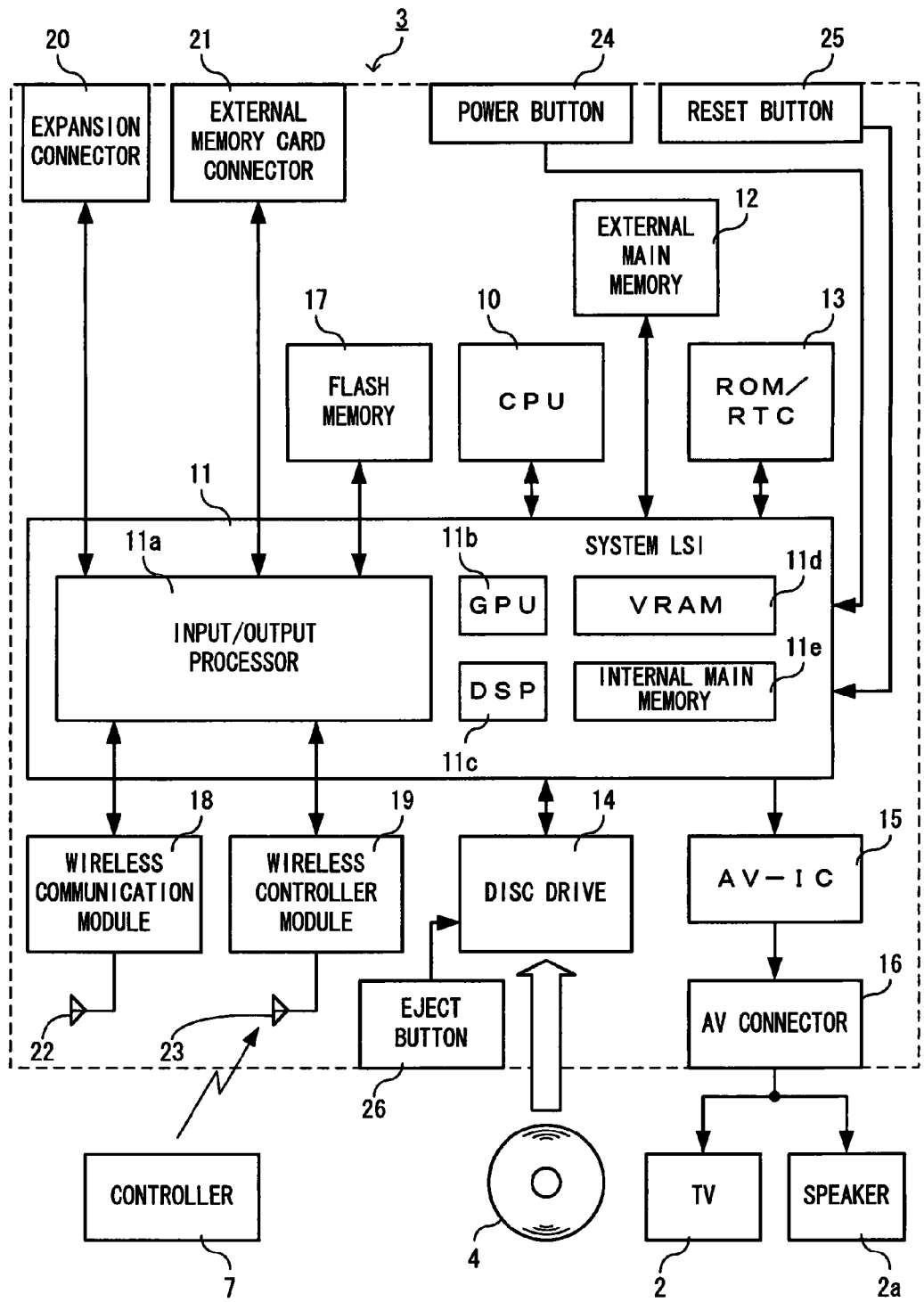
FIG. 2 is a block diagram of a game apparatus 3 included in the game system 1 shown in FIG. 1.

Next, with reference to FIG. 2, an internal structure of the game apparatus 3 will be described. FIG. 2 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing the game program stored on the optical disc 4, and acts as a game processor. The CPU 10 is connected to the system LSI 11. The system LSI 11 is connected to the CPU 10 and also to the external main memory 12, the ROM/RTC 13, the disc drive 14 and the AV-IC 15. The system LSI 11, for example, controls data transfer between the elements connected thereto, generates images to be displayed, and obtains data from external devices. An internal structure of the system LSI 11 will be described later. The external main memory 12, which is volatile, has stored there on programs including the game program read from the optical disc 4 or from a flash memory 17, or various other data. The external main memory 12 is used as a work area or a buffer area of the CPU 10. The ROM/RTC 13 includes a ROM having a program for starting the game apparatus 3 incorporated thereon (so-called boot ROM) and a clock circuit for counting time (RTC: Real Time Clock). The disc drive 14 reads program data, texture data or the like from the optical disc 4 and writes the read data onto an internal main memory lie or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown, these elements 11a through 11e are connected with each other via an internal bus.

The GPU 11b is a part of drawing means and generates an image in accordance with a graphics command (a command to draw an image) from the CPU 10. More specifically, the GPU 11b generates game image data by executing calculation processing necessary to display 3D graphics in accordance with the graphics command, for example, by executing coordinate conversion from a 3D coordinate to a 2D coordinate as pre-processing to rendering, or executing final rendering processing including texture pasting. The CPU 10 gives the GPU 11b an image generation program necessary to generate the game image data as well as the graphics command. The VRAM 11d stores data necessary for the GPU 11b to execute the graphics command (polygon data, texture data or other data). The GPU 11b uses the data stored on the VRAM 11d to generate an image.

The DSP 11c acts as au audio processor and generates audio data using sound data or sound wave (sound tone) data stored on the internal main memory 11e or the external main memory 12.

The image data and the audio data generated as described above are read by the AV-IC 15. The AV-IC 15 outputs the read image data to the TV 2 via an AV connector 16, and outputs the read audio data to a speaker 2a built in the TV 2. Thus, the image is displayed on the TV 2 and also the sound is output from the speaker 2a.

The input/output processor (I/O processor) 11a transmits or receives data to or from the elements connected thereto, or downloads data from external devices. The input/output processor 11a is connected to the flash memory 17, a wireless communication module 18, a wireless controller module 19, an expansion connector 20, and an external memory card connector 21. The wireless communication module 18 is connected to an antenna 22, and the wireless controller module 19 is connected to an antenna 23.

The input/output processor 11a is connected to the network via the wireless communication module 18 and the antenna 22 and thus can communicate with other game apparatuses or various servers also connected to the network. The input/output processor la periodically accesses the flash memory 17, and detects whether or not there is data which needs to be transmitted to the network. When there is such data, the input/output processor 11a transmits such data to the network via the wireless communication module 18 and the antenna 22. The input/output processor 11a receives data transmitted from other game apparatuses or downloaded from a download server via the network, the antenna 22 and the wireless communication module 18, and stores the received data on the flash memory 17. The CPU 10 executes the game program and thus reads the data stored on the flash memory 17 to be used for the game program. The flash memory 17 may have stored therein data saved as a result of playing the game using the game apparatus 3 (data after or in the middle of the game) as well as the data to be transmitted to, or data received from, the other game apparatuses or various servers.

The input/output processor 11a receives operation data which is transmitted from the controller 22 via the antenna 23 and the wireless controller module 19 and stores the operation data in a buffer area of the internal main memory 11e or the external main memory 12 (temporary storage).

The input/output processor 11a is connected to the expansion connector 20 and the external memory card connector 21. The expansion connector 20 is a connector for an interface such as USB, SCSI or the like. The expansion connector 20 may be connected to a medium such as an external storage medium or the like, may be connected to a peripheral device such as another controller or the like, or may be connected to a wired communication connector, to communicate with the network instead of the wireless communication module 18. The external memory card connector 21 is a connector for an external storage medium such as a memory card or the like. For example, the input/output processor 11a can access an external storage medium via the expansion connector 20 or the external memory card connector 21 to store or read data.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the power button 24 is pressed while the power is on, the game apparatus 3 is placed into a low power standby mode in which power of about only one miniature bulb is used. The game apparatus 3 is provided with power even in this state and thus can be connected to a network such as the Internet or the like full time. When the power button 24 is pressed for a predetermined period of time while the power is on, the game apparatus 3 is turned off. When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

Now, types of communication performed by the game apparatus 3 according to this embodiment will be described. The communication according to this embodiment is roughly classified into two types. One uses a fulltime connection type network, in which the communication is possible even in a low power standby mode as described above (hereinafter, such a type of communication will be referred to as "fulltime connection communication"). The other uses an on-demand connection, in which the communication is connected when desired by an application program such as, for example, an on-line fighting game (hereinafter, such a type of communication will be referred to as "on-demand connection communication"). In the fulltime connection communication, the input/output processor 11a independently transmits data written on the flash memory 17 or writes received data on the flash memory 17, regardless of the program (e.g., regardless of the game program) as described later. Therefore, an application using the fulltime connection communication (for example, mail application) only needs to write data to be transmitted on the flash memory 17 or to read received data from the flash memory 17. When the fulltime connection communication is used, communication can be performed periodically, even when the game apparatus 3 is in the low power standby mode. In addition, even while a predetermined game program is being executed, communication can be performed as a background process. In this embodiment, the fulltime connection is used for communication with a distribution server described later, so as to obtain comprehensive weather data periodically (described in detail later). For allowing the game apparatus 3 to play a game with other game apparatus (es) 3 according to this embodiment as described later, the on-demand connection communication is used.

Figure 3:
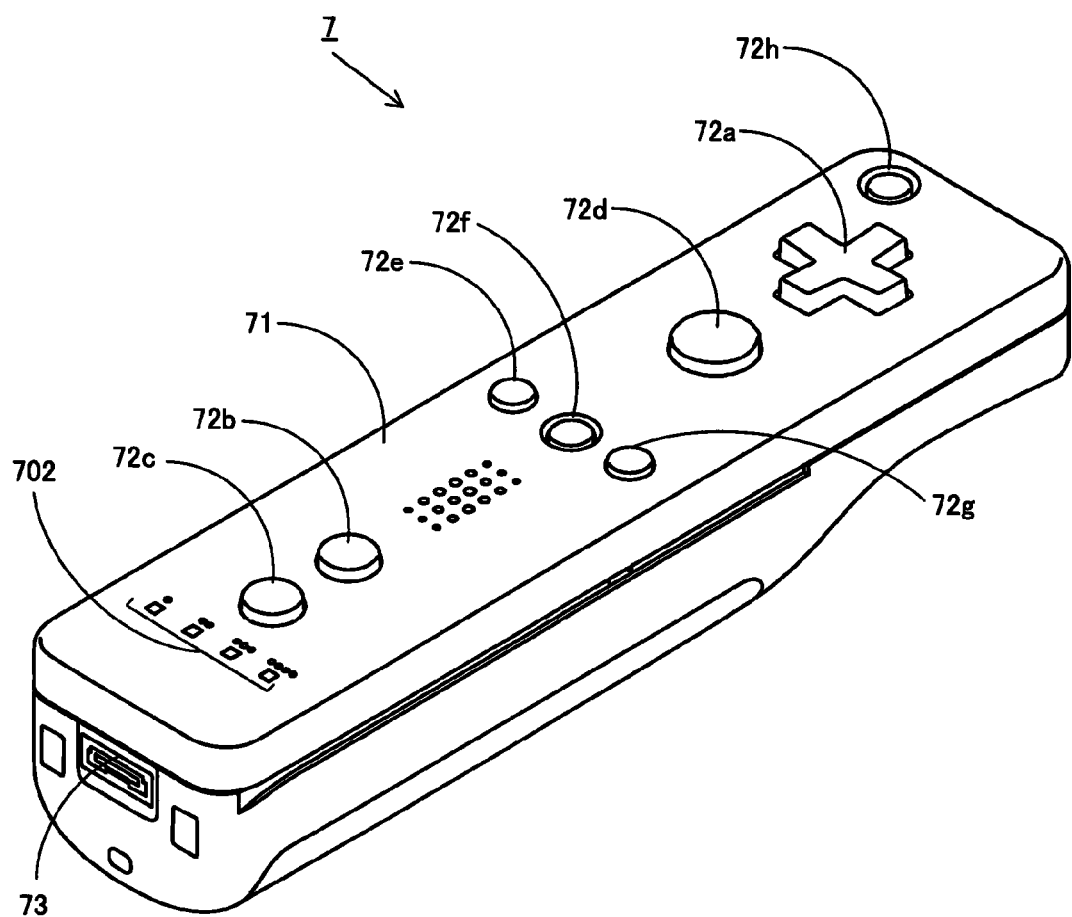
FIG. 3 is an isometric view of a controller 7 shown in FIG. 1 seen from the top rear side thereof.
Figure 3:
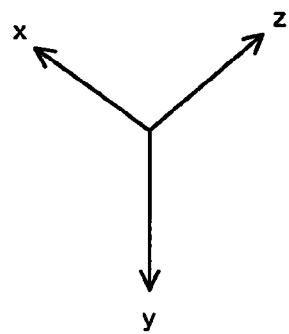
Figure 4:
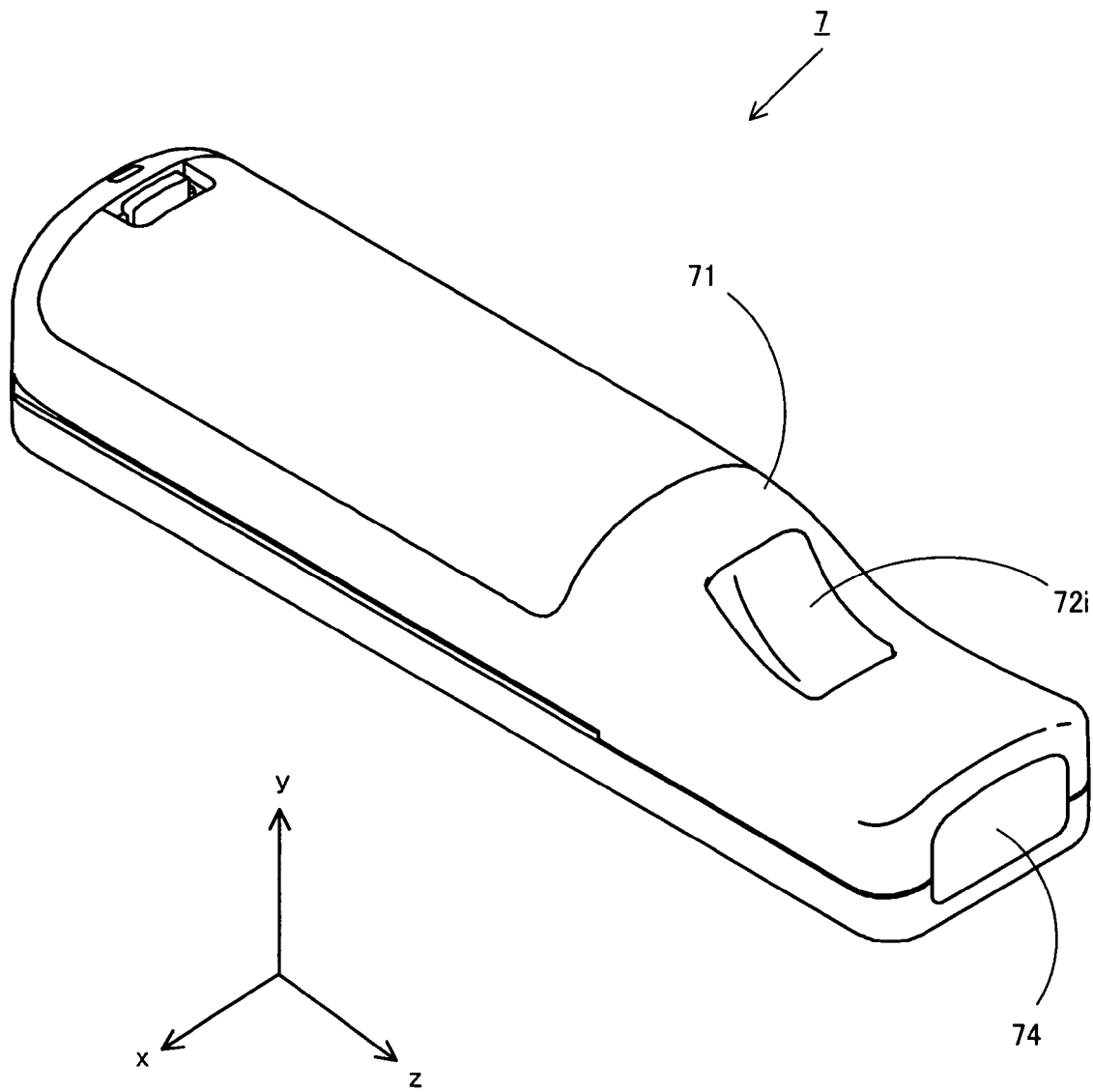
FIG. 4 is an isometric view of the controller 7 shown in FIG. 3 seen from the bottom front side thereof.

With reference to FIG. 3 and FIG. 4, the controller 7 will be described. FIG. 3 is an isometric view of the controller 7 seen from the top rear side thereof. FIG. 4 is an isometric view of the controller 7 seen from the bottom front side thereof.

As shown in FIG. 3 and FIG. 4, the controller 7 includes a housing 71 and an operation section 72 including a plurality of operation buttons provided on a surface of the housing 71.

The housing 71 has a generally parallelepiped shape extending in a longitudinal direction from front to rear. The overall size of the housing 71 is small enough to be held by one hand of an adult or even a child. The housing 71 is formed by plastic molding or the like.

At the center of a front part of a top surface of the housing 71, a cross key 72a is provided. The cross key 72a is a cross-shaped four-direction push switch. The cross key 72a includes projecting operation portions corresponding to the four directions (front, rear, right and left) and arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or select one of a plurality of alternatives.

The cross key 72a is an operation section for outputting an operation signal in accordance with the above-described direction input operation performed by the player, but such an operation section may be provided in another form. For example, the operation section may include four push switches provided in a cross arrangement, and output an operation signal in accordance with the push switch which has been pressed by the player. The operation section may further include a center switch provided at the intersection of the cross in addition to the four push switches. Alternatively, the cross key 72a may be replaced with an operation section which includes an inclinable stick (so-called joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Rearward to the cross key 72a on the top surface of the housing 71, a plurality of operation buttons 72b through 72g are provided. The operation buttons 72b through 72g are each an operation section for outputting a respective operation signal when the player presses ahead thereof. For example, the operation buttons 72b through 72d are assigned functions of a first button, a second button, and an A button. The operation buttons 72e through 72g are assigned functions of a minus button, a home button and a plus button, for example. The operation buttons 72b through 72g are assigned various functions in accordance with the game program executed by the game apparatus 3. In the exemplary arrangement shown in FIG. 3, the operation buttons 72b through 72d are arranged in a line extending in the front-rear direction at the center of the top surface of the housing 71. The operation buttons 72e through 72g are arranged in a line extending in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to the controller 7 that he/she is using. Specifically, when the controller 7 transmits the transmission data to the wireless controller module 19, one of the plurality of LEDs corresponding to the controller type is lit up.

On the top surface of the housing 71, sound holes for outputting a sound from a speaker (speaker 706 in FIG. 5) described later is provided between the operation button 72b and the operation buttons 72e through 72g.

On a bottom surface of the housing 71, a recessed portion is formed. The recessed portion is formed at a position at which an index finger or middle finger of the player is located when the player holds the controller 7 with one hand in the state where a front surface of the controller 7 is directed toward the markers 8L and 8R. On a slope surface of the recessed portion, an operation button 72i is provided. The operation button 72i is an operation section acting as, for example, a B button.

On the front surface of the housing 71, an imaging element 743 (see FIG. 6) included in the imaging information calculation section 74 is provided. The imaging information calculation section 74 is a system for analyzing image data which is taken by the controller 7, and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The structure of the imaging information calculation section 74 will be described later in detail. On a rear surface of the housing 71, a connector 73 (FIG. 5) is provided. The connector 73 is, for example, an edge connector, and is used for engaging and connecting the controller 7 with a connection cable.

In order to give a specific description below, a coordinate system which is set for the controller 7 will be defined. As shown in FIG. 3 and FIG. 4, x, y and z axes perpendicular to one another are defined for the controller 7. Specifically, the longitudinal direction of the housing 71, i.e., the front-rear direction of the controller 7, is set as the z axis. A direction toward the front surface of the controller 7 (the surface having the imaging information calculation section 74) is set as a positive z-axis direction. The up-to-down direction of the controller 7 is set as the y axis. A direction toward the bottom surface of the controller housing 71 (the surface having the operation button 72i) is set as a positive y-axis direction. The left-right direction of the controller 7 is set as the x axis. A direction toward a left surface of the housing 71 (the surface which is not shown in FIG. 3 but is shown in FIG. 4) is set as a positive x-axis direction.

Figure 5:
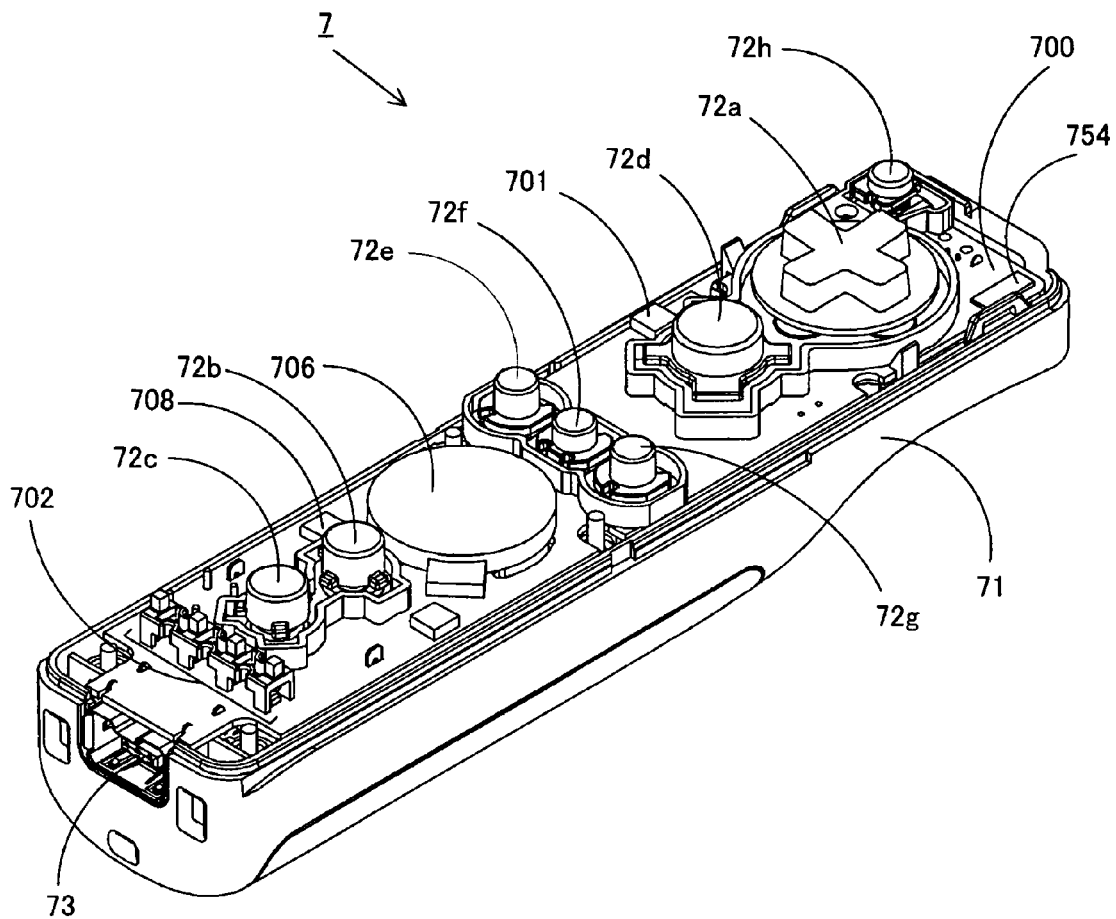
FIG. 5 is an isometric view of the controller 7 shown in FIG. 3 in the state where an upper housing is removed.
Figure 5:
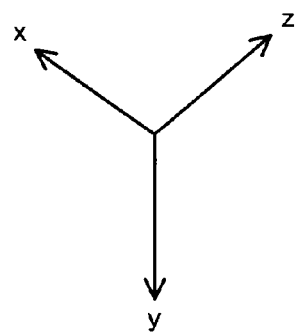
Figure 6:
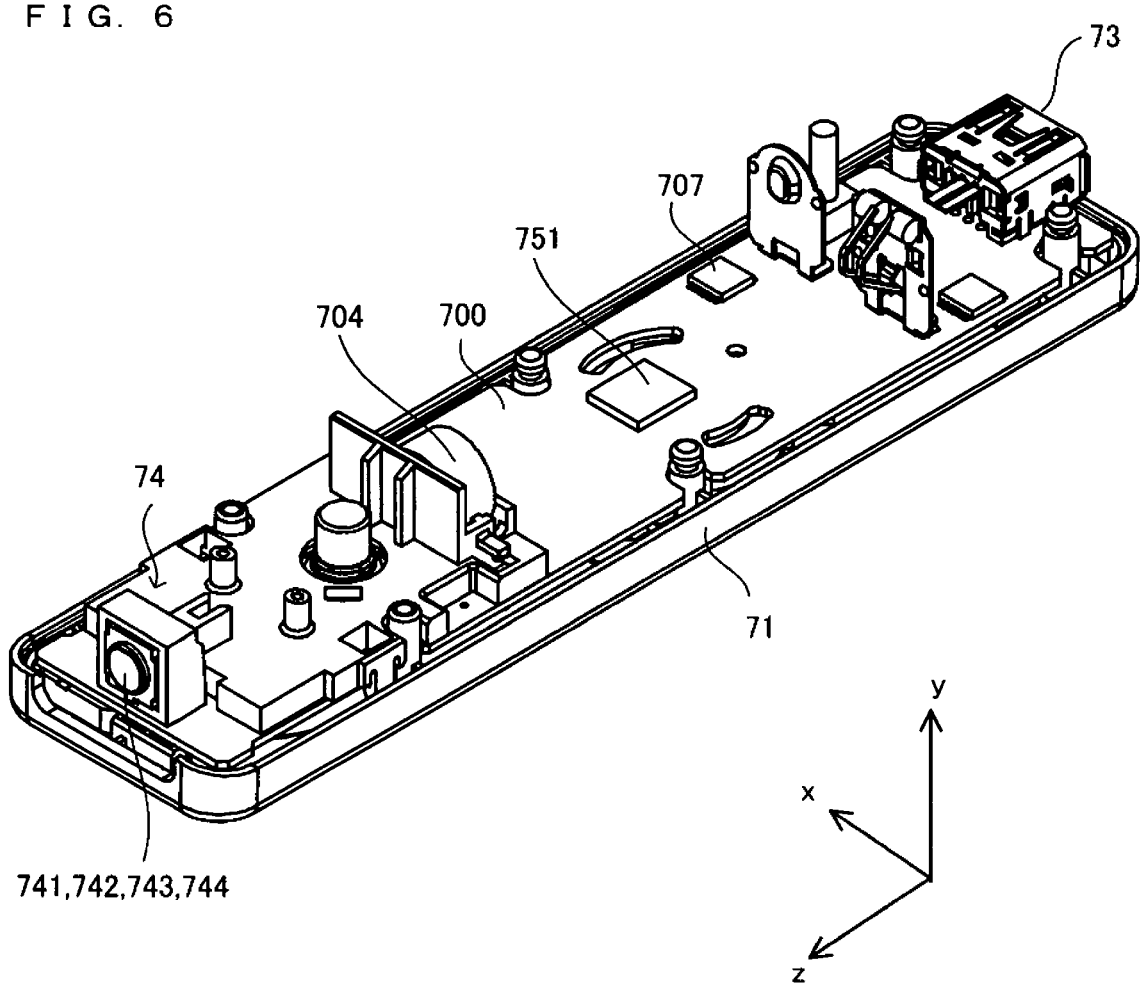
FIG. 6 is an isometric view of the controller 7 shown in FIG. 3 in the state where a lower housing is removed.

With reference to FIG. 5 and FIG. 6, an internal structure of the controller 7 will be described. FIG. 5 is an isometric view of the controller 7 seen from the rear side, illustrating a state where an upper housing (a part of the housing 71) of the controller 7 is removed. FIG. 6 is an isometric view of the controller 7 seen from the front side, illustrating a state where a lower housing (a part of the housing 71) of the controller 7 is removed. FIG. 6 shows a reverse side of a substrate 700 shown in FIG. 5.

As shown in FIG. 5, the substrate 700 is fixed inside the housing 71. On a top main surface of the substrate 700, the operation buttons 72a through 72h, an acceleration sensor 701, the LEDs 702, an antenna 754 and the like are provided. These elements are connected to a microcomputer 751 (see FIG. 6 and FIG. 7) or the like via lines (not shown) formed on the substrate 700 or the like. The microcomputer 751 is one example of button data generation means according to the present invention and acts to generate operation button data in accordance with the type of the operation button 72a or the like. This mechanism is known and is realized by, for example, the microcomputer 751 detecting whether the line is connected or disconnected by a switch mechanism, for example, a tact switch, provided on the keytop. More specifically, when an operation button is, for example, pressed, the corresponding line is connected and becomes conductive. The microcomputer 751 detects the operation button to which the line that has become conductive is connected and generates a signal corresponding to the type of the operation button.

The controller 7 acts as a wireless controller owing to a wireless module 753 (see FIG. 7) and the antenna 754. The housing 71 accommodates a quartz vibrator for generating a reference clock of the microcomputer 751 described later in detail. On the top main surface of the substrate 700, the speaker 706 and an amplifier 708 are provided. The acceleration sensor 701 is provided on the substrate 700 to the left of the operation button 72d (i.e., in a peripheral area of the substrate 700, not in a central area). Owing to such an arrangement, as the controller 7 rotates around the longitudinal direction thereof, the acceleration sensor 701 detects an acceleration including a centrifugal force component in addition to a component of direction change of gravitational acceleration. As a result, the game apparatus 3 or the like can determine the rotation of the controller 7 at a high sensitivity based on the detected acceleration through a predetermined calculation.

As shown in FIG. 6, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via lines provided on the substrate 700 or the like, and outputs a sound signal to the speaker 706 via the amplifier 708 in accordance with the sound data transmitted from the game apparatus 3.

On the bottom main surface of the substrate 700, a vibrator 704 is attached. The vibrator 704 is, for example, a vibration motor or a solenoid. The vibrator 704 is connected to the microcomputer 751 via lines provided on the substrate 700 or the like, and turns the microcomputer 751 on or off in accordance with vibration data transmitted from the game apparatus 3. The controller 7 is vibrated by an actuation of the vibrator 704, and the vibration is conveyed to the player holding the controller 7. Thus, a so-called vibration-responsive game is realized. Since the vibrator 704 is provided slightly forward with respect to the center of the housing 71, the housing 71 held by the player is largely vibrated. Thus, the player easily senses the vibration.

Figure 7:
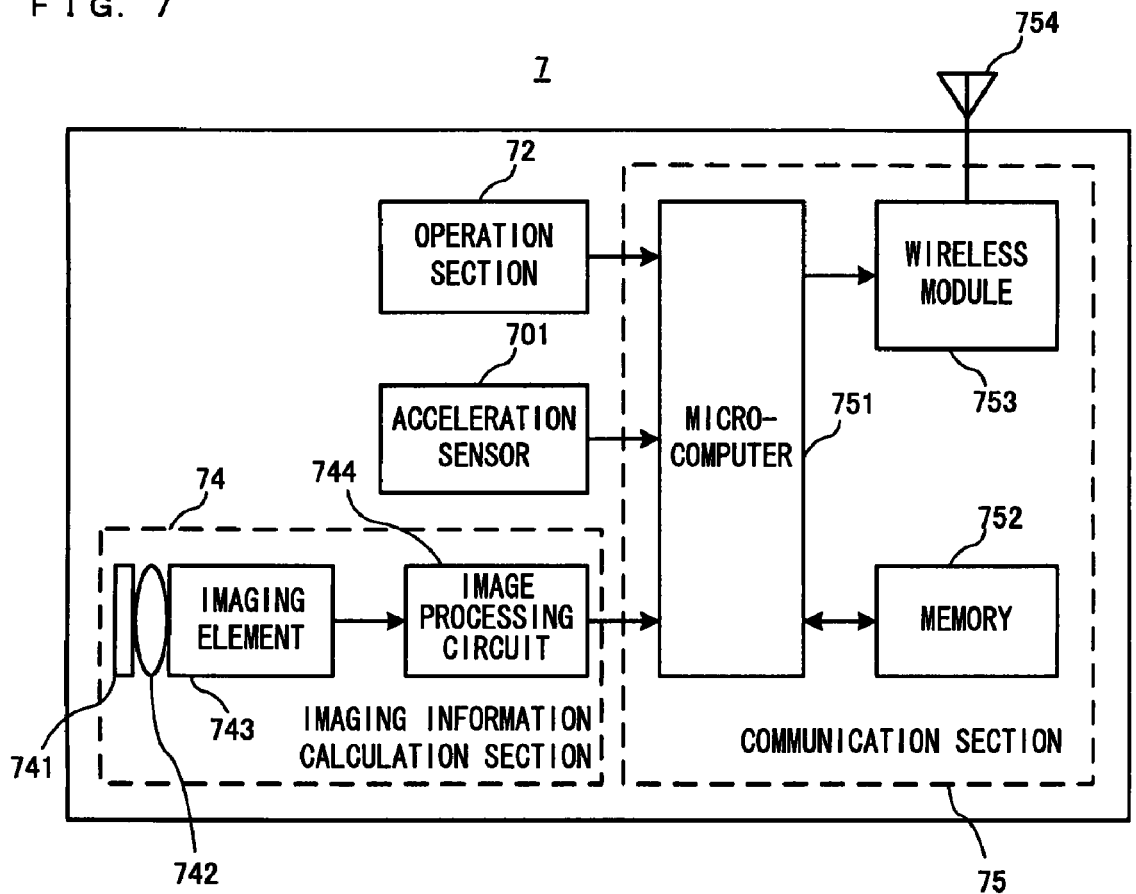
FIG. 7 is a block diagram illustrating a structure of the controller 7 shown in FIG. 3.

With respect to FIG. 7, the internal structure of the controller 7 will be described. FIG. 7 is a block diagram showing the structure of the controller 7.

As shown in FIG. 7, the controller 7 includes a communication section 75 in addition to the operation section 72, the imaging information calculation section 74, the acceleration sensor 701, the vibrator 704, the speaker 706, the sound IC 707 and the amplifier 708 described above.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 and generates image data. The image data generated by the imaging element 743 is processed by the image processing circuit 744. Specifically, the image processing circuit 744 processes the image data obtained from the imaging element 743, senses an area thereof having a high brightness, and outputs the processing result data representing the detected coordinate position and size of the area to the communication section 75. The imaging information calculation section 74 is fixed to the housing 71 of the controller 7. The imaging direction of the imaging information calculation section 74 can be changed by changing the direction of the housing 71. As described later, a signal in accordance with the position or motion of the controller 7 can be obtained based on the processing result data which is output from the imaging information calculation section 74.

The acceleration sensor 701 included in the controller 7 is preferably a three-axial (x, y and z axes) acceleration sensor. The three-axial acceleration sensor 701 detects a linear acceleration in each of three directions, i.e., an up-down direction, a left-right direction, and a front-rear direction. In other embodiments, two-axial acceleration detection means for detecting a linear acceleration in each of only the up-down and left-right directions (or directions along another pair of axes) may be used depending on the type of control signals used for game processing. For example, such a three-axial or two-axial acceleration sensor 701 may be available from Analog Devices, Inc. or STMicroelectronics N.V. The acceleration sensor 701 may be of a static capacitance system (static capacitance coupling system) based on the technology of MEMS (Micro Electro Mechanical Systems) provided by silicon precision processing. Alternatively, the three-axial or two-axial acceleration sensor 701 may be based on an existing acceleration detection technology (e.g., piezoelectric system or piezoelectric resistance system) or any other appropriate technology developed in the future.

As known to those skilled in the art, the acceleration detection means used for the acceleration sensor 701 can detect only an acceleration along a straight line corresponding to each of the axes of the acceleration sensor 701 (linear acceleration). Namely, a direct output from the acceleration sensor 701 is a signal indicating the linear acceleration (static or dynamic) along each of two or three axes thereof. Hence, the acceleration sensor 701 cannot directly detect a physical property such as, for example, a motion along a nonlinear path (e.g., an arc path), rotation, revolution, angular displacement, inclination, position or posture.

Nonetheless, those skilled in the art would easily understand from the description of this specification that further information on the controller 7 can be estimated or calculated (determined) by further processing executed by a computer, for example, the processor of the game apparatus 3 (for example, the CPU 30) or the processor of the controller 7 (microcomputer 751). For example, when the computer executes processing with the premise that the controller 7 including the acceleration sensor 701 is in a static state (i.e., when the computer executes processing with the premise that the acceleration detected by the acceleration sensor 701 includes only a gravitational acceleration), if the controller 7 is actually in a static state, it can be found based on the detected acceleration whether or not the controller 7 is inclined with respect to the direction of gravity, or how much the controller 7 is inclined with respect to the direction of gravity. Specifically, when the detection axis of the acceleration sensor 701 is directed vertically downward, it can be found whether or not the controller 7 is inclined with respect to the direction of gravity based on whether or not 1 G (gravitational acceleration) is applied to the controller 7. It can be found how much the controller 7 is inclined in accordance with the magnitude of the gravitational acceleration. In the case of a multi-axial acceleration sensor, it can be found more precisely how much the controller 7 is inclined with respect to the direction of gravity by processing a signal of acceleration in each axial direction. In this case, the processor may calculate data on the inclining angle of the controller 7 based on the output from the acceleration sensor 701. Alternatively, the processor may estimate the approximate inclining angle based on the output from the acceleration sensor 701 without calculating the data on the inclining angle. Thus, the inclination, posture or position of the controller 7 can be determined by using the acceleration sensor 701 in combination with the processor. When there is the premise that the acceleration sensor 701 is in a dynamic state, an acceleration including a gravitational acceleration component and an acceleration component in accordance with the motion of the acceleration sensor 701 is detected. Therefore, the moving direction of the controller 7 or the like can be found by removing the gravitational acceleration component by predetermined processing. Specifically, when the controller 7 including the acceleration sensor 701 is being moved by the user's hand while being dynamically accelerated, the acceleration signal generated by the acceleration sensor 701 is processed. Thus, various motions and/or position of the controller 7 can be calculated. Even with the premise that the acceleration sensor 701 is in a dynamic state, the inclination of the controller 7 with respect to the direction of gravity can be found by removing the acceleration in accordance with the motion of the acceleration sensor 701 by predetermined processing. In other embodiments, the acceleration sensor 701 may include a built-in signal processing device, or another type of dedicated processing device, for executing desired processing on an acceleration signal which is output from the built-in acceleration detection means, before the signal is output to the microcomputer 751. For example, when the acceleration sensor 701 is for detecting a static acceleration (e.g., a gravitational acceleration), the built-in or dedicated processing device may convert the detected acceleration signal to a corresponding inclination angle (or another preferable parameter).

In other embodiments, a gyrosensor having a built-in rotation element or vibration element may be used as a motion sensor for detecting a motion of the controller 7. One exemplary MEMS gyrosensor usable in this embodiment is available from Analog Devices, Inc. Unlike the acceleration sensor 701, a gyrosensor can directly sense a rotation (or an angular rate) around an axis of at least one gyro element built therein. A gyrosensor and an acceleration sensor are fundamentally different from each other. Therefore, either sensor may be selected in accordance with the use, and an output signal from the selected sensor needs to be processed in a manner appropriate to the selected sensor.

Specifically, when a gyrosensor is used for calculating an inclination or a posture, instead of an acceleration sensor, significant changes are made. More specifically, when a gyrosensor is used, an inclination value is initialized before the detection is started. The angular rate data which is output from the gyrosensor is integrated. Next, an inclination change amount is calculated from the initialized inclination value. In this case, the calculated inclination corresponds to the angle. By contrast, when an acceleration sensor is used, the inclination is calculated by comparing the value of a gravitational acceleration component of each axis with a predetermined reference value. Therefore, the calculated inclination can be represented with a vector. Even without initialization, an absolute direction detected by the acceleration detection means can be obtained. As for the nature of the value calculated as an inclination, the value calculated using a gyrosensor is an angle whereas the value calculated using an acceleration sensor is a vector. Therefore, when a gyrosensor is used instead of an acceleration sensor, the inclination data needs to be converted as predetermined in consideration of the differences between the two devices. The characteristics of a gyrosensor are known to those skilled in the art as well as the basic differences between two devices, and will not be further described in this specification. A gyrosensor is advantageous in directly sensing a rotation, whereas an acceleration sensor is advantageous in generally having a higher cost efficiency when applied to a controller as used in this embodiment.

The communication section 75 includes the microcomputer 751, a memory 752, the wireless module 753, and the antenna 754. The microcomputer 751 controls the wireless module 753 for wirelessly transmitting the transmission data, while using the memory 752 as a storage area during processing. The microcomputer 751 also controls the operation of the sound IC 707 and the vibrator 704 in accordance with the data transmitted from the game apparatus 3 to the wireless module 753 via the antenna 754. The sound IC 707 processes sound data or the like transmitted from the game apparatus 3 via the communication section 75. The microcomputer 751 actuates the vibrator 704 in accordance with, for example, the vibration data (e.g., a signal for turning the vibrator 704 on or off) transmitted from the game apparatus 3 via the communication section 75.

Data from the controller 7 including an operation signal (key data) from the operation section 72, acceleration signals in the three axial directions (x-axis, y-axis and z-axis direction acceleration data) from the acceleration sensor 701, and the processing result data from the imaging information calculation section 74 are output to the microcomputer 751. The microcomputer 751 temporarily stores the input data (key data, acceleration data, and the processing result data) on the memory 752 as transmission data which is to be transmitted to the wireless controller module 19. The wireless transmission from the communication section 75 to the wireless controller module 19 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is, for example, 5 ms. At the transmission timing to the wireless controller module 19, the microcomputer 751 outputs the transmission data stored in the memory 752 as a series of operation information to the wireless module 753. Based on the Bluetooth (registered trademark) technology or the like, the wireless module 753 converts a carrier wave of a predetermined frequency with the operation information and radiates the resultant radio wave signal from the antenna 754. Namely, the key data from the operation section 72, the acceleration data from the acceleration sensor 701, and the processing result data from the imaging information calculation section 74 are modulated by the wireless module 753 into a radio wave signal and transmitted from the controller 7. The wireless controller module 19 of the game apparatus 3 receives the radio wave signal, and the game apparatus 3 demodulates or decodes the radio wave signal to obtain the series of operation information (the key data, the acceleration data, and the processing result data). Based on the obtained operation information and the game program, the CPU 30 of the game apparatus 3 performs the game processing. In the case where the communication section 75 is structured using the Bluetooth (registered trademark) technology, the communication section 75 can have a function of receiving transmission data which is wirelessly transmitted from other devices.

Figure 8:
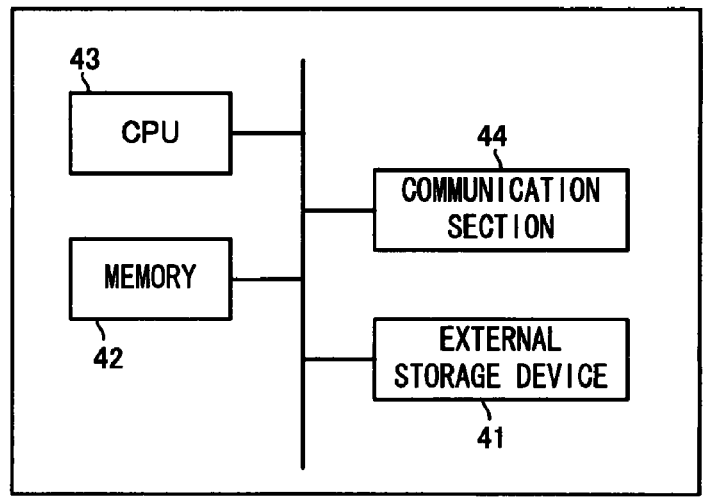
FIG. 8 is a block diagram showing a structure of a distribution server 40 and a matching server 50.

Next, a structure of a distribution server 40 and a matching server 50 according to an embodiment of the present invention will be described. FIG. 8 shows a structure of the distribution server 40 for distributing weather information. The distribution server 40 includes an external storage device 41, a memory 42, a CPU 43 and a communication section 44, which are connected with each other via a bus. The external storage device 41 stores a distribution program, a communication connection control program for connecting the distribution server 40 to each of the game apparatuses for communication, and comprehensive weather data described later. In the distribution program, processing procedures, various instructions and the like to be executed by the CPU 43 are described. The distribution program also includes data for controlling the distribution of the comprehensive weather data described later in accordance with a distribution request signal transmitted from a predetermined game apparatus. The memory 42 is an internal storage device for reading and temporarily storing data, programs and the like which are sent from the external storage device 41 before data is distributed. The memory 42 stores, for example, files of the distribution program and the comprehensive weather data. The CPU 43 is a calculation device or a control device for executing the programs read onto the memory 42. The communication section 44 communicates with the game apparatus 3 or the like via a network. The distribution server 40 may optionally include or be connected to an input/output device such as a keyboard, a mouse of the like, or a display device such as a monitor or the like (not shown).

The matching server 50 for matching a plurality of game apparatuses has substantially the same structure as that of the distribution server 40. When the server having the structure shown in FIG. 8 is used as the matching server 50, the external storage device 41 stores a matching program, a host list described later and the like. The memory 42 acts as an internal storage device for reading and temporarily storing data, programs and the like which are sent from the external storage device 41 before matching is executed. The memory 42 stores, for example, files of the matching program and the host list. The CPU 43 acts as a calculation device or a control device for executing the programs read onto the memory 42. The communication section 44 communicates with the game apparatus 3 or the like via a network. The matching server 50 may optionally include or be connected to an input/output device such as a keyboard, a mouse of the like, or a display device such as a monitor or the like (not shown).

First Embodiment

An overview of a game playable according to a first embodiment of the present invention will be described. In this embodiment, an on-line fighting game is played. In this game, a player of the game apparatus 3 can fight against a player of another game apparatus connected to the game apparatus 3 via a network, one to one. On a stage (virtual space) of the game, the weather of the region where the opponent of the fight lives can be reflected. For example, it is assumed that a player living in Osaka asks a player living in Hokkaido to fight. It is also assumed that the weather in Osaka is fine and it snows in Hokkaido. The stage of the fight is a virtual space reflecting a predetermined historical sight in Hokkaido, and the weather in an initial state of the game is set to be fine. The stage of the fight is represented as having accumulated snow or falling snow. The player in Osaka feels as if he/she was fighting in Hokkaido where it is snowing although the weather is fine in Osaka.

Figure 9:
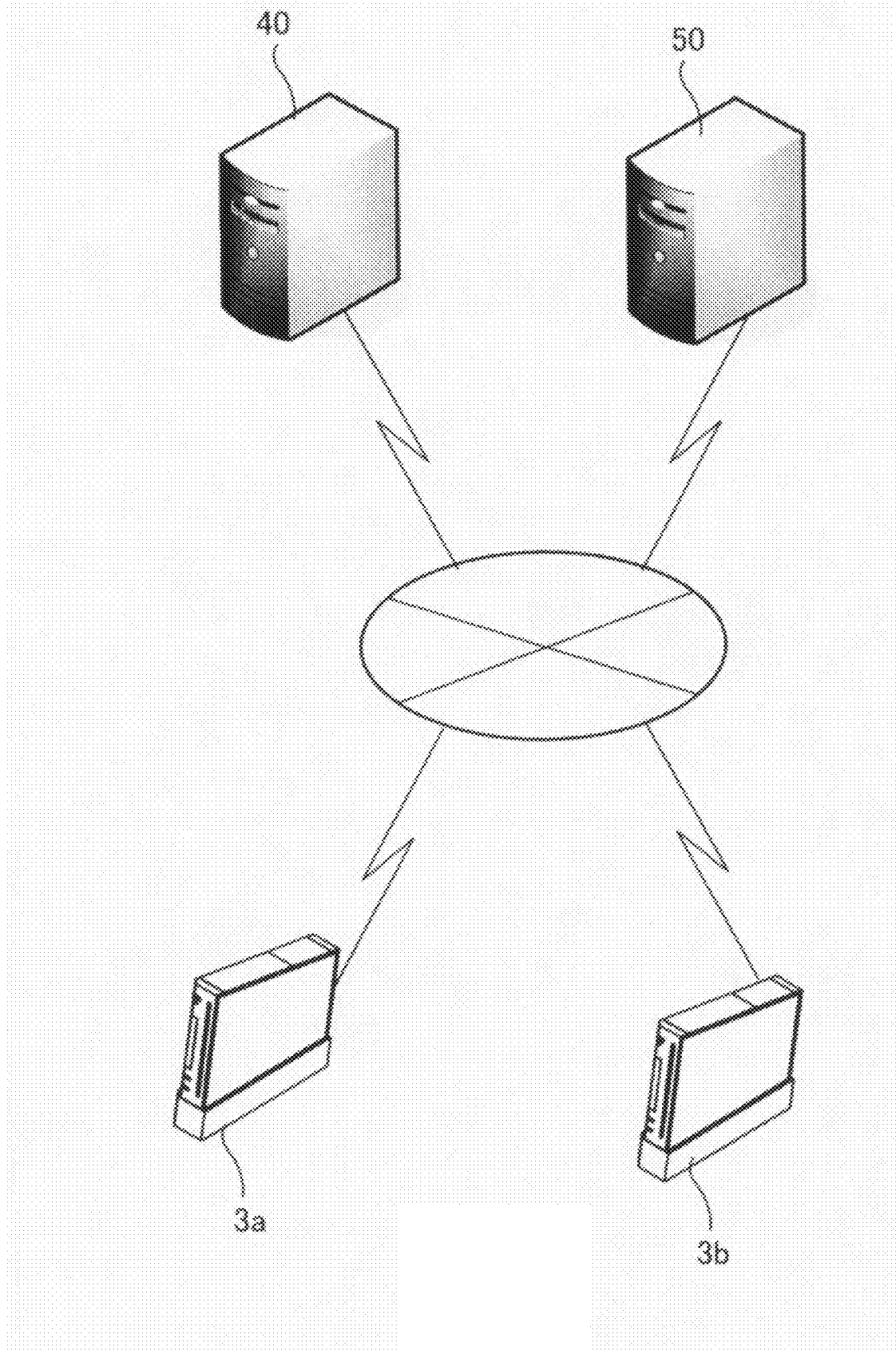
FIG. 9 shows a network structure according to a first embodiment of the present invention.

FIG. 9 shows a network structure according to the first embodiment. In the example shown in FIG. 9, the distribution server 40, the matching server 50, a first game apparatus 3a and a second game apparatus 3b are connected to the network. This network is of the fulltime connection type, in which the servers and the game apparatuses are connected with each other full time. The game apparatuses 3a and 3b are in an ON state full time, including the time period in which the game apparatuses 3a and 3b are in the low power standby mode described above.

First, the distribution server 40 will be described. The distribution server 40 distributes meteorological information of various countries in the world observed at predetermined observation points to game apparatuses, for which a predetermined distribution contract (for example, the so-called paid service) has been concluded, as comprehensive weather data. Here, it is assumed that the owner of only the first game apparatus 3a has concluded the predetermined distribution contract. The first game apparatus 3a receives the comprehensive weather data at an interval of, for example, one hour. The comprehensive weather data includes meteorological information of various countries in the world observed at a certain time.

The matching server 50 is used by the first game apparatus 3a or the second game apparatus 3b for finding an opponent of the on-line fighting game. The matching server 50 matches the first game apparatus 3a and the second game apparatus 3b such that the game apparatuses 3a and 3b can play an on-line game one to one.

The first game apparatus 3a and the second game apparatus 3b are each owned by a respective player. The first game apparatus 3a is set so as to receive the meteorological information from the distribution server 40 based on the distribution contract. Namely, information on the region where the first game apparatus 3a is located (i.e., the region where the owner of the first game apparatus 3a lives; hereinafter, such information will be referred to as "region information") is preset on the flash memory 17 of the first game apparatus 3a before any information is distributed. The second game apparatus 3b does not receive any information from the distribution server 40 because the owner of the second game apparatus 3b has not concluded such a distribution contract. In the first embodiment, under such an environment, the first game apparatus 3a and the second game apparatus 3b play the on-line fighting game one to one.

Figure 10:
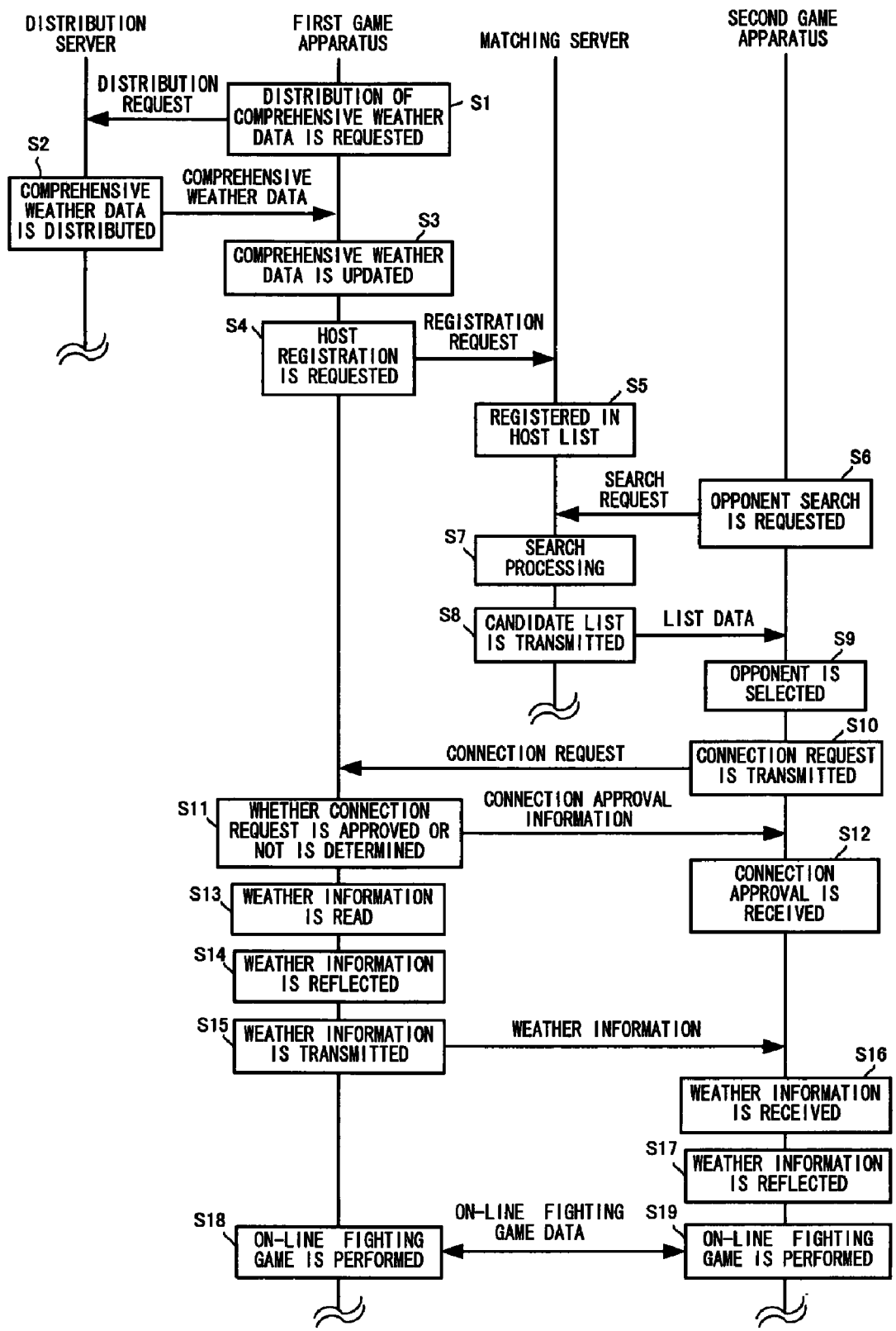
FIG. 10 shows an overview of a flow of communication for an on-line fighting game according to the first embodiment.

FIG. 10 shows an overview of a flow of communication for the on-line fighting game in the first embodiment. First, the first game apparatus 3a makes a distribution request for the comprehensive weather data to the server 40 (S1). In response to this, the distribution server 40 distributes the comprehensive weather data to the first game apparatus 3a (S2). The first game apparatus 3a receives the comprehensive weather data, and stores the data on a nonvolatile memory provided therein (flash memory 17). When comprehensive weather data is already stored, such data is updated with the newly received comprehensive weather data (S3).

Then, the first game apparatus 3a transmits a host registration request to the matching server 50 (S4) in order to indicate that the game apparatus 3a is waiting for a connection request from other apparatuses (possible opponents). Namely, the first game apparatus 3a is in a position of passively waiting for a connection request (the first game apparatus 3a is also in a position of transmitting weather information as described later). Hereinafter, an apparatus in a position of passively waiting for a connection request from another game apparatus will be referred to as a "host apparatus". Together with the host registration request, the first game apparatus 3a transmits game data on the player (the number of times that the player has played the game, his/her winning ratio, etc.) which is usable as a condition for matching.

Next, the matching server 50 registers the first game apparatus 3a in a list of host apparatuses stored on a memory thereof (hereinafter, referred to as a "host list") (S5). At this point, the matching server 50 also registers the network address or other information on the first game apparatus 3a included in the host registration request and necessary for the connection. The game data on the player is also registered.

Next, the second game apparatus 3b transmits an opponent search request to the matching server 50 in accordance with an operation performed by the player thereof (S6). The player can optionally designate a search condition. The second game apparatus 3b is in a position of actively applying to another game apparatus (host apparatus) for a connection (the second game apparatus 3b is also in a position of receiving the weather information as described later). Hereinafter, an apparatus in a position of actively applying to another game apparatus for a connection will be referred to as a "guest apparatus".

Upon receiving the opponent search request from the second game apparatus 3b, the matching server 50 retrieves opponent candidates from the host list in accordance with the request (when a search condition is designated, in accordance with the condition) (S7), and transmits the results as the candidate list to the game apparatus 3b (S8). In this example, the first game apparatus 3a is included in the candidate list. The network address of the first game apparatus 3a is also included in the list.

Upon receiving the candidate list, the second game apparatus 3b displays the candidate list on the screen, and selects the first game apparatus 3a as the opponent in accordance with a selection operation performed by the player (S9). Then, the second game apparatus 3b transmits a connection request to the network address of the first game apparatus 3a included in the candidate list (S10). The connection request is, for example, a packet in which the SYN bit is ON, for requesting establishment of an "upstream connection" from the second game apparatus 3b to the first game apparatus 3a.

In response to the connection request, the first game apparatus 3a determines whether or not to permit the connection (S11). In this example, the connection is permitted. The first game apparatus 3a transmits connection approval information (for example, a packet in which the ACK bit is ON) indicating that the connection has been permitted to the second game apparatus 3b. The connection approval information includes a connection request (for example, a packet in which the SYN bit is ON) which requests establishment of a "downstream connection" from the first game apparatus 3a to the second game apparatus 3b. The second game apparatus 3b receives the connection approval information (S12).

Although not shown in FIG. 10, the second game apparatus 3*b* transmits an approval response (for example, a packet in which the ACK bit is ON) to the request for establishment of the "downstream connection" included in the connection approval information. Thus, the connection for the on-line fighting game is established between the first game apparatus 3*a* and the second game apparatus 3*b*. As a communication protocol between the first game apparatus 3*a* and the second game apparatus 3*b*, a connectionless communication such as, for example, UDP (User Datagram Protocol) may be used with the priority being put on the processing speed.

Then, the first game apparatus 3*a* searches for and obtains weather information (fine, cloudy, raining, etc.) of the region, which is set in the first game apparatus 3*a*, from the comprehensive weather data received from the distribution server 40 (S13). The first game apparatus 3*a* reflects the obtained weather information on the game processing (S14). For example, when the weather information represents "raining", the first game apparatus 3*a* causes rain to fall in the stage (virtual space) of the fight.

The first game apparatus 3*a* transmits the weather information to the second game apparatus 3*b* (S15). Thus, the second game apparatus 3*b* receives the weather information (S16).

Then, the second game apparatus 3*b* reflects the received weather information on the game processing (S17). For example, when the weather information represents "raining", the second game apparatus 3*b* causes rain to fall in the stage (virtual space) of the fight.

The first and second game apparatuses 3*a* and 3*b* fight against each other while transmitting and receiving game data, for example, operation data or the like (S18, S19). As a result, the game apparatuses 3*a* and 3*b* both play the fighting game using virtual space having falling rain. Therefore, the second game apparatus 3*b* fights in the virtual stage having falling rain even if the weather is fine in the region where the second game apparatus 3*b* is located. The player of the second game apparatus 3*b* feels as if he/she was fighting in the region where the first game apparatus 3*a* is located, away from home.

Figure 11:
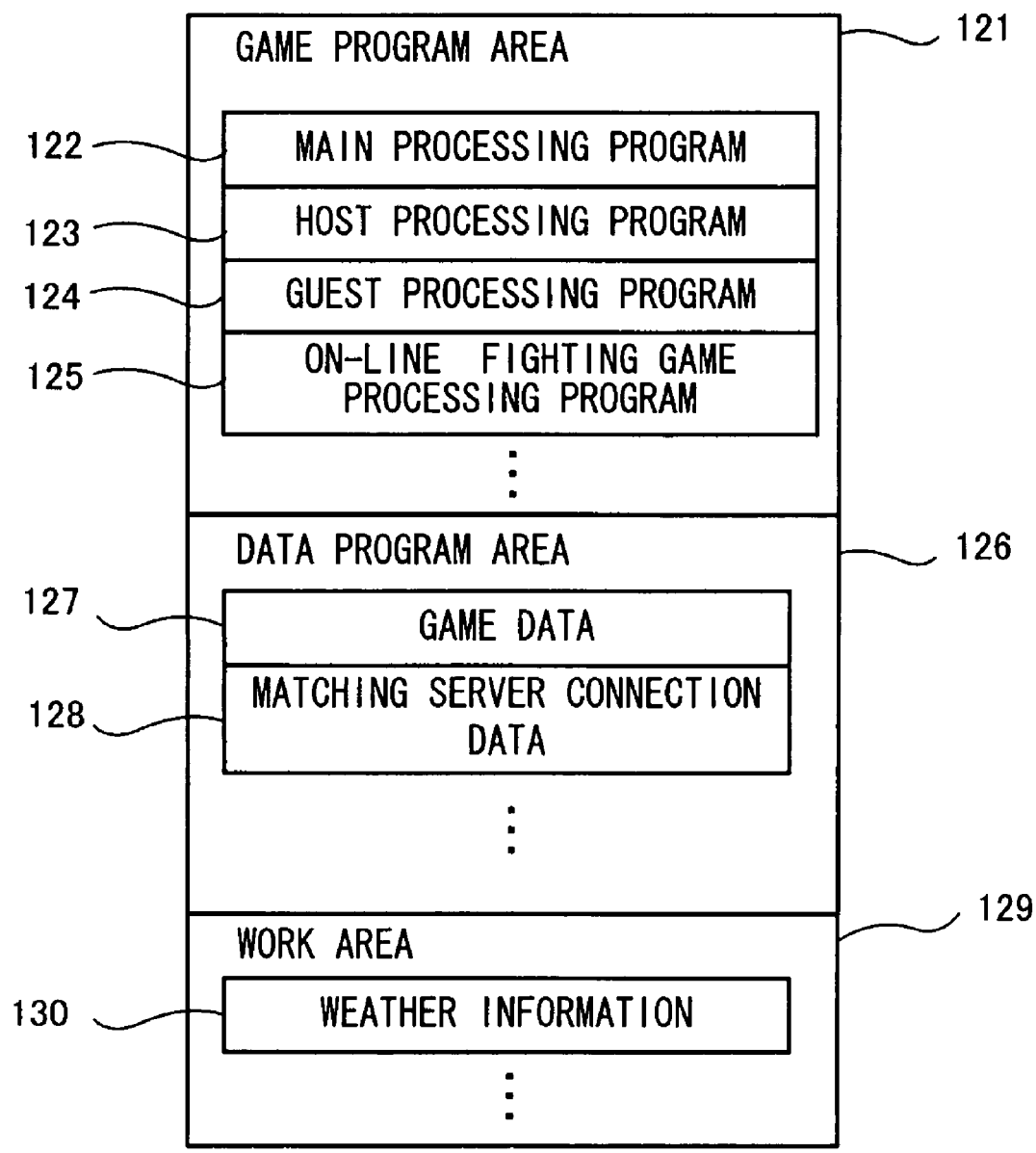
FIG. 11 is a memory map of an external main memory 12.

Now, various data used in this embodiment will be described. First, data used by each game apparatus 3 will be described. FIG. 11 is a memory map of the external main memory 12 shown in FIG. 2. As shown in FIG. 11, the external main memory 12 includes a game program area 121, a data storage area 126, and a work area 129. Data in the game program area 121 and the data storage area 126 has been copied from the optical disc 4 before the game processing.

In the game program area 121, a main program 122, a host processing program 123, a guest processing program 124, and an on-line fighting game processing program 125 are stored, which are used by the CPU 10 to execute processing shown in, for example, the flowcharts in FIG. 22 through FIG. 26. Although not shown, various other programs necessary for the game processing are stored in the game program area 121. In the data storage area 126, game data 127 necessary for playing the on-line fighting game, and matching server connection data 128 including various types of information for connecting the game apparatus 3 to the matching server 50, are stored. The game data 127 includes, for example, virtual space (stage) data in which the fight is to be performed and character object data. The matching server connection data 128 includes, for example, information on a network address of the matching server 50 and a port number used for the connection.

The work area 129 is an area where data to be temporarily used in the fighting game processing is stored. In the work area 129, weather information 130 is stored. The weather information 130 is obtained by copying weather information 1762 of a weather information master 176 as described later.

Figure 12:
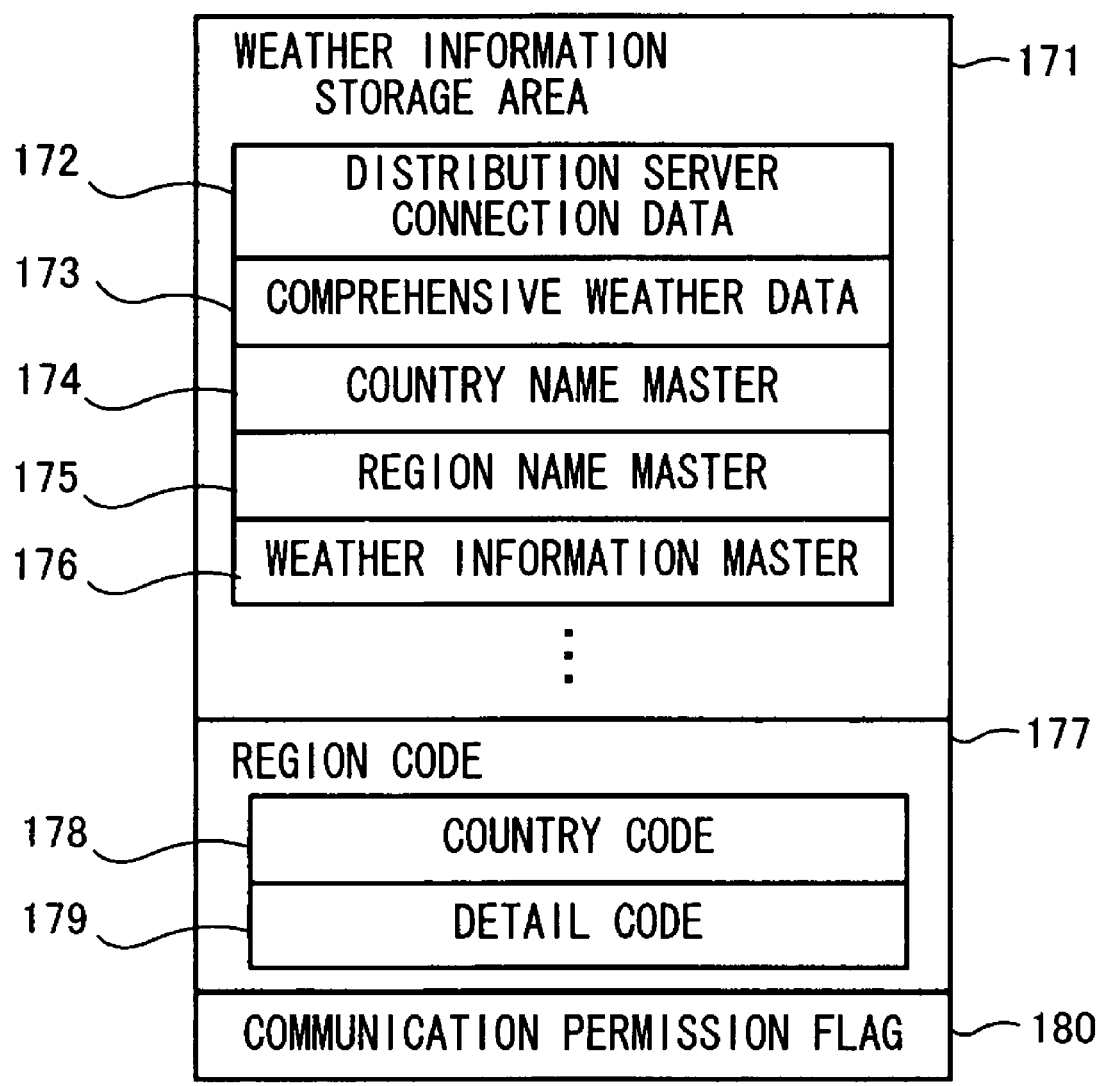
FIG. 12 is a memory map of a flash memory 17.

FIG. 12 is a memory map of the flash memory 17 shown in FIG. 2. Since the flash memory 17 is nonvolatile as described above, the following data is not erased even when the game apparatus 3 is turned off. As shown in FIG. 12, the flash memory 17 includes a weather data storage area 171, a region code 177, and a communication permission flag 180. In the weather data storage area 171, distribution server connection data 172, comprehensive weather data 173, a country name master 174, a region name master 175, a weather information master 176 and other data are stored. These types of data may be transferred to, and stored on, the external main memory 12 for executing the game program. Herein, these pieces of data are shown as stored in a table format for the sake of explanation. It is not absolutely necessary that the table format is used, and it is sufficient if these pieces of data are stored in a form equivalent to the table in the game program.

The distribution server connection data 172 is data for allowing the game apparatus 3 to be connected with the distribution server 40 (i.e., the distribution server connection data 172 includes the network address, the user ID, the password and the like of the distribution server 40). When the game apparatus 3 is to be periodically connected to the distribution server 40, the distribution server connection data 172 includes information on the time when to connect the game apparatus 3 to the distribution server 40 (for example, 6:00 a.m. daily) as scheduling information.

The comprehensive weather data 173 shows the world weather by region (generally, by observation point). FIG. 13 shows an exemplary data structure of the comprehensive weather data 173. The comprehensive weather data 173 is a set of a region code 1731 and a weather code 1732. The region code 1731 is a set of a country code 1733 and a detail code 1734. The country code 1733 represents a country such as, for example, U.S.A. or Japan. The country code 1733 corresponds to a country code 1741 of the country name master 174 described below. The detail code 1734, when combined with the country code 1733, specifies a region in the country, for example, "Tokyo" or "Osaka" in "Japan" or "Washington" or "California" in "U.S.A."

FIG. 14 shows an exemplary data structure of the country name master 174. The country name master 174 represents a specific name of the country specified by the country code 1733. The country name master 174 is a set of a country code 1741 and a country name 1742. The country code 1741 corresponds to the country code 1733 of the comprehensive weather data 173.

FIG. 15 shows an exemplary data structure of the region name master 175. The region name master 175 represents a specific name of the region specified by the region code 1731 (a set of the country code 1733 and the detail code 1734). The region name master 175 is a set of a region code 1751 (including a country code 1752 and a detail code 1753) corresponding to the region code 1731 of the comprehensive weather data 173 and a region name 1754.

FIG. 16 shows an exemplary data structure of the weather information master 176. The weather information master 176 represents a specific state of the weather specified by the weather code 1732. The weather information master 176 is a set of a weather code 1761 and weather information 1762. The weather information 1762 represents the specific state of the weather.

Returning to FIG. 12, the region code 177 represents the region in which the game apparatus 3 is located (generally, the address of the owner of the game apparatus 3). The region code 177 corresponds to the region code 1731 of the comprehensive weather data 173, and is a combination of a country code 178 and a detail code 179.

Various types of data stored in the weather data storage area 171 are provided to be used in, for example, a dedicated application such as meteorological information service application or the like. The meteorological information service application is stored on the flash memory 17, and is transferred to the external main memory 12 and executed when a menu application (not shown; stored on the flash memory 17) instructs the start of the application. In this manner, the meteorological information service application provides the player with the meteorological information such as weather forecast or the like. In this embodiment, however, the data provided for the meteorological information service application is used for the on-line fighting game or the like.

Now, setting and change of the region code 177 will be described. As described above, the region code 177 is a combination of the country code 178 and the detail code 179. The country code 178 is set by the manufacturer before the game apparatus 3 is shipped, such that the user cannot change the country code 178. The detail code 179 is set so as to be changeable by the user. For example, in the game apparatus 3 shipped to the Japanese market, the country code 178 is fixed to a value representing "Japan". The player who has obtained the game apparatus 3 sets the detail code 179 to a value representing the region where he/she lives. The player is allowed to change the setting only by using the meteorological information service application, not the on-line fighting game program. Thus, unnecessary change of data can be prevented.

The communication permission flag 180 shows whether or not to permit the game apparatus 3 to communicate with another game apparatus 3. When the communication permission flag 180 is on, the game apparatus 3 can communicate with another game apparatus 3. When the communication permission flag 180 is off, the game apparatus 3 cannot communicate with another game apparatus 3. When the communication permission flag 180 is off, the on-line fighting game cannot be played even if executed by the game apparatus 3. The communication permission flag 180 can be turned on or off using a dedicated application (not shown) used for various settings of the game apparatus 3, which can be started by the menu application.

Figure 17:
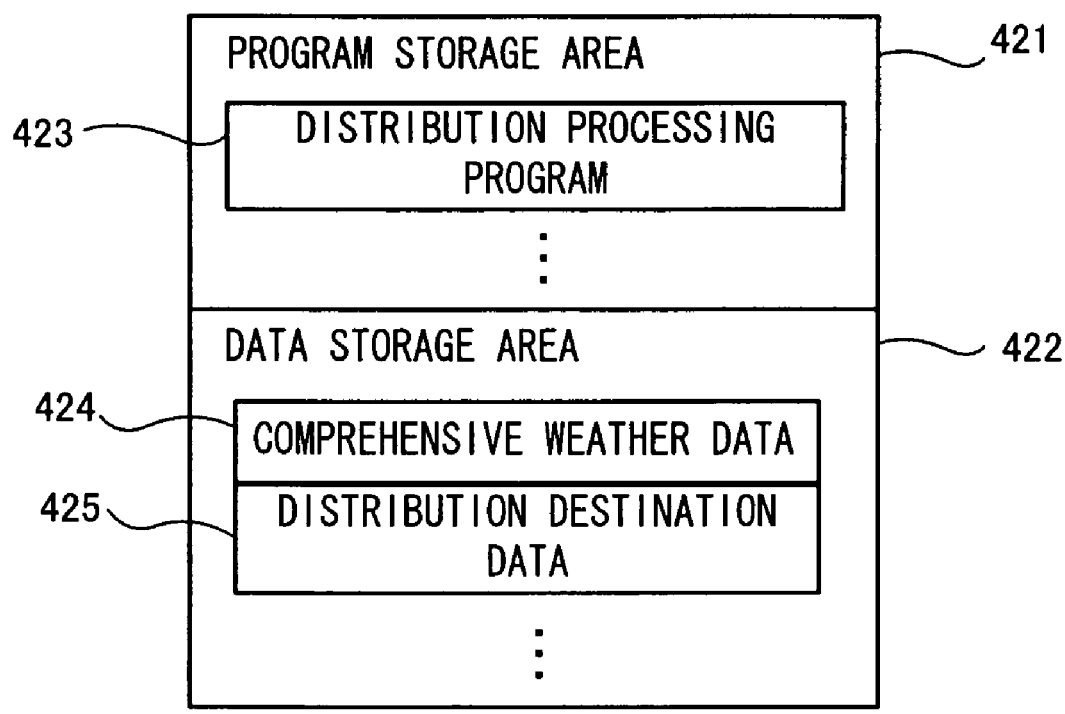
FIG. 17 is a memory map of a memory 42*a* of the distribution server 40.

Next, data used by the distribution server 40 will be described. FIG. 17 is a memory map of a memory 42a in the distribution server 40. The memory 42a includes a program storage area 421 and a data storage area 422. In the program storage area 421, a distribution processing program 423 for distributing the weather data and the like are stored. In the data storage area 422, comprehensive weather data 424, distribution destination data 425 and the like are stored.

The comprehensive weather data 424 is generated in the distribution server 40 based on observation data obtained at a predetermined observation point and transmitted from another server (not shown) or the like. Based on the comprehensive weather data 424, the comprehensive weather data 173 stored on the game apparatus 3 is generated. The layout and contents of the comprehensive weather data 424 are substantially the same as those of the comprehensive weather data 173 and will not be described in detail. The distribution destination data 425 includes a network address and the like of the game apparatus 3 to which the comprehensive weather data 424 is to be distributed.

Figures 18, 19:
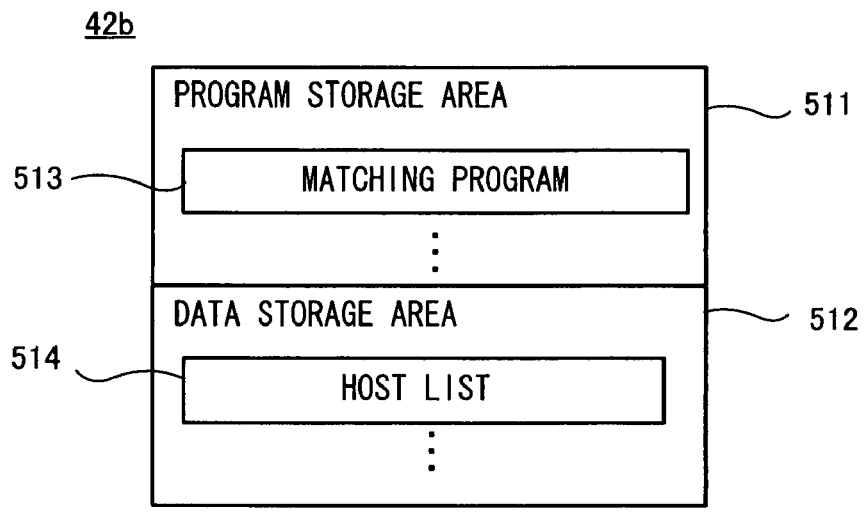
FIG. 18 is a memory map of a memory 42*b* of the matching server 50.
FIG. 19 shows an exemplary data structure of a host list 514.

Next, data used by the matching server 50 will be described. FIG. 18 is a memory map of a memory 42b in the matching server 50. The memory 42b includes a program storage area 511 and a data storage area 512. In the program storage area 511, a matching program 513 for executing matching processing and the like are stored. In the data storage area 512, a host list 514 and the like are stored.

As shown in FIG. 19, the host list 514 is a set of an apparatus name 5141, address information 5142, and player data 5143. The apparatus name 5141 is a name which is set for each game apparatus 3 by the respective player. The address information 5142 is necessary for the matching server 50 to communicable with the game apparatuses 3. The address information 5142 includes, for example, an IP address of the router of the household in which the game apparatus 3 is located, a port number to be used for the on-line fighting game, and a MAC address inherent to each game apparatus 3. The player data 5143 is game data on the player, which is usable as a condition for matching, for example, the number of times the player has played the game or his/her winning ratio.

Now, with reference to FIG. 20 through FIG. 26, on-line fighting game processing according to the first embodiment will be described. In this embodiment, the game apparatuses 3 are connected with each other full time via a fulltime connection type network. Each game apparatus 3 is in an ON state full time, including the time period in which each game apparatus 3 is in the low power standby mode.

An operation by the first game apparatus 3a of obtaining comprehensive weather data from the distribution server 40 (corresponding to S1 through S3 in FIG. 10) will be first described, and then the processing executed by the first game apparatus 3a and the second game apparatus 3b (corresponding to S4 et seq. in FIG. 10) will be described. For the sake of convenience, the first game apparatus 3a will be referred to as a "host apparatus", and the second game apparatus 3b will be referred to as a "guest apparatus".

Figure 20:
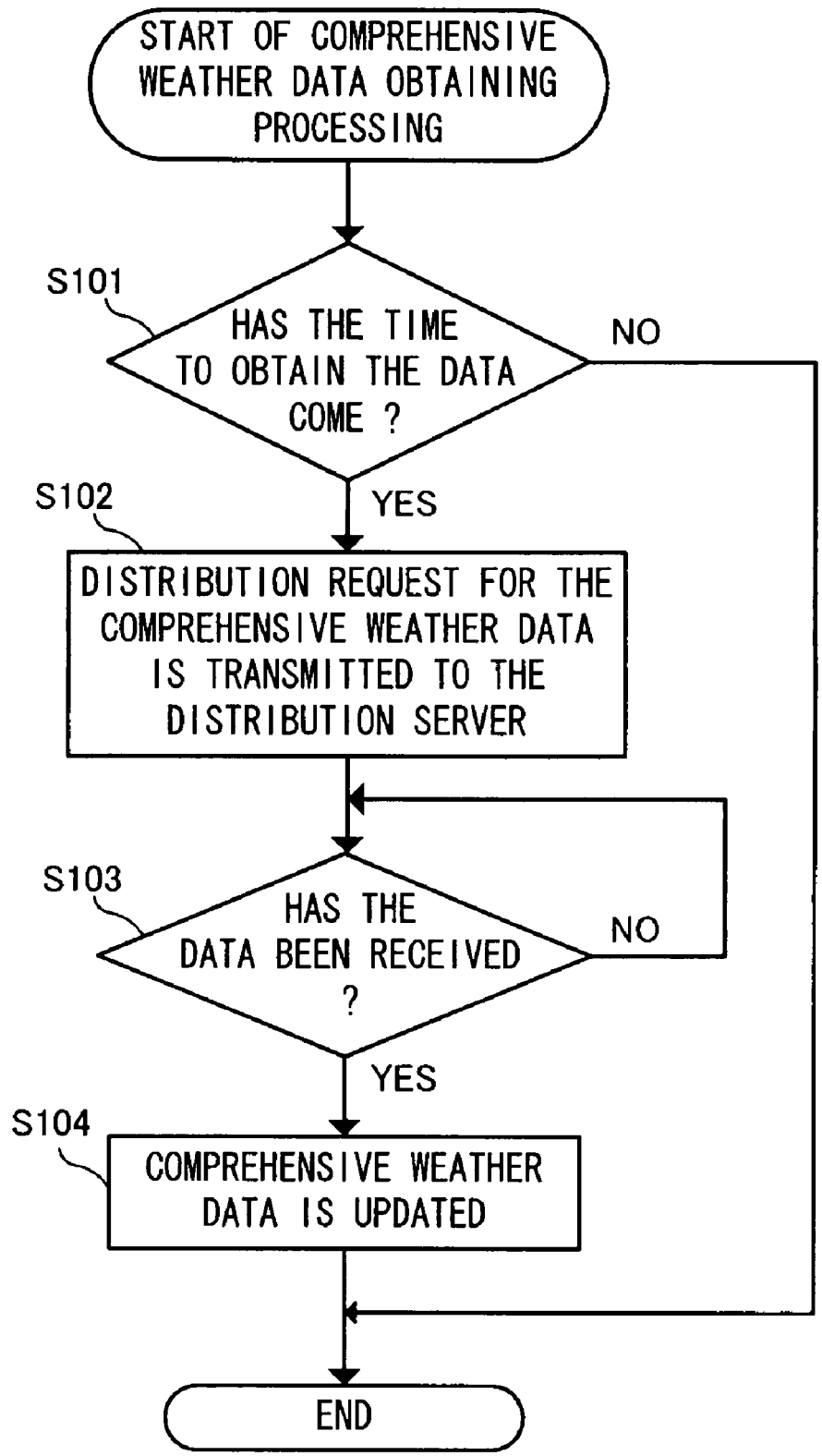
FIG. 20 is a flowchart illustrating comprehensive weather data obtaining processing.
Figure 21:
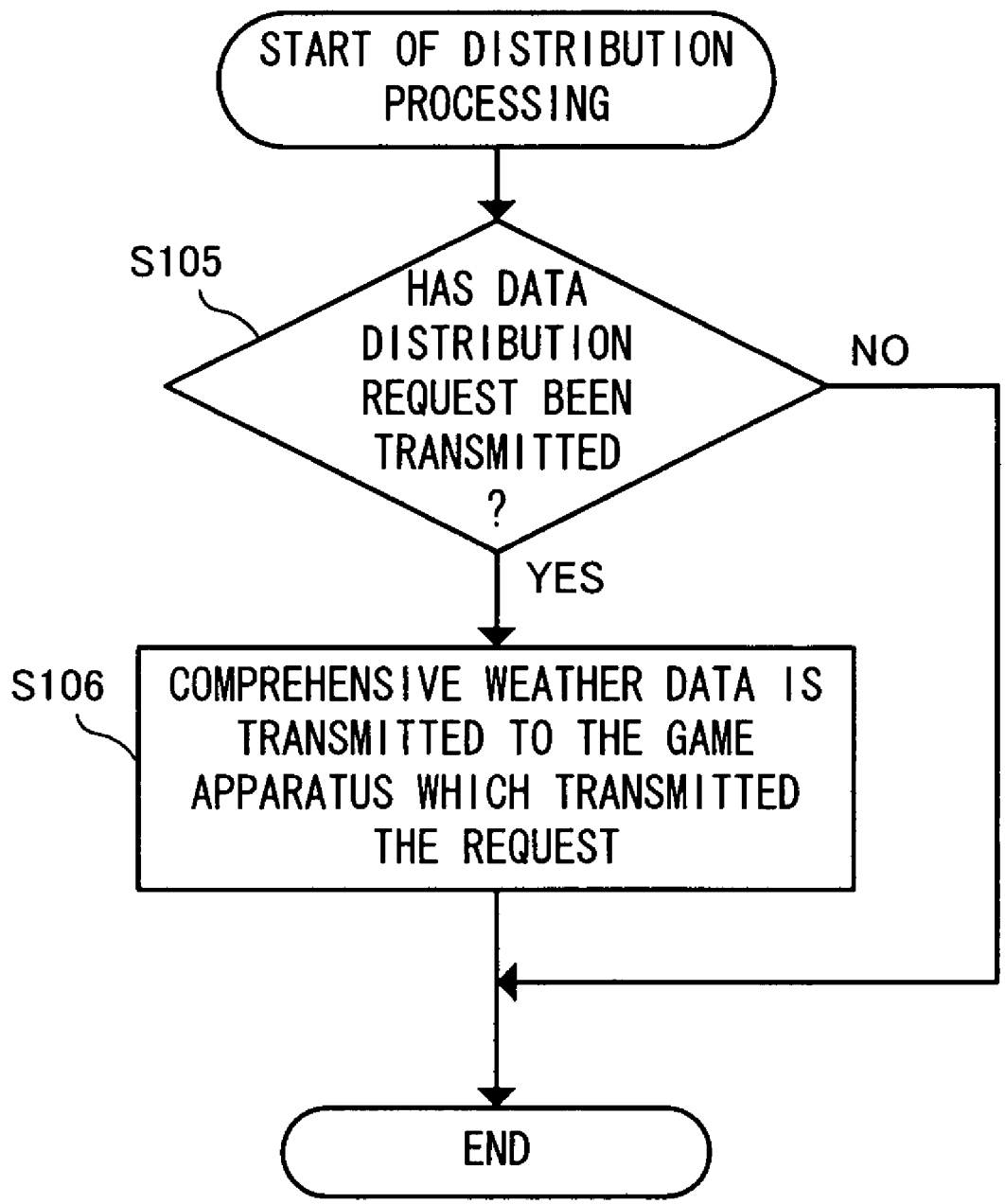
FIG. 21 is a flowchart illustrating distribution processing.

FIG. 20 is a flowchart illustrating comprehensive weather data obtaining processing executed by the host apparatus. FIG. 21 is a flowchart illustrating distribution processing executed by the distribution server 40.

First, the CPU 10 of the host apparatus determines whether or not the time to obtain the comprehensive weather data 173 (for example, 7:00 a.m.) has come based on a built-in clock (not shown) and predetermined scheduling information (step S101).

When the time to obtain the comprehensive weather data 173 has not come yet (NO in step S101), the processing is terminated. When the time has come (YES in step S101), the CPU 10 makes a distribution request to the destination server 40 (step S102). The processing in step S102 will be described more specifically. The CPU generates data representing the distribution request (for example, a network packet). Then, the CPU 10 reads, from the flash memory 17, connection information for connecting the host apparatus to the distribution server 40. Based on the connection information, the CPU 10 accesses the distribution server 40 via the wireless communication module 18. The CPU 10 then transmits the data representing the distribution request to the distribution server 40. In response to the distribution request, the distribution server 40 distributes the comprehensive weather data 424 stored on the memory 42a of the distribution server 40 (step S106 in FIG. 21 described later).

Then, the CPU 10 determines whether or not the comprehensive weather data 424 transmitted from the distribution server 40 has been completely received (step S103). When the comprehensive weather data 424 has not been completely received (NO in step S103), the CPU 10 waits until the data 424 is completely received. When the comprehensive weather data 424 has completely been received (YES in step S103), the CPU 10 updates the comprehensive weather data 173 stored on the flash memory 17 with the received comprehensive weather data 424 (step S104). Thus, the comprehensive weather data obtaining processing by the host apparatus is terminated.

With reference to FIG. 21, the distribution processing executed by the distribution server 40 will be described. As shown in FIG. 21, the CPU 43 of the distribution server 40 determines whether or not a distribution request has been transmitted from either game apparatus 3 (step S105). When no distribution request has been transmitted (NO in step S105), the distribution processing is terminated. When a distribution request has been transmitted (YES in step S105), the CPU 43 executes predetermined authentication processing, and then reads the comprehensive weather data 424 from the memory 42 and transmits the comprehensive weather data 424 to the game apparatus 3 which transmitted the distribution request (step S106). Thus, the distribution processing by the distribution server 40 is terminated.

Figure 22:
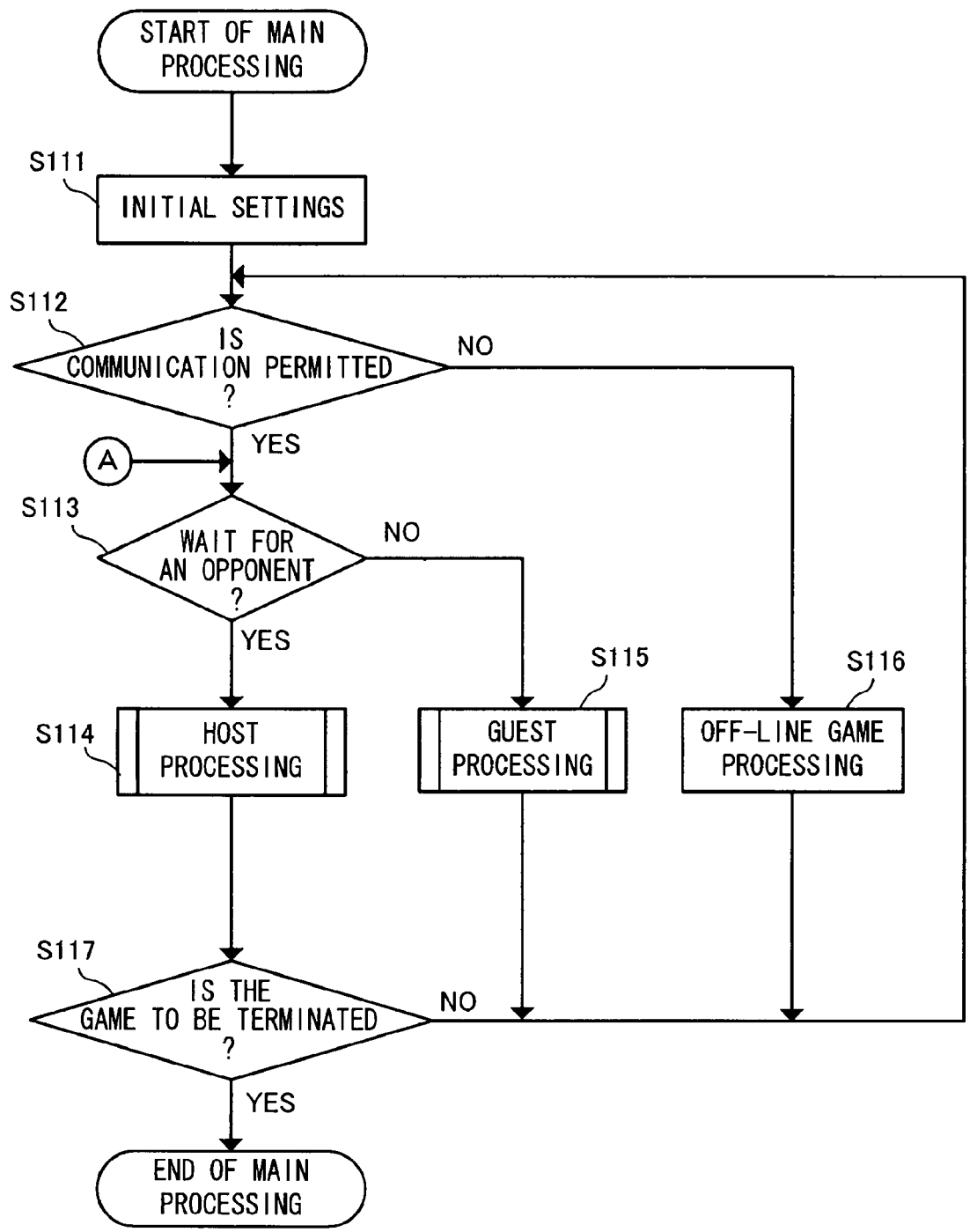
FIG. 22 is a flowchart illustrating on-line fighting game processing executed by the game apparatus 3 in the first embodiment.

Now, the on-line fighting game processing executed between the host apparatus and the guest apparatus will be described. FIG. 22 is a flowchart illustrating the on-line fighting game processing (main processing) executed by the game apparatus 3 according to the first embodiment. The processing shown in FIG. 22 is executed both by the host apparatus and the guest apparatus. Depending on the result of step S113, the game apparatus 3 executes the processing in step S114 as a host apparatus or S115 as a guest apparatus. Namely, the game apparatuses 3 executes the common on-line fighting game program, but may be a host apparatus or a guest apparatus in accordance with the processing executed by each game apparatus 3.

When an operation by the player instructs to start the execution of the on-line fighting game program according to this embodiment, the on-line fighting game program stored on the optical disc 4 is read onto the external main memory 12, and the CPU 10 starts the execution of the game program. The flowchart in FIG. 22 shows the game processing executed after such processing is completed. As shown in FIG. 22, the CPU 10 executes initial setting processing of initializing various types of data, flags and the like (step S111).

Next, the CPU 10 refers to the communication permission flag 180 stored on the flash memory 17 to determine whether or not the game apparatus 3 of its own is set to permit the communication with another game apparatus (step S112). When the communication is not permitted (NO in step S112), the CPU 10 executes off-line game processing (step S116). The off-line game processing is, for example, game processing for allowing the player to play by himself/herself without communication with another player, i.e., another game apparatus (e.g., single play mode).

When the communication is permitted (YES in step S112), the CPU 10 determines whether or not to wait for a connection request based on the instruction of the player (step S113). Namely, the CPU 10 determines whether to wait as a host apparatus for a fight request (connection request) from another player (another game apparatus) or to make a fight request as a guest apparatus to another player.

When the CPU 10 determines to wait for a connection request (YES in step S113), the game apparatus 3 having the CPU 10 acts as a host apparatus, and the CPU 10 executes host processing (step S114). The host processing will be described later in detail. When the CPU 10 determines not to wait for a connection request (NO in step S113), the game apparatus 3 having the CPU 10 acts as a guest apparatus, and the CPU 10 executes guest processing (step S115). The guest processing will be described later in detail. Namely, in accordance with the determination result of step S113, it is determined whether the game apparatus 3 acts as a host apparatus or a guest apparatus.

Based on an instruction by the player or the like, the CPU 10 determines whether or not to terminate the on-line fighting game (step S117). When the game is to be terminated (YES in step S117), the CPU 10 terminates the game processing. When the game is not to be terminated (NO in step S117), the CPU 10 returns the processing to step S112 to repeat the above-described processing.

Figure 23:
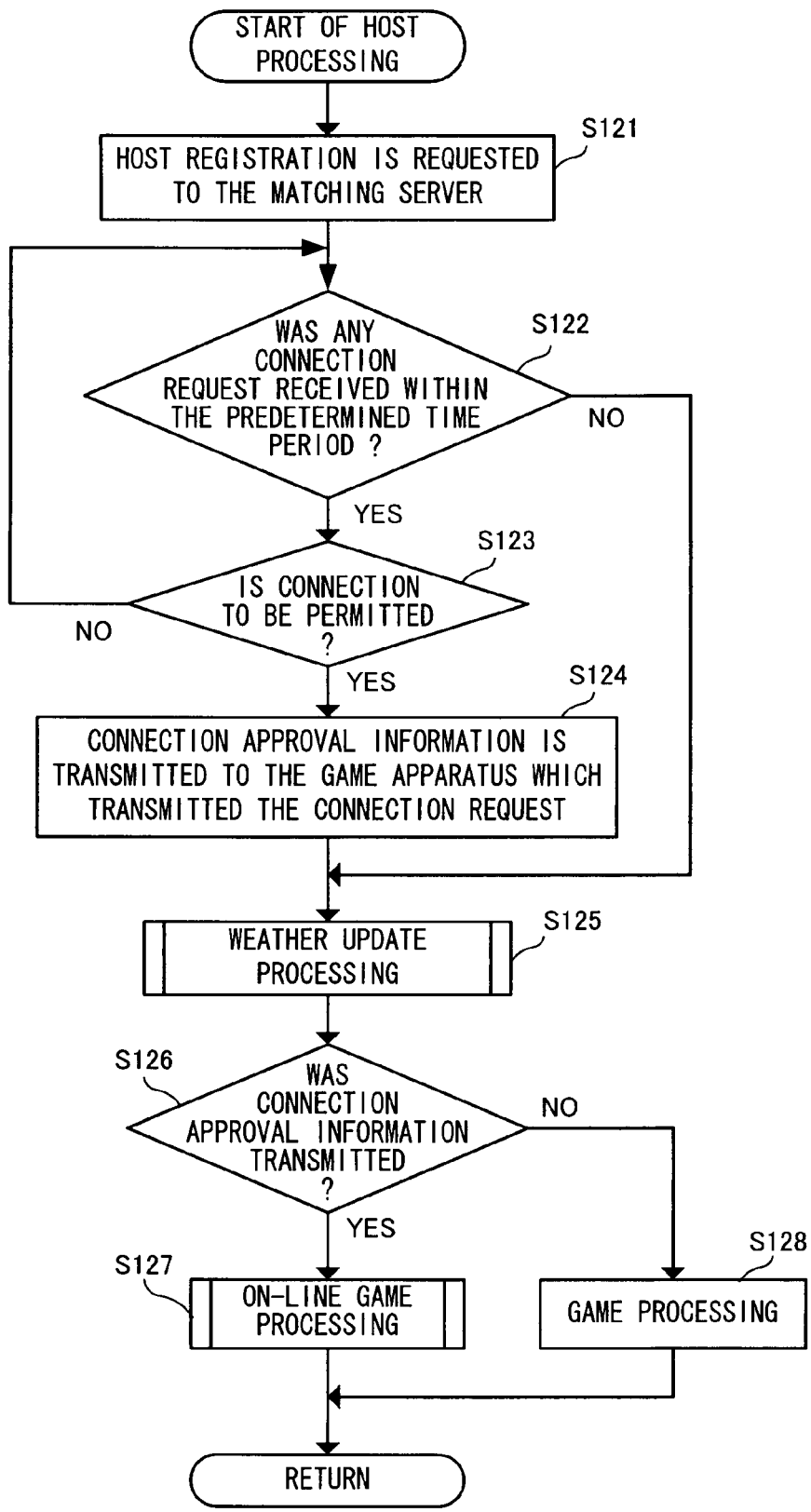
FIG. 23 is a flowchart illustrating host processing in step S114 shown in FIG. 22 in detail.

Now, the host processing in step S114 will be described. FIG. 23 is a flowchart illustrating the host processing in step S114 in detail. As shown in FIG. 23, the CPU 10 makes a host registration request to the matching server 50 (step S121). This processing, which corresponds to the processing in S4 in FIG. 10, will be described more specifically. The CPU 10 reads the matching server connection data 128 from the external main memory 12. Based on the data 128, the CPU 10 connects its own game apparatus 3 to the matching server 50 and transmits the host registration request data. The host registration request data includes, for example, a network address of the game apparatus 3 of its own and a port number used for the on-line fighting game. The host registration request data also includes information such as the number of times that the player requesting the host registration has played the game, his/her winning ratio and the like. In response to this, the matching server 50 registers the game apparatus 3 based on the received host registration request data in the host list 514 stored on the memory 42 (corresponding to the processing in S5 in FIG. 10).

After the matching server 50 registers the host apparatus, the CPU 10 of the host apparatus waits in a state of capable of receiving a connection request. The CPU 10 determines whether or not any connection request was received within a predetermined time period (step S122). When a connection request was received within the predetermined time period (YES in step S122), the CPU 10 determines whether or not to permit the connection with the game apparatus 3 which transmitted the connection request, i.e., a guest apparatus, for the on-line fighting game (step S123; corresponding to the processing in step S11 in FIG. 10). One example of the case where the connection is not permitted is when the game apparatus 3 which transmitted the connection request is not a game apparatus registered in a list called a "friend list", which includes only the friends of the player (for example, stored on the flash memory 17). Another example of the case where the connection is not permitted is that when the player has a plan to fight against a particular player but a different player transmitted a connection request. Each time a connection request is received, the information on the game apparatus which transmitted the request is displayed on the screen of the host apparatus. If the request is not from the game apparatus of the particular player, the host apparatus rejects the connection request.

When the CPU 10 determines not to permit the connection in step S123 (NO in step S123), the CPU 10 returns the processing to step S122 to repeat the above-described processing. When the CPU 10 determines to permit the connection in step S123 (YES in step S123), the CPU 10 transmits connection approval information indicating that the connection is permitted to the game apparatus 3 which transmitted the connection request (step S124).

Figure 24:
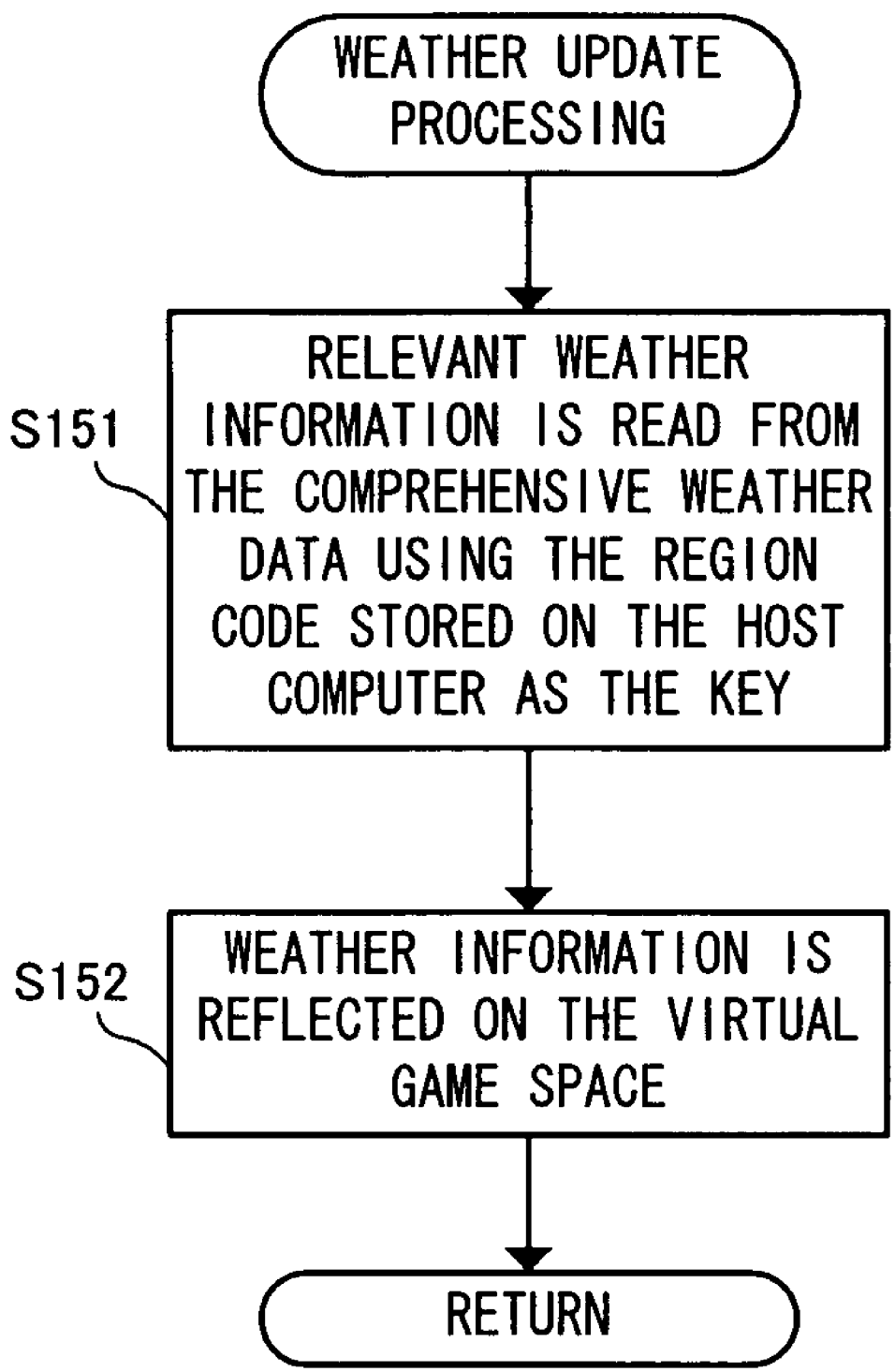
FIG. 24 is a flowchart illustrating weather update processing in step S125 shown in FIG. 23 in detail.

After the connection approval information is transmitted, or when it is determined that no connection request was received within the predetermined time period in S122, the CPU 10 executes weather update processing of reading weather information of the region in which the host apparatus is located (step S125). FIG. 24 is a flowchart illustrating the weather update processing in step S125 in detail. As shown in FIG. 24, the CPU 10 reads weather information based on the region code 177 stored on the host apparatus (step S151; corresponding to the processing in S13 in FIG. 10). The processing in step S151 will be described more specifically. The CPU 10 reads the region code 177 stored on the flash memory 17. Using the region code 177 as the key, the CPU 10 searches for and retrieves the relevant region code 1731 from the comprehensive weather data 173 distributed from the distribution server 40 and stored on the external main memory 12. The CPU 10 also reads the weather code 1732 stored as corresponding to the retrieved region code 1731. Using the weather code 1732 as the key, the CPU 10 searches for and reads the weather information 1762 from the weather information master 176. The CPU 10 copies the read weather information 1762 to the work area 129 as the weather information 130. Thus, the CPU 10 can obtain the weather information of the region where the host apparatus is located.

Then, the CPU 10 reflects the weather represented by the weather information 130 stored in the work area 129 on the stage where the fight is to be performed (virtual space) (step S152; corresponding to the processing in S14 in FIG. 10). For example, when the weather information 130 represents "snowing", the CPU 10 causes the stage to have falling snow; for example, sets "snowing" in a flag representing the weather. Alternatively, the CPU 10 may cause the stage to have accumulated snow. The CPU 10 may make a setting such that the moving speed of the character is lower in a stage with accumulated snow than in a stage without accumulated snow in the on-line game processing (step S127) described below. The CPU 10 may also set a flag for a predetermined killer attack such that the killer attack is not usable when the stage has no accumulated snow and is usable only when the stage has accumulated snow. The weather update processing is executed in this manner.

Figure 25:
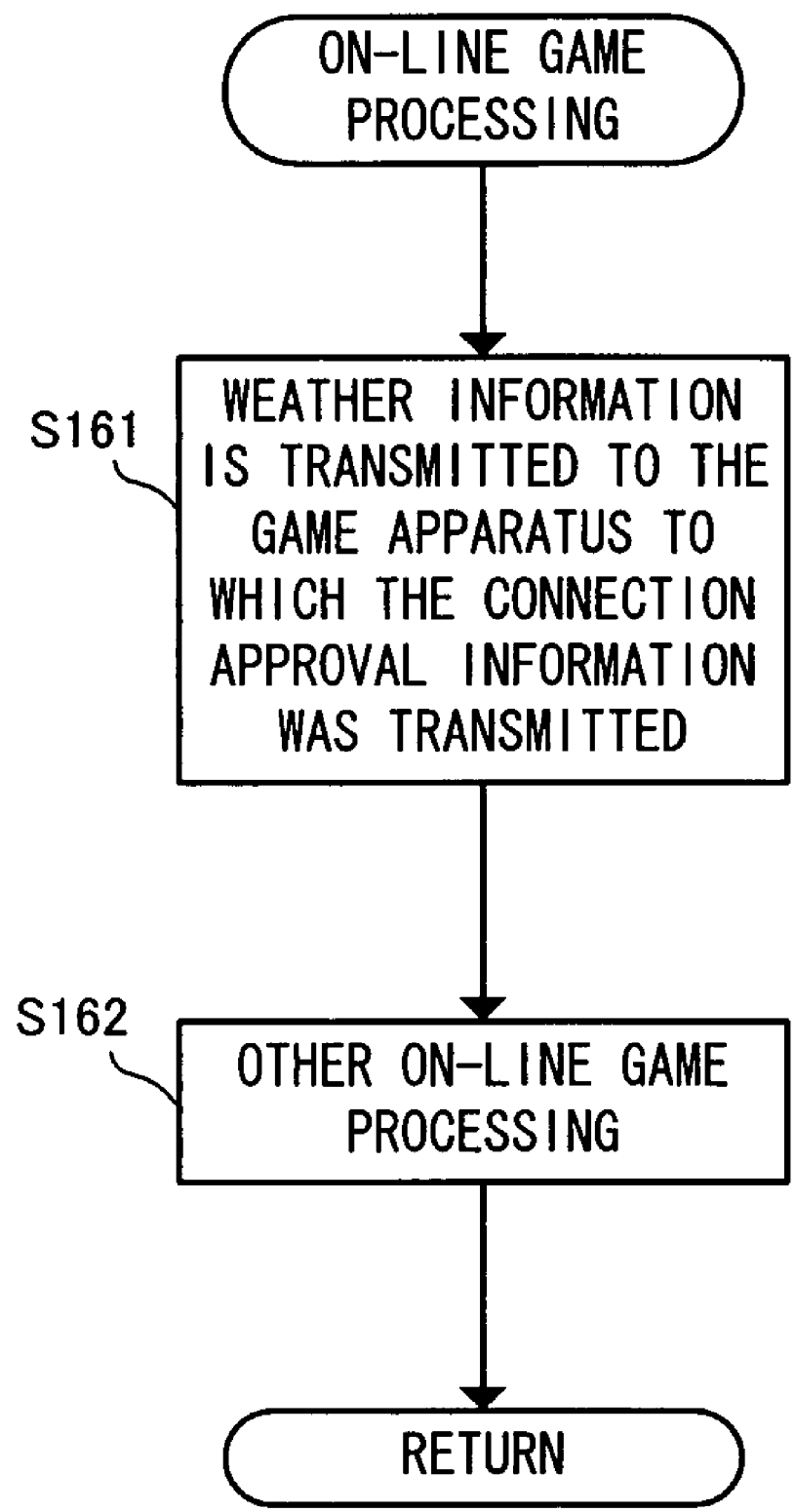
FIG. 25 is a flowchart illustrating on-line game processing in step S127 shown in FIG. 23 in detail.

Returning to FIG. 23, the CPU 10 determines whether or not the connection approval information was transmitted, namely, the processing in step S124 was executed (step S126). When the connection approval information was transmitted (YES in step S126), the CPU 10 executes on-line game processing to fight against the game apparatus at the end other of the connection via the network (step S127). FIG. 25 is a flowchart illustrating the on-line game processing in step S127 in detail. As shown in FIG. 25, the CPU 10 transmits the weather information 130 to the game apparatus to which the connection approval information was transmitted (i.e., the guest apparatus) (step S161). Namely, the CPU 10 transmits the weather information of the region of the host apparatus to the guest apparatus (corresponding to the processing in S15 in FIG. 10).

Next, the CPU 10 executes other game processing regarding the on-line fighting game including transmission and receiving of on-line fighting game data (step S162; corresponding to the processing in S18 in FIG. 10). For example, the CPU 10 displays the motion or the technique of the player character based on operations performed by the player of the host apparatus, transmits data on such operations to the guest apparatus, receives data on operations performed by the player of the guest apparatus, and displays the actions of the opponent on the screen based on the received data. The game data transmitted and received may reflect the weather information. For example, when the weather information represents "snowing", the stage of the fight is set to have accumulated snow, and also each player character may be set to move more slowly than when there is no accumulated snow (for example, whereas the moving distance per unit time is usually 5), the moving distance per unit time is 1 when there is accumulated snow. In this case, the operation data (for example, the moving distance) having an influence of the snow may be transmitted or received. Needless to say, the operation data with no influence of the snow may be transmitted or received and the influence of the snow may be reflected by the game apparatus on the receiving side. The on-line game processing is executed in this manner.

Returning to FIG. 23, when the connection approval information was not transmitted (NO in step S126), the CPU 10 executes a fighting game without using the network (step S128) Namely, the host apparatus waited for a connection request from possible opponents but could not get any within the predetermined time period, and therefore, the CPU 10 fights against the player (single play; the same processing as the off-line game processing in step S116 is executed). In the first embodiment, one host apparatus is connected to one guest apparatus. Alternatively, one host apparatus may be connected to a plurality of guest apparatuses. In that case, the CPU 10 may determine that the connection approval information was transmitted in step S126 (YES in step S126) as long as the connection approval information was transmitted to at least one guest apparatus, and determine that the connection approval information was not transmitted in step S126 (NO in step S126) when the connection approval information was not transmitted to any guest apparatus. It is conceivable that the guest apparatus disconnects the connection after the connection approval information is transmitted to the guest apparatus and the on-line fighting game is started. In order to cope with such a situation, the host apparatus may, for example, store the current number of guest apparatuses in the work area 129 and determine whether or not the number is 0 in step S126. When the number is 0, the CPU 10 executes the same processing as that when the connection approval information was not transmitted (NO in step S126). When the number is 1 or greater, the CPU 10 executes the same processing as that when the connection approval information was transmitted (YES in step S126). The host processing is executed in this manner.

Figure 26:
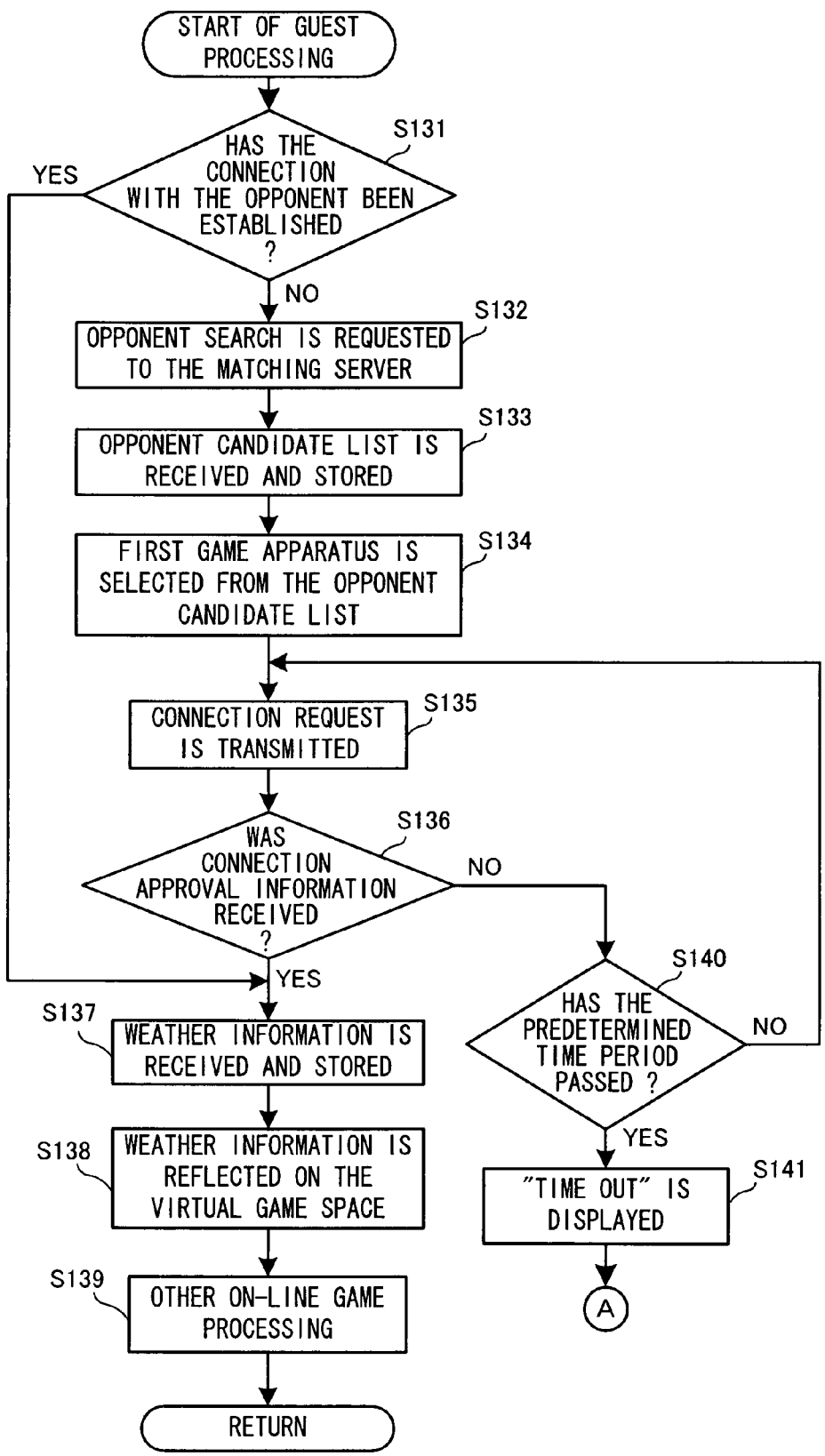
FIG. 26 is a flowchart illustrating guest processing in step S115 shown in FIG. 22 in detail.

Now, the guest apparatus in step S115 will be described FIG. 26 is a flowchart illustrating the guest processing in step S115 in detail. As shown in FIG. 26, the CPU 10 of the guest apparatus determines whether or not the connection with the host apparatus as the opponent has been established (step S131). Specifically, the CPU 10 determines whether or not the above-described connection approval information from the host apparatus has been received. When the connection with the host apparatus has been established (YES in step S131), the CPU 10 executes processing in step S137 described later.

When the connection has not been established (NO in step S131), the CPU 10 transmits an opponent search request (step S132; corresponding to the processing in S6 in FIG. 10) to the matching server 50. The processing in step S132 will be described more specifically. The CPU 10 reads the matching server connection data 128 stored on the external main memory 12. As described above, this data includes the network address of the matching server 50 and the like. The CPU 10 can access the matching server 50 based on the data. The CPU 10 then transmits an opponent search request to the matching server 50. Together with the request, the CPU 10 transmits information on the player, for example, the number of times that the player has played the game and his/her winning ratio. A search condition based on an input operation performed by the player or the like may also be transmitted together with the request.

Upon receiving the request, the CPU 43 of the matching server 50 searches for and retrieves opponent candidates from the host list 514 stored on the memory 42b of the matching server 50 (corresponding to the processing in S7 in FIG. 10). The search is performed, for example, as follows. Based on the information on the number of times that the player has played the game and his/her winning ratio, the matching server 50 searches for game apparatuses (host apparatuses) of players having, for example, a winning ratio close thereto. Based on the retrieved data, the CPU 43 of the matching server 50 generates a candidate list (not shown). Then, the CPU 43 transmits the candidate list to the guest apparatus which transmitted the opponent search request (corresponding to the processing in S8 in FIG. 10). The candidate list also includes network addresses of the host apparatuses and other information necessary for the connection.

After transmitting the opponent search request to the matching server 50, the CPU 10 of the guest apparatus receives the candidate list transmitted from the matching server 50 and stores the candidate list in the work area 129 (step S133). The CPU 10 then displays the candidate list on the screen to present the candidate list to the player of the guest apparatus. The player selects a desired host apparatus from the candidate list. Based on the selection operation, the CPU 10 selects a host apparatus (the game apparatus 3a in this example) as an opponent and reads the network address thereof from the candidate list (step S134; corresponding to the processing in S9 in FIG. 10).

Then, the CPU 10 transmits a connection request to the host apparatus selected in step S134 (more specifically, the network address of the selected host apparatus) (step S135; corresponding to the processing in S10 in FIG. 10). In response to this, the host apparatus determines whether or not to permit the connection as described above. When the connection is permitted, the host apparatus transmits the connection approval information to the guest apparatus.

The CPU 10 of the guest apparatus determines whether or not the connection approval information was received within a predetermined time period (step S136). When the connection approval information was not received within the predetermined time period (NO in step S136), the CPU 10 determines whether or not a predetermined wait time period has passed (step S140). When the predetermined wait time period has not passed (NO in step S140), the CPU 10 returns the processing to step S135 to repeat the above-described processing. When the predetermined wait time period has passed (YES in step S140), the CPU 10 displays that the time is out (step S141). The CPU 10 returns the processing to S113 in FIG. 22 to repeat the above-described processing. There is a possibility that the connection approval information is missing before arriving at the guest apparatus for some reason. To cope with this situation, after determining that the connection approval information was not received (NO in step S136), the CPU 10 of the guest apparatus may perform the following. The CPU 10 determines whether or not a predetermined time period set for re-transmitting the connection request has passed. When the predetermined time period has passed, the CPU 10 returns the processing to step S135 to re-transmit the connection request. When the predetermined time period has not passed, the CPU 10 advances the processing to step S140.

When the connection approval information was received with the predetermined time period (YES in step S136), the connection between the guest apparatus and the host apparatus is established. The weather information 130 is transmitted from the host apparatus as described above, and the guest apparatus receives the weather information 130. When receiving the weather information 130 completely, the CPU 10 of the guest apparatus stores the weather information 130 in the work area 129 (step S137; corresponding to the processing in S16 in FIG. 10).

Next, the CPU 10 reflects the weather represented by the weather information 130 on the stage of the fight (virtual space) (step S138; corresponding to the processing in S17 in FIG. 10). This processing is substantially the same as the processing in step S152 shown in FIG. 24 (the processing executed by the host apparatus to reflect the weather information) and will not be described in detail. As a result of the processing in step S138, the weather of the region of the host apparatus is reflected on the stage of the guest apparatus.

Then, the CPU 10 of the guest apparatus executes the other processing for the on-line fighting game including the transmission and receiving of the game data (step S139; corresponding to the processing in S19 in FIG. 10). This processing is substantially the same as the processing in step S162 in FIG. 25. Specifically, the CPU 10 displays the motion or the technique of the player character based on operations performed by the player of the guest apparatus, transmits data on such operations to the host apparatus, receives data on operations performed by the player of the host apparatus, and displays the actions of the opponent on the screen based on the received data. The stage of the fight reflects the weather of the region of the host apparatus. The on-line game processing is executed in this manner.

The on-line fighting game processing according to the first embodiment is executed in this manner.

As described above, in the first embodiment, when playing an on-line fighting game via the network, the guest apparatus can reflect the weather of the region where the opponent (host apparatus) is located on the game processing executed by the guest apparatus. Therefore, for example, when the weather of the region where the player of the guest apparatus lives is fine but the stage of the fight has falling rain, the player of the guest apparatus can recognize that it is raining in the region at the other end of the communication. The player of the guest apparatus can feel as if he/she was fighting in the region of the opponent, away from home. This makes it more amusing to play the on-line fighting game or the like.

The weather information transmitted from the host apparatus to the guest apparatus may be weather information of a week such as, for example, weekly weather forecast. In this case, when the player of the guest apparatus plays against an opponent one day and plays by himself/herself the next day, the weather of the region of the host apparatus on the second day may be reflected on the stage of the guest apparatus based on the weather information of the week. Thus, the player of the guest apparatus can recognize the weather of the region where the opponent of the day before lives. This makes the game more amusing even if the player plays by himself/herself.

As the weather information, meteorological information on the temperature, humidity, wind velocity and the like may be transmitted and reflected on the game processing. For example, when the temperature is low, the player character may be displayed as dressed warm. When the temperature is high, the player character may be displayed as dressed cool and perspiring. When the wind is strong and blows against the player character in the virtual space, the moving speed of the player character may be decreased; whereas when the wind is strong and behind the player character, the moving speed of the player character may be increased. Owing to such an arrangement, the player of the guest apparatus can recognize the meteorological state of the region of the host apparatus more realistically, which makes the on-line fighting game more amusing.

The on-line game is not limited to the on-line fighting game described above. For example, the present invention is applicable to an urban development simulation game, in which each player owns his/her own town or village in the virtual game space and develops the town or village. In this case, the guest apparatus receives the weather information from the host apparatus, and also data on the town or village developed by the player of the host apparatus as game data. The guest apparatus reflects the received weather information regarding the received data on the town or village; and generates in the virtual space, and displays on the screen, the town or village of the host apparatus. Owing to such an arrangement, the player of the guest apparatus can feel as if he/she was visiting the town or village of the host apparatus. The town or village of the host apparatus is displayed as reflecting the weather of the region where the host apparatus is located (for example, with accumulated snow). Therefore, the player of the guest apparatus can strongly feel that he/she was visiting a place away from home, which makes it more amusing to communicate with other game apparatuses. This promotes the player of each game apparatus to communicate with other players, which enhances the level of entertainment of the on-line game.

Second Embodiment

With reference to FIG. 27 through FIG. 32, a second embodiment according to the present invention will be described. In the first embodiment, the weather information distribution service by the distribution server 40 is provided to only the game apparatuses for which the predetermined distribution contract has been concluded. Therefore, only the first game apparatus 3a (host apparatus) can obtain the comprehensive weather data 424. In the second embodiment, the distribution service is, for example, a free service and thus can be obtained by the second game apparatus 3b (guest apparatus) as well as the first game apparatus 3a. Namely, all the game apparatuses which are connectable to the distribution server 40 can receive the comprehensive weather data service. Therefore, in the second embodiment, the host apparatus does not transmit the weather information to the guest apparatus, unlike the first embodiment. Instead, the host apparatus transmits the region code which is set in the host apparatus to the guest apparatus. Based on the received region code, the guest apparatus searches for and retrieves the weather information set in the host apparatus from the distributed comprehensive weather data. The guest apparatus then plays the on-line fighting game, reflecting the retrieved comprehensive weather data. The game apparatuses and the servers in the second embodiment are the same as those in the first embodiment, and therefore bear the identical reference numerals thereto and will not be described in detail.

Figure 27:
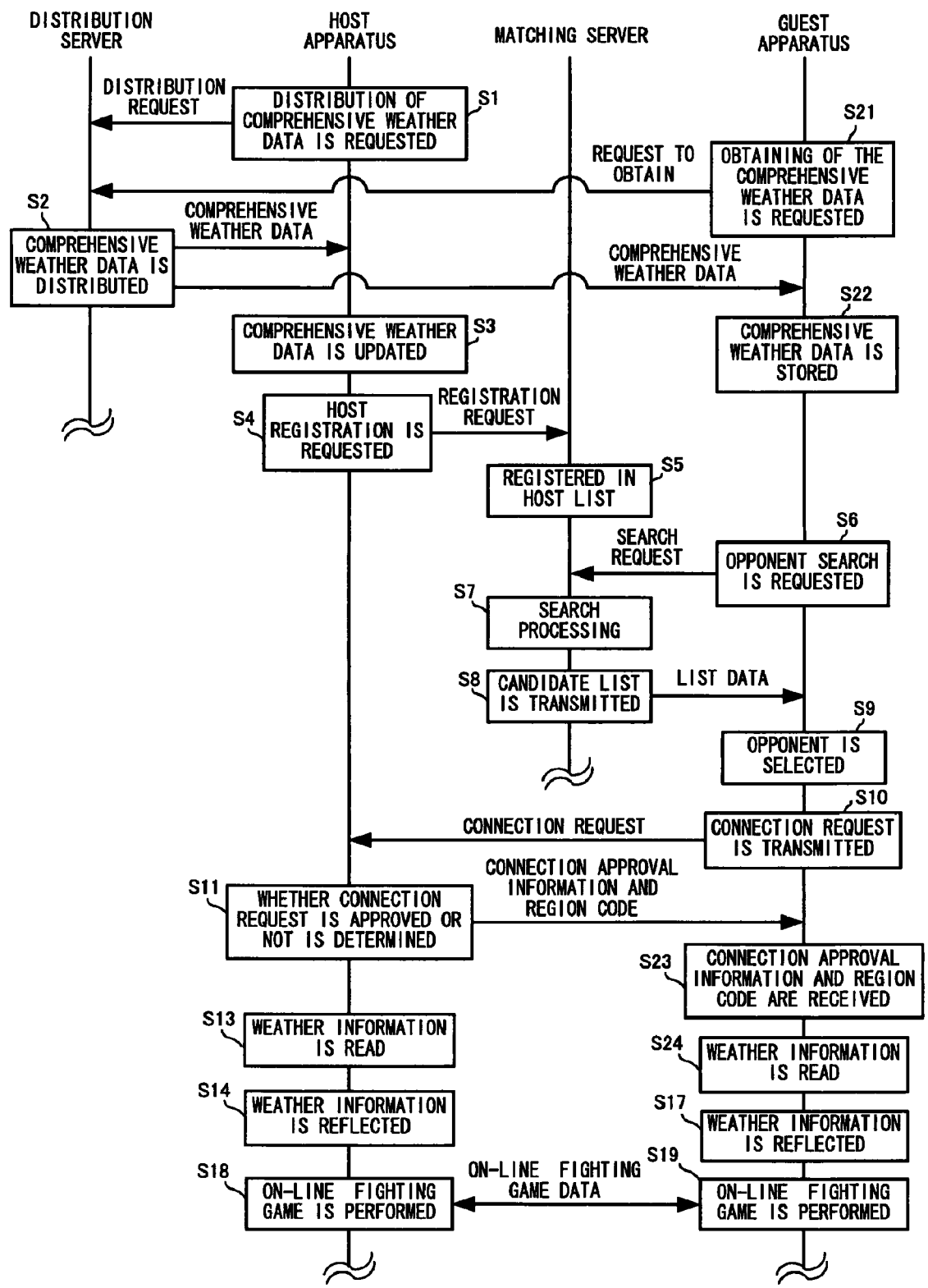
FIG. 27 shows an overview of a flow of communication for an on-line fighting game according to a second embodiment of the present invention.

In the second embodiment, it is assumed that substantially the same on-line fighting game as in the first embodiment is played. FIG. 27 shows an overview of a flow of communication for the on-line fighting game in the second embodiment. The flow shown in FIG. 27 is different from the flow in the first embodiment shown in FIG. 10 in that the guest apparatus obtains the comprehensive weather data (S21, S22) and in the processing executed after the host apparatus determines whether or not to permit the connection requested by the guest apparatus (S11 et seq.). The remaining part of the flow in FIG. 27 is the same as that in FIG. 10. Identical steps to those in FIG. 10 bear identical step numbers thereto. Hereinafter, S21, S22 and S11 et seq. in FIG. 27 will be mainly described.

As shown in FIG. 27, the guest apparatus obtains the comprehensive weather data from the distribution server 40 and stores the comprehensive weather data, in the same manner as the host apparatus (S21, S22). Therefore, the data shown in FIG. 12 is stored on the flash memory 17 of the guest apparatus. In the second embodiment, the host apparatus and the guest apparatus can have the same data structure. The details of the data will not be repeated here.

Now, the flow of S11 and thereafter in FIG. 27 will be described. Upon receiving a connection request from the guest apparatus, the host apparatus determines whether or not to permit the connection as in the first embodiment (S11). Then, the host apparatus transmits connection approval information to the guest apparatus. At this point, the host apparatus reads the region code 177 which is set in the host apparatus and transmits the region code 177 to the guest apparatus.

The guest apparatus receives the connection approval information and the region code of the host apparatus (S23). The host apparatus searches for and reads weather information from the comprehensive weather data based on its own region code (S13). The guest apparatus searches for and reads the weather information of the region of the host apparatus from the comprehensive weather data, using the received region code as the key (S24). The host apparatus reflects the weather information retrieved based on its own region code on the game processing (S14). The guest apparatus also reflects the retrieved weather information on the game processing (S17). Since the retrieved weather information is of the region of the host apparatus, the guest apparatus reflects the weather of the region of the host apparatus on the game processing executed by the guest apparatus. Then, the on-line fighting game processing is executed (S18, S19). Thus, both the host apparatus and the guest apparatus fight in a virtual game space on which the weather of the region of the host apparatus is reflected.

Figure 28:
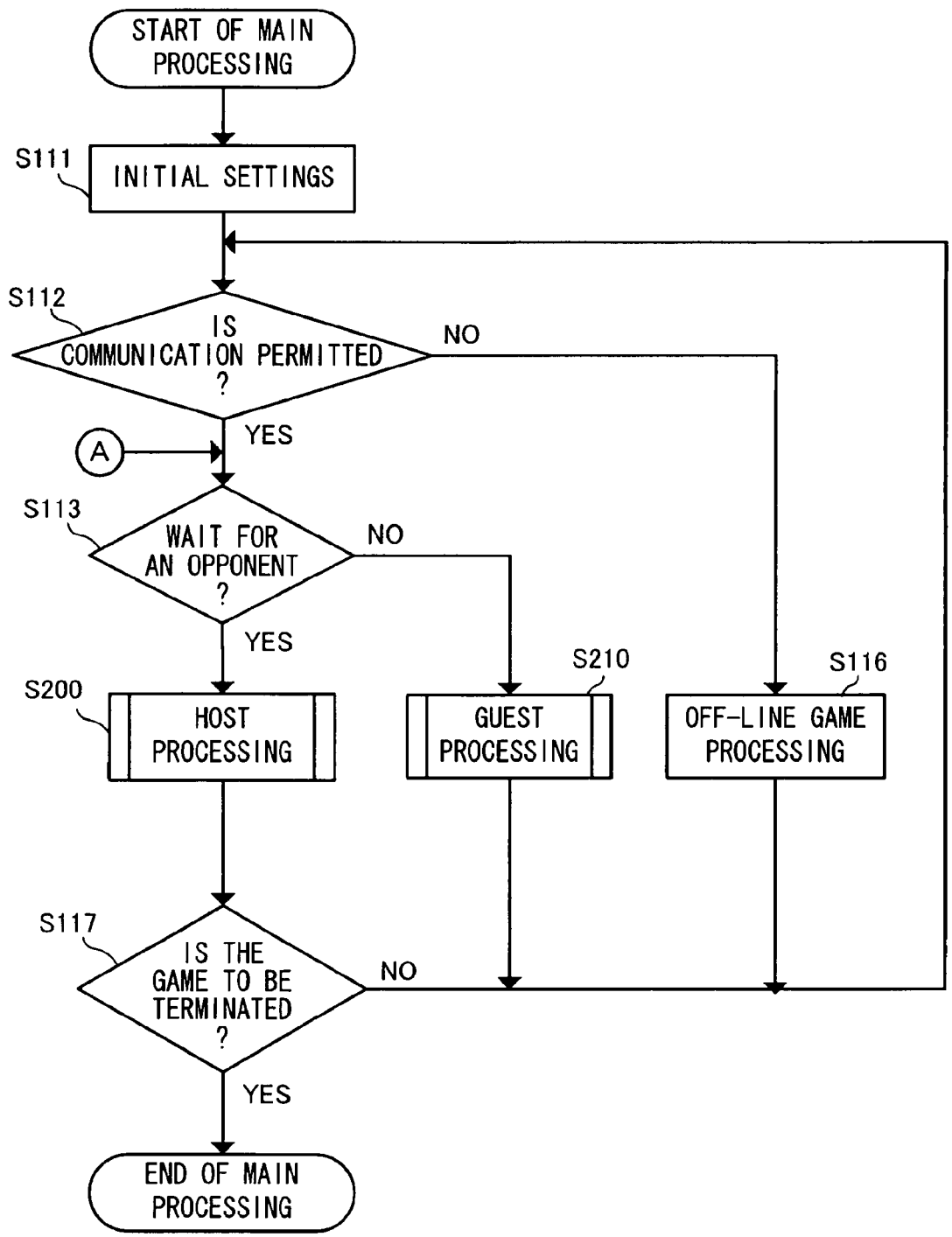
FIG. 28 is a flowchart illustrating on-line fighting game processing executed by the game apparatus 3 in the second embodiment.

FIG. 28 is a flowchart illustrating the on-line fighting game processing (main processing) executed by the game apparatus 3 according to the second embodiment. In FIG. 28, the processing in steps S111 through S113 and S117 is substantially the same as that in FIG. 22 and will not be described in detail. Before step S111, both the host apparatus and the guest apparatus execute the processing shown in FIG. 20 to obtain the comprehensive weather data from the distribution server 40.

Figure 29:
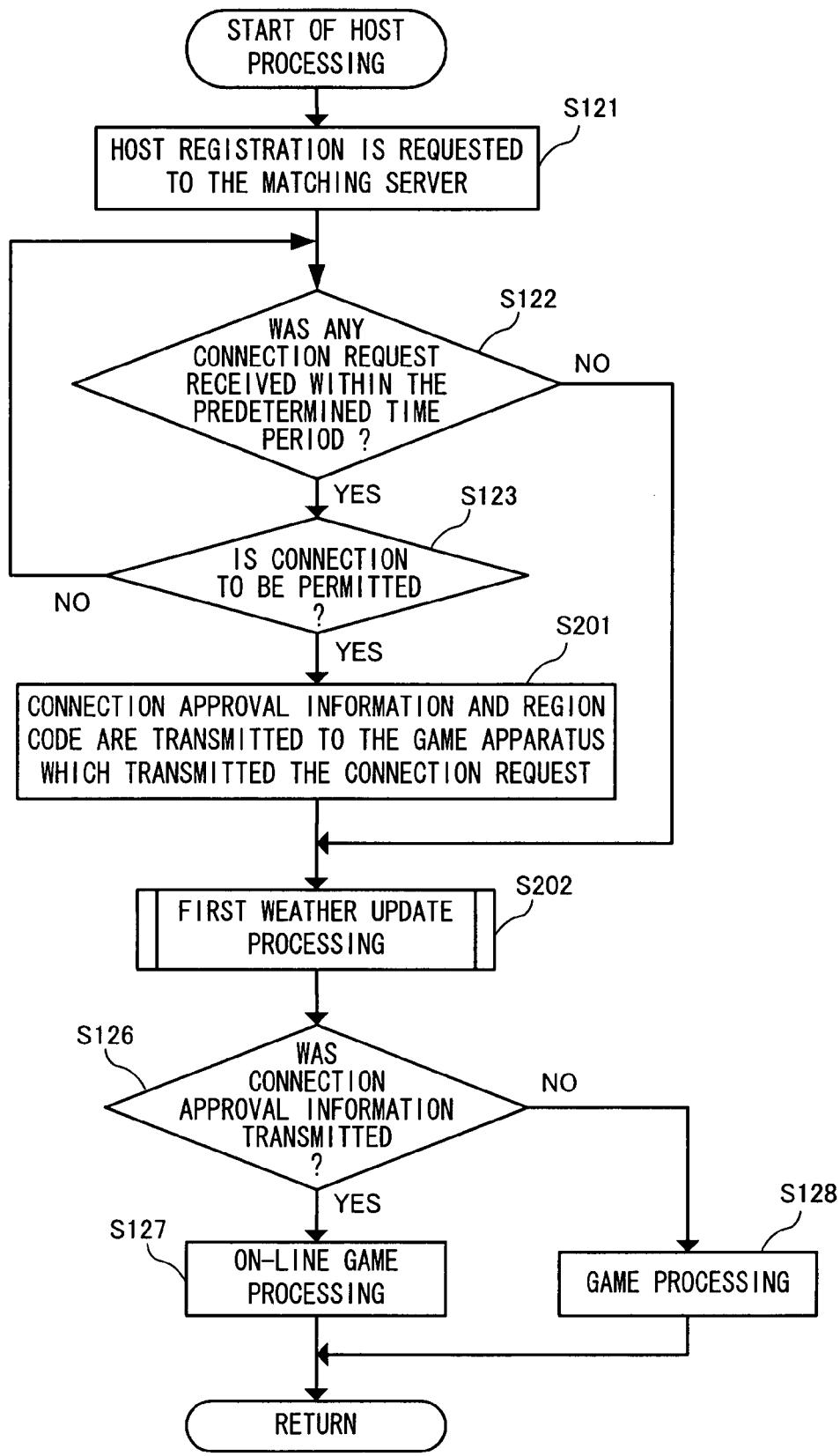
FIG. 29 is a flowchart illustrating host processing in step S200 shown in FIG. 28 in detail.

FIG. 29 is a flowchart illustrating the host processing (step S200) according to the second embodiment in detail. In FIG. 29, the processing in steps S121 through S123 and S126 through S128 is substantially the same as that in FIG. 23 and will not be described in detail.

When, in S123 in FIG. 29, the host apparatus permits the connection with the guest apparatus (YES in step S123), the host apparatus transmits connection approval information to the guest apparatus which transmitted the connection request. At this point, the CPU 10 of the host apparatus reads the region code 177 from the flash memory 17 and transmits the region code 177 together with the connection approval information to the guest apparatus (step S201).

Figure 30:
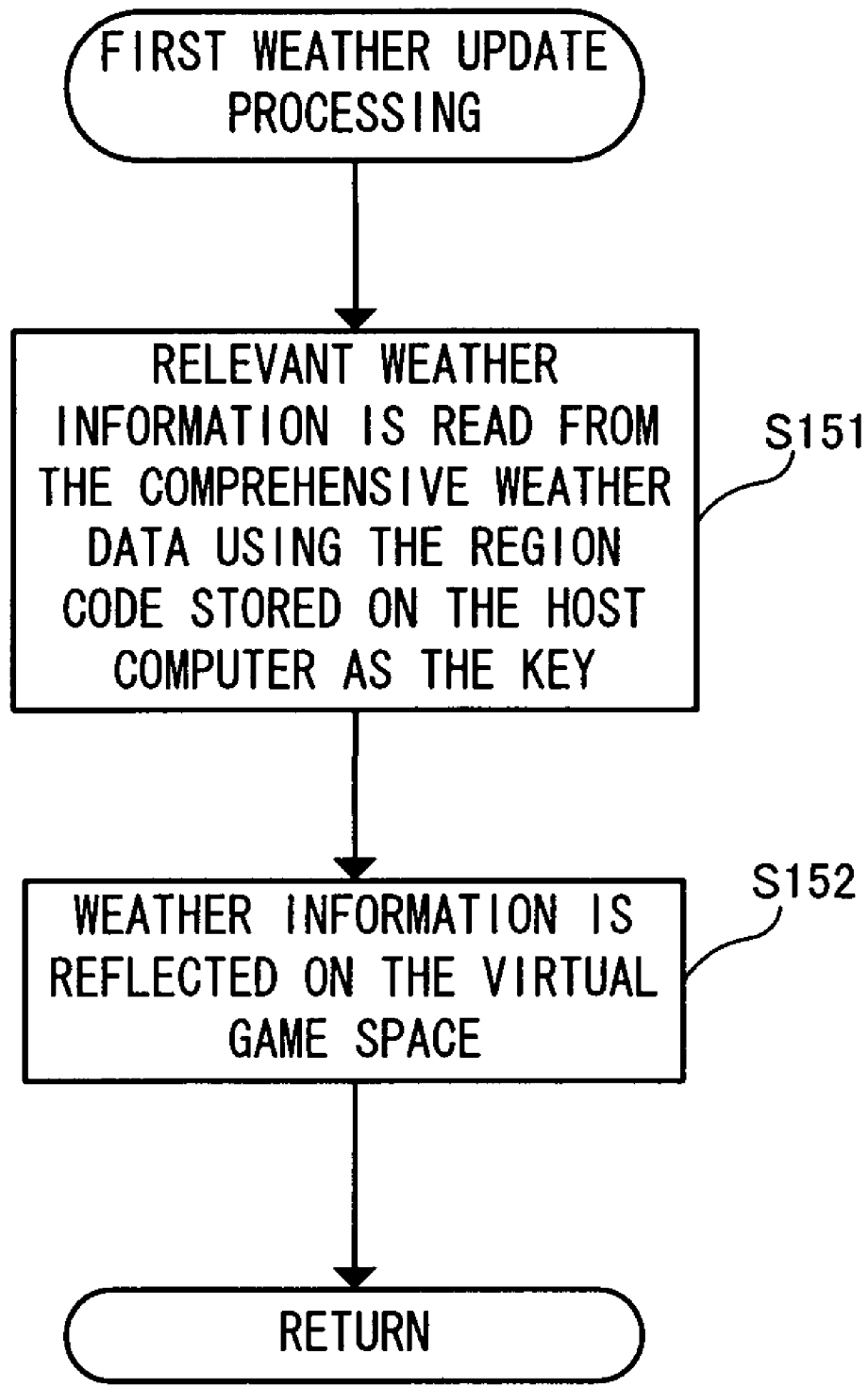
FIG. 30 is a flow chart illustrating first weather update processing in step S202 shown in FIG. 29 in detail.

Then, the CPU 10 of the host apparatus executes first weather update processing (step S202). FIG. 30 is a flowchart illustrating the first weather update processing in step S202 in detail. The first weather update processing is substantially the same as that of the weather update processing shown in FIG. 24 and will not be described in detail. The CPU 10 reads the weather information from the comprehensive weather data 173, using the region code 177 as the key (step S151) and reflects the weather information on the game processing (step S152).

The host processing after this is the same as that in the first embodiment. The host processing according to the second embodiment is executed in this manner.

Figure 31:
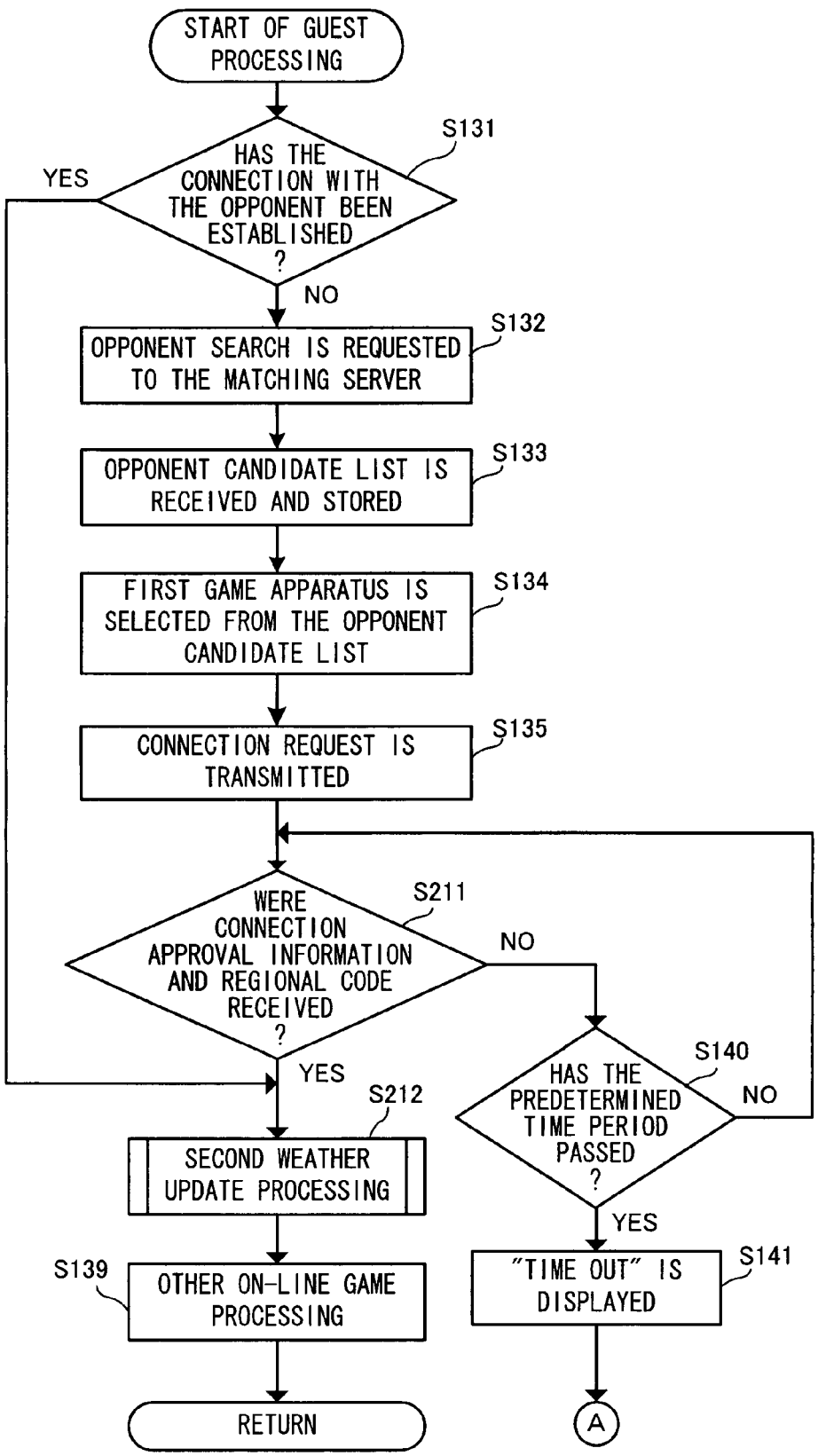
FIG. 31 is a flowchart illustrating guest processing in step S210 shown in FIG. 28 in detail.

The guest processing (step S210) according to the second embodiment will be described. FIG. 31 is a flowchart illustrating the guest processing according to the second embodiment in detail. In FIG. 31, the processing in steps S131 through S135 and S139 through S141 is substantially the same as that in FIG. 26 and will not be described in detail.

As shown in FIG. 31, after the guest apparatus transmits the connection request (step S135), the host apparatus transmits the connection approval information and the region code 177 to the guest apparatus as described above. The CPU 10 of the guest apparatus receives the connection approval information and the region code 177, and determines whether or not such data were completely received with in a predetermined time period (step S211).

Figure 32:
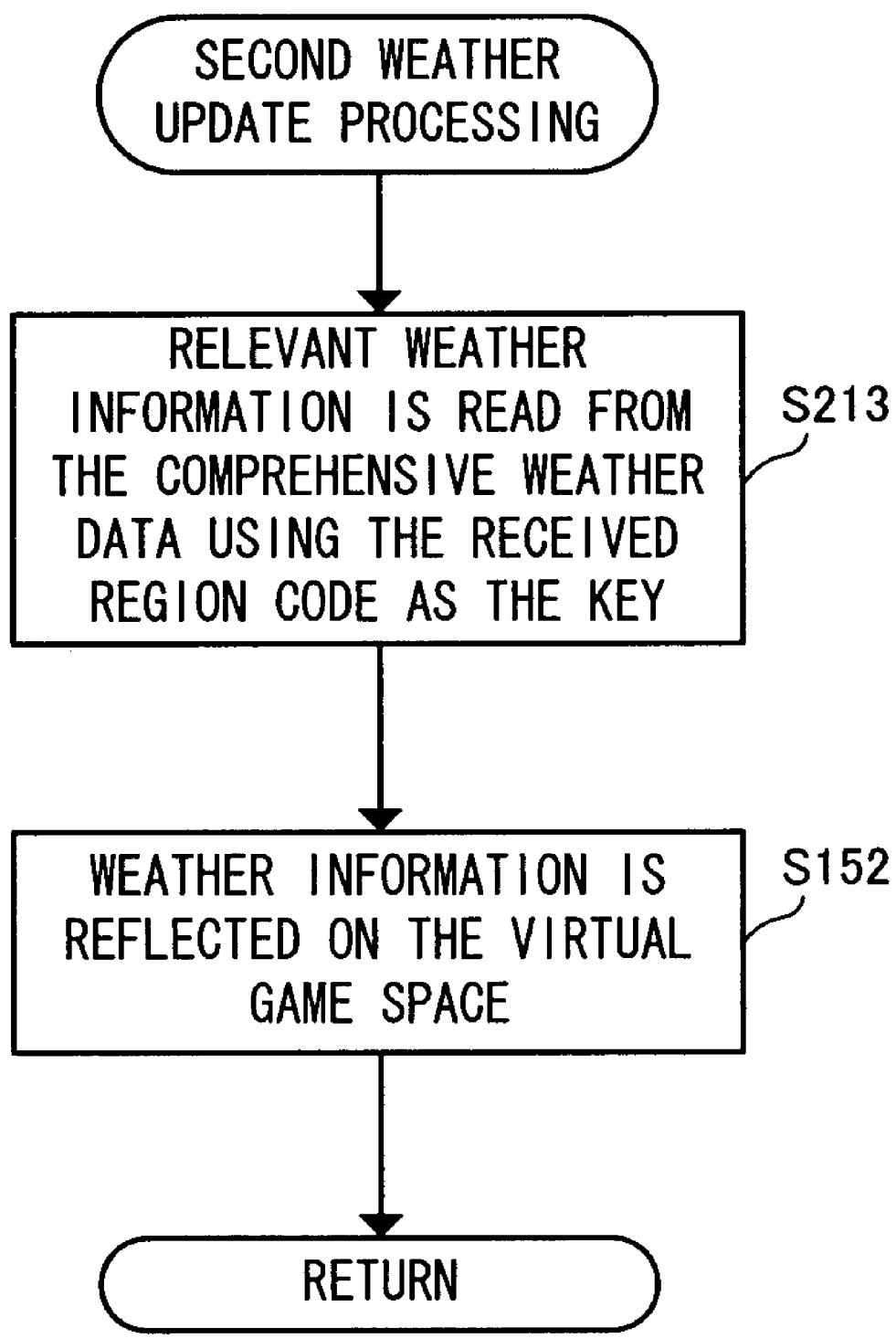
FIG. 32 is a flowchart illustrating second weather update processing in step S212 shown in FIG. 31 in detail.

When the connection approval information and the region code 177 were not completely received within the predetermined time period (NO in step S211), the CPU 10 advances the processing to step S140. The processing after step S140 is substantially the same as that in the first embodiment and will not be described. When the connection approval information and the region code 177 were completely received within the predetermined time period (YES instep S211), the CPU 10 executes second weather update processing (step S212). FIG. 32 is a flowchart illustrating the second weather update processing in step S212 in detail. As shown in FIG. 32, the CPU 10 searches for and retrieves the relevant region code 1731 from the comprehensive weather data 173 distributed from the distribution server 40, using the received region code 177 as the key. The CPU 10 then reads the weather code 1732 stored as corresponding to the region code 1731 (step S213). Next, using the read weather code 1732 as the key, the CPU 10 reads the weather information 1762 from the weather information master 176. The CPU 10 copies the read weather information 1762 to the work area 129 as the weather information 130. Thus, the CPU 10 of the guest apparatus can obtain the weather information of the region in which the host apparatus is located.

The CPU 10 reflects the weather represented by the weather information 130 on the stage of the fight (virtual space) (step S152; corresponding to the processing in S17 in FIG. 27). This processing is substantially the same as that in the first embodiment and will not be described in detail. As a result of this processing, the weather of the region of the host apparatus is reflected on the virtual space generated by the guest apparatus. The second weather update processing is executed in this manner.

After the second weather update processing, the CPU 10 of the guest apparatus executes the on-line game processing in substantially the same manner as in the first embodiment (step S139). The guest processing according to the second embodiment is executed in this manner.

As described above, in the second embodiment, all the game apparatuses connected to the network, whether the game apparatus may be a host apparatus or a guest apparatus, can obtain the comprehensive weather data from the distribution server 40. In this environment, the host apparatus transmits the region code which is set therein to the guest apparatus. Upon receiving the region code, the guest apparatus searches for the weather information of the region of the host apparatus in the comprehensive weather data based on the region code, and thus obtains the weather information. The guest apparatus reflects the weather information on the game processing and thus can play the on-line fighting game under the weather of the region of the host apparatus. Owing to such an arrangement, the player of the guest apparatus can play an on-line fighting game or other on-line games in a virtual game space reflecting the weather of the region where the opponent lives.

Third Embodiment

With reference to FIG. 33 through FIG. 37, a third embodiment according to the present invention will be described. In the third embodiment, substantially the same on-line fighting game as that in the second embodiment will be played as an example. In such an on-line fighting game, the stage of the fight is a virtual game space made based on one of various historical sites in various countries in the world. In the case of Japan, for example, the Five Story Pagoda as one of the historical sites in Kyoto may be used for a Kyoto stage. In this case, data on the virtual game space including the Five Story Pagoda is set in advance as game data and stored on the optical disc 4. Alternatively, data on a virtual game space including the Clock Tower as one of the historical sites in Sapporo may be set in advance as game data and stored on the optical disc 4 for a Sapporo stage. Similarly, data on a virtual game space including a historical site of various regions (e.g., prefectures) in Japan may be set in advance as game data and stored on the optical disc 4. Such data for each stage is set as corresponding to the region code.

The on-line fighting game played in the third embodiment is set such that, when the player plays the game for the first time after purchase, the player can only select the stage corresponding to the region code of the region where the player lives, i.e., the region code which is set in the game apparatus owned by the player. As the player repeatedly plays the on-line fighting game as described above using the game apparatus as the guest apparatus, the player is allowed to select the stage of the region where any of the opponents he/she fought with (host apparatus) lives even when he/she plays by himself/herself. The player can also reflect the weather of that region on the game. Namely, the player can reflect the weather information of the past opponents on the game processing even when he/she plays the game off-line (at the time of single play) as well as when he/she plays the game where the communication is established.

Figures 33, 34:
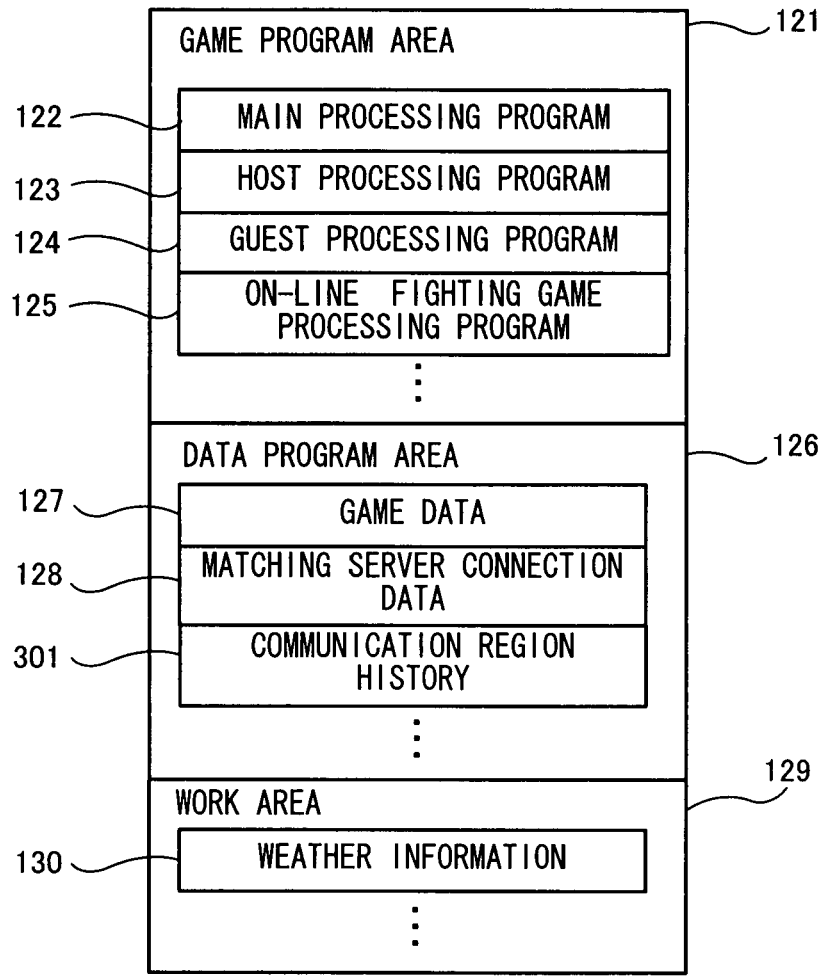
FIG. 33 is a memory map of the external main memory 12 according to a third embodiment of the present invention.
FIG. 34 shows an exemplary data structure of a communication region history 301.

Data used in the game processing according to the third embodiment will be described. FIG. 33 is a memory map, according to the third embodiment, of the external main memory 12 shown in FIG. 2. As shown in FIG. 33, the external main memory 12 includes a game program area 121, a data storage area 126, and a work area 129. Data in the game program area 121 and the data storage area 126 has been copied from the optical disc 4 before the game processing. In the third embodiment, the data structure is the same as that in the first and second embodiments, except that the data storage area 126 includes a communication region history 301. The data other than the communication region history 301 will not be described here.

The communication region history 301 is data on the region code transmitted from the game apparatus as a past opponent as described in the second embodiment. As shown in FIG. 34, in the communication region history 301, a region code 302 is stored together with a latest communication time/ date 303. The communication region history 301 is read onto the external main memory 12 for the on-line fighting game processing, but is stored on the flash memory 17 as a part of the saved data after the on-line fighting game is finished. Before the on-line fighting game is started the next time, the communication region history 301 is again read onto the external main memory 12 from the flash memory 17 as shown in FIG. 33.

Figure 35:
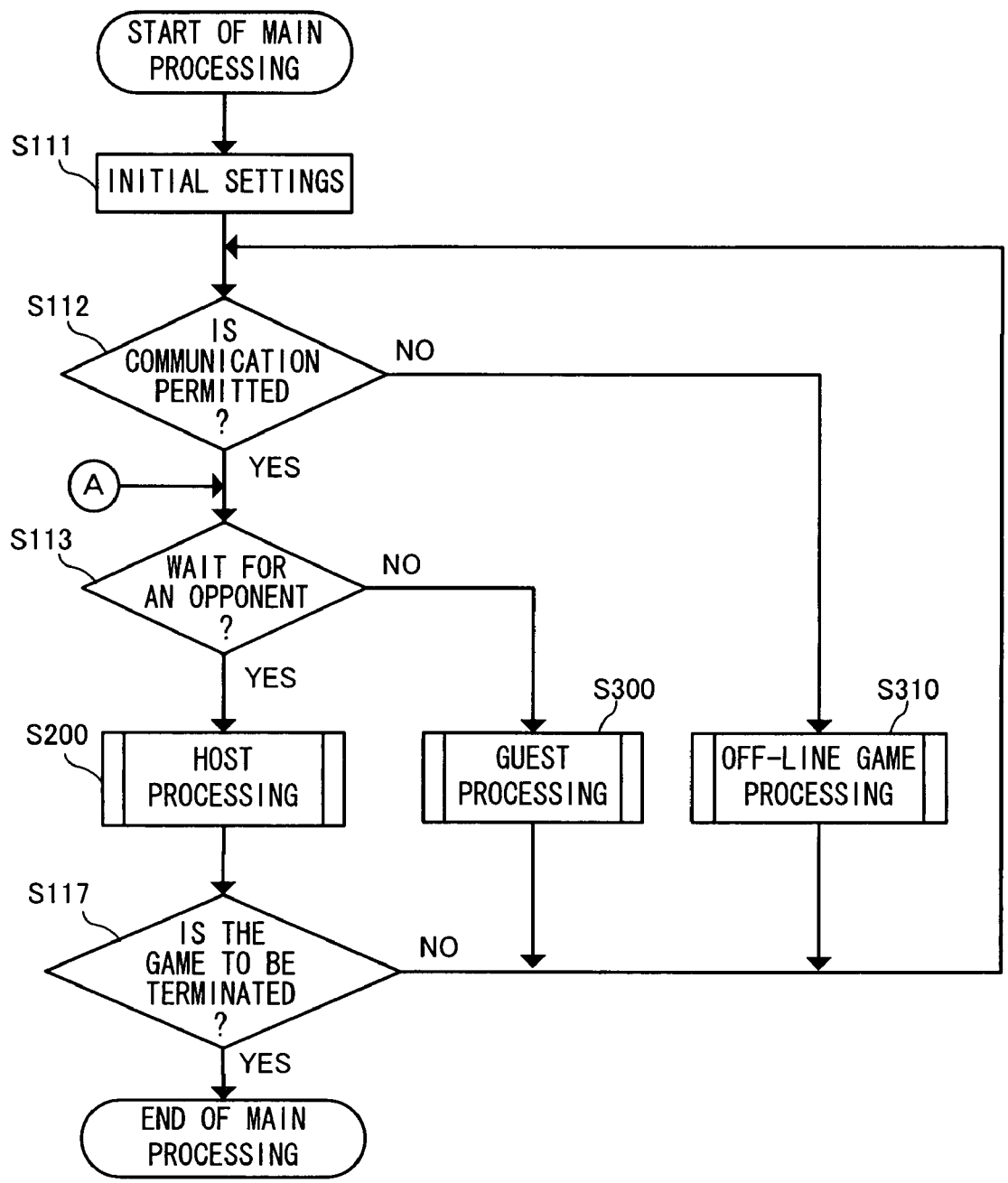
FIG. 35 shows an overview of a flow of communication for an on-line fighting game according to the third embodiment.

The on-line fighting game processing according to the third embodiment will be described in detail. FIG. 35 is a flowchart illustrating the on-line fighting game processing (main processing) executed by the game apparatus 3 according to the third embodiment. The processing in the third embodiment is substantially the same as that in the second embodiment except for the guest processing in step S300 and the off-line game processing in step S310. Hereinafter, the guest processing and the off-line game processing will be mainly described.

Figure 36:
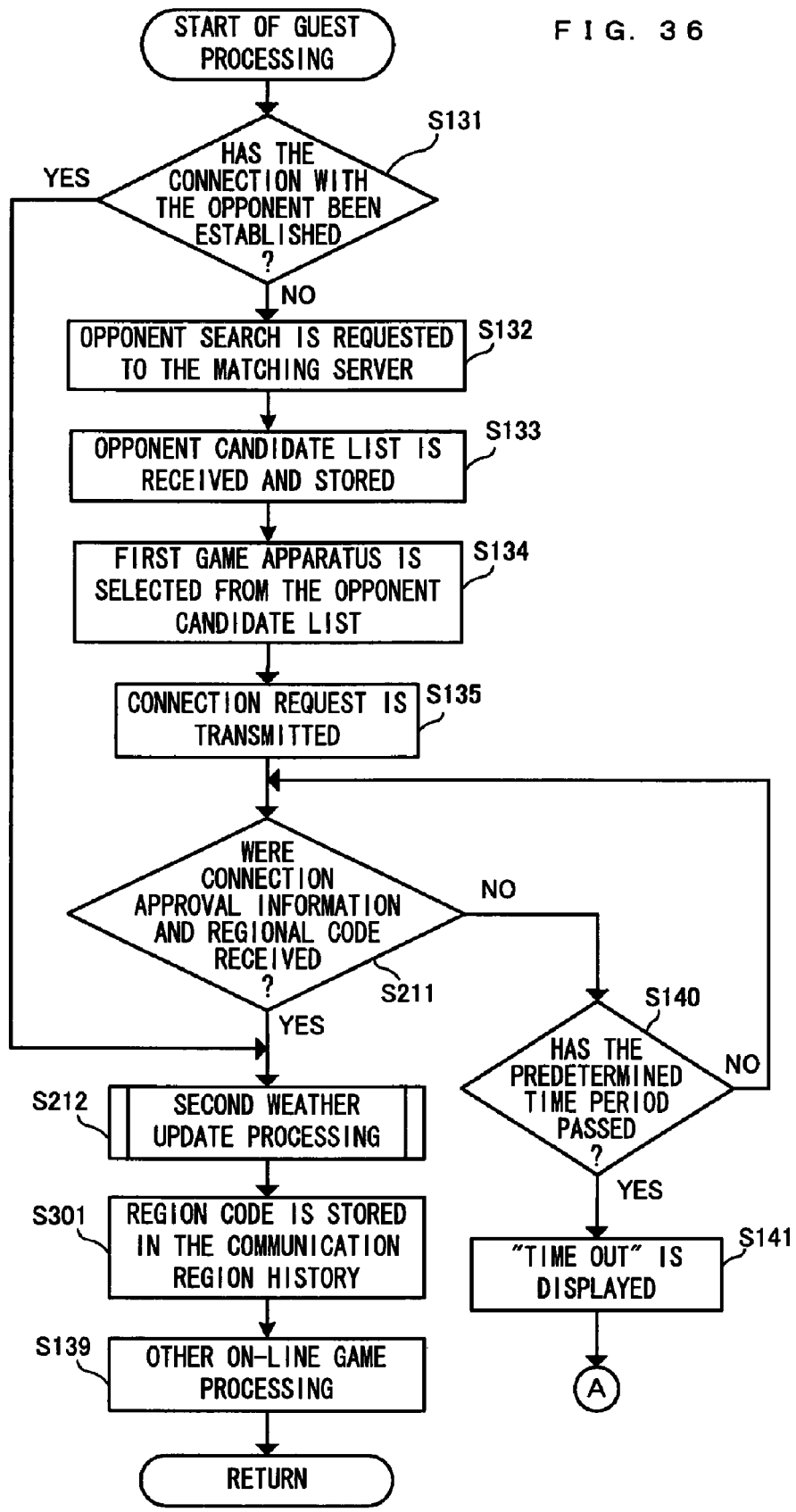
FIG. 36 is a flowchart illustrating guest processing in step S300 shown in FIG. 35 in detail.

FIG. 36 is a flowchart illustrating the guest processing (step S300) according to the third embodiment in detail. The processing in FIG. 36 is substantially the same as the processing in the second embodiment shown in FIG. 31 except for step S301, and the processing in step S301 will be mainly described here.

After the second weather update processing, the CPU 10 of the guest apparatus registers the region code transmitted from the host apparatus in the communication region history 301 (step S301). When the region code which is the same as the region code 302 already stored on the communication region history 301 is received, the latest communication time/date 303 is updated with the time/date when the on-line fighting game was played.

Figure 37:
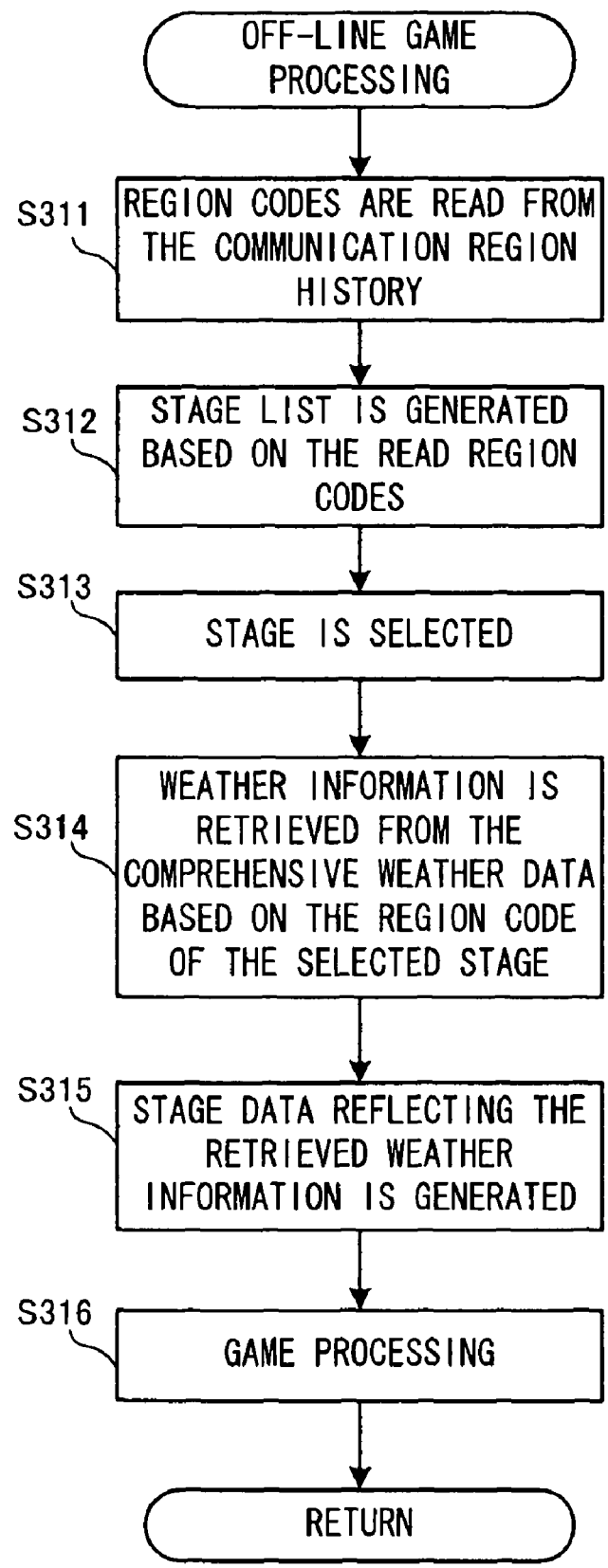
FIG. 37 is a flowchart illustrating off-line game processing in step S310 shown in FIG. 35 in detail.

FIG. 37 is a flowchart illustrating the off-line game processing (step S310) according to the third embodiment in detail. This processing is executed when the player plays off-line, i.e., by himself/herself (single play). As shown in FIG. 37, the CPU 10 sequentially reads all the region codes 302 registered in the communication region history 301 (step S311).

Based on the read region codes, the CPU 10 generates a stage list (step S312). The stage list is generated for presenting the selectable stages to the player. The stage list includes only the stages corresponding to the region codes 302 registered in the communication region history 301.

The CPU 10 displays the stage list and a message suggesting that the player should select a stage of the fight on the screen of the TV 2 (monitor). Based on the selection of the player, the CPU 10 selects the stage of the fight (step S313).

Based on the region code 302 corresponding to the stage selected in step S313, the CPU 10 searches for and reads the weather code 1732 from the comprehensive weather data 173. Based on the weather code 1732, the CPU 10 searches for and reads the weather information 1762 from the weather information master 176 (step S314). For example, when the Kyoto stage is selected, the weather in Kyoto is read based on the comprehensive weather data 173.

Then, the CPU 10 generates stage data reflecting the weather information obtained in step S314 for the stage of the fight (step S315). As a result, for example, the stage is displayed as having falling snow.

The CPU 10 execute the game processing (step S316). The player plays by himself/herself, but the stage of the fight represents a region other than the place where the player lives and reflects the weather of that region at the time of single play. For example, after a player living in Tokyo plays the on-line fighting game against a player living in Kyoto, the player in Tokyo can select the Kyoto stage when playing by himself/herself. In addition, the weather in Kyoto selected at the time of single play can be reflected on the stage (for example, with falling snow).

As described above, in the third embodiment, the game apparatus stores the region codes of the opponents against which the game apparatus fought in the past as the guest apparatus (the region codes of the host apparatuses). As the number of the stored region codes increases, the number of stages which can be selected at the time of single play increases. In addition, the weather in the region corresponding to the selected stage at the time of single play can be reflected on the game. Thus, a player living in Tokyo can play the game with the Kyoto stage reflecting the weather in Kyoto at the time of single play. Owing to such an arrangement, the player feels as if he/she was fighting in Kyoto even when playing off-line, which makes the game more entertaining. The game can be set such that only one stage is selectable when the player plays the game for the first game after purchase but as the player repeats playing with different opponents, the player can select any of the regions of the past opponents (i.e., the number of selectable stages increases). This keeps the player motivated to play, and thus maintains the game amusing for a long time.

The weather of the regions of the past opponents can be reflected when the player plays by himself/herself (single play) in addition to when the game is played where the communication is established. Even without the connection to the network, the weather of a region other than the place where the player lives can be reflected on the game.

Fourth Embodiment

With reference to FIG. 38 through FIG. 42, a fourth embodiment according to the present invention will be described. In the fourth embodiment, when the CPU 10 of the game apparatus 3 urges the player to select an opponent from the candidate list transmitted from the matching server 50, the CPU 10 also presents, to the player, the weather information of the region of each opponent in the candidate list at the time of selection.

Figure 38:
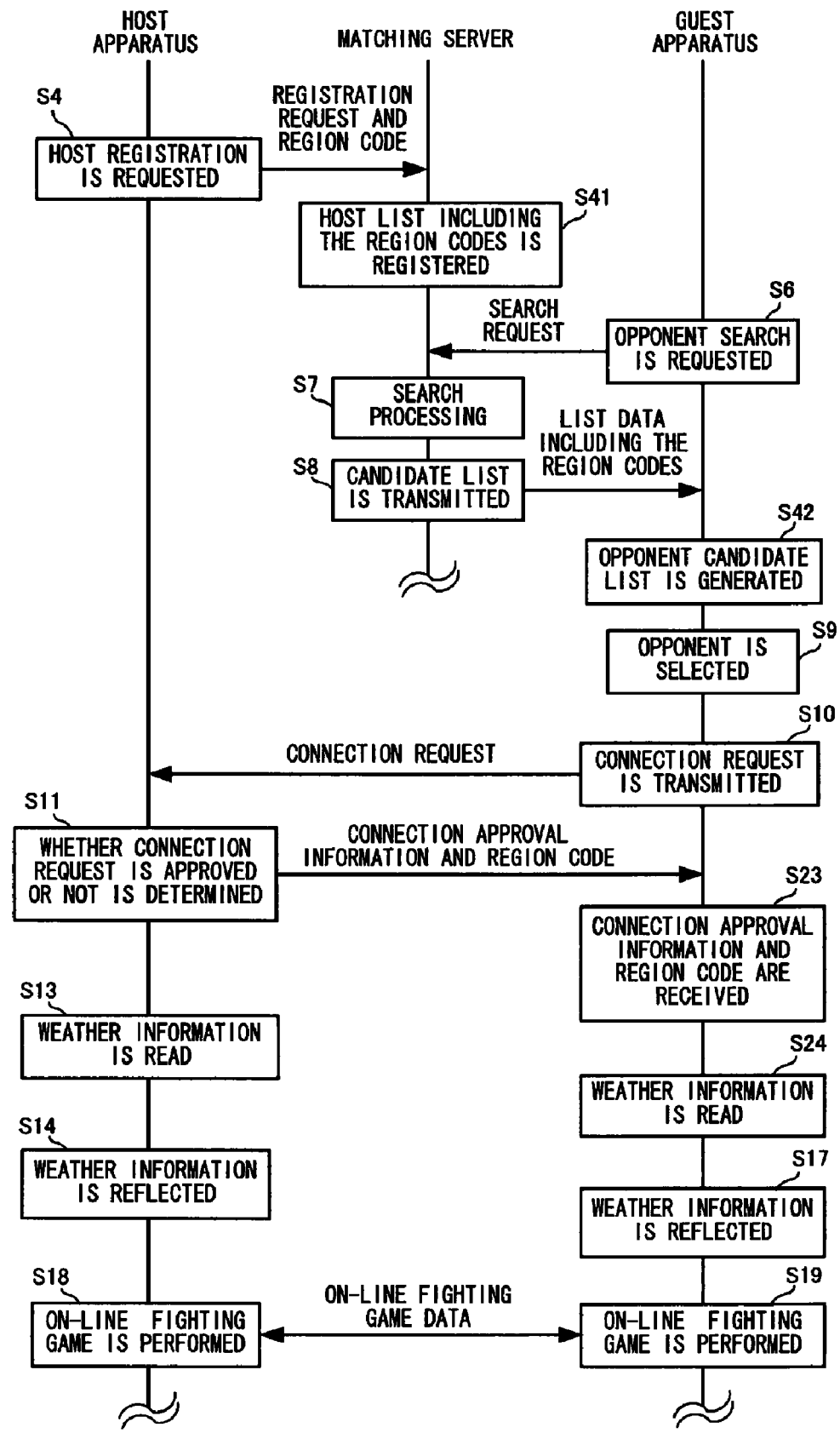
FIG. 38 shows an overview of a flow of communication for an on-line fighting game according to a fourth third embodiment of the present invention.

FIG. 38 shows an overview of a flow of communication for the on-line fighting game in the fourth embodiment. The flow in FIG. 38 is substantially the same as the flow in the second embodiment, except for the processing by which the guest apparatus selects an opponent from the candidate list transmitted from the matching server 50. FIG. 38 does not show the processing of obtaining the comprehensive weather data from the distribution server 40 described in the second embodiment with reference to FIG. 27. FIG. 38 shows the processing after the host apparatus obtains the comprehensive weather data from the distribution server 40.

As shown in FIG. 38, the host apparatus transmits a host registration request to the matching server 50 (S4). The host apparatus reads the region code stored on the flash memory 17 in the host apparatus and transmits the region code together with the host registration request. Upon receiving the host registration request and the region code, the matching server 50 registers the information on the game apparatus which transmitted the host registration request in the host list as corresponding to the region code (S41).

Then, the guest apparatus transmits an opponent search request (S6). In response to this, the matching server 50 searches for and retrieves opponent candidates from the host list (S7). At this point, the matching server 50 also extracts the region codes and generates a candidate list. The candidate list includes information on the game apparatuses which can be a host apparatus, such as the network address of each such game apparatus, the region code set for each such game apparatus and the like. The matching server 50 transmits the candidate list to the guest apparatus (S8)

The guest apparatus receives the candidate list, generates a list of selectable opponents to be displayed based on the candidate list, and displays the generated list on the screen (S42). FIG. 39 is an example of the screen displaying such a list of selectable opponents. In the example shown in FIG. 39, candidate names 391 are shown in a list. To the left of each candidate name 391, an image 392 representing the weather is shown. This list allows the player to recognize the weather of the regions of the selectable opponents.

Based on an operation by the player, the CPU 10 of the guest apparatus selects the first game apparatus 3a as the opponent (S9). The flow after this is substantially the same as that in the second embodiment and will not be repeated here.

A host list according to the fourth embodiment will be described with reference to FIG. 40. As shown in FIG. 40, a host list 515 according to the fourth embodiment includes the region code 5144 in addition to the file structure shown in FIG. 19. In the region code 5144, the region code transmitted from the host apparatus is stored.

Figure 41:
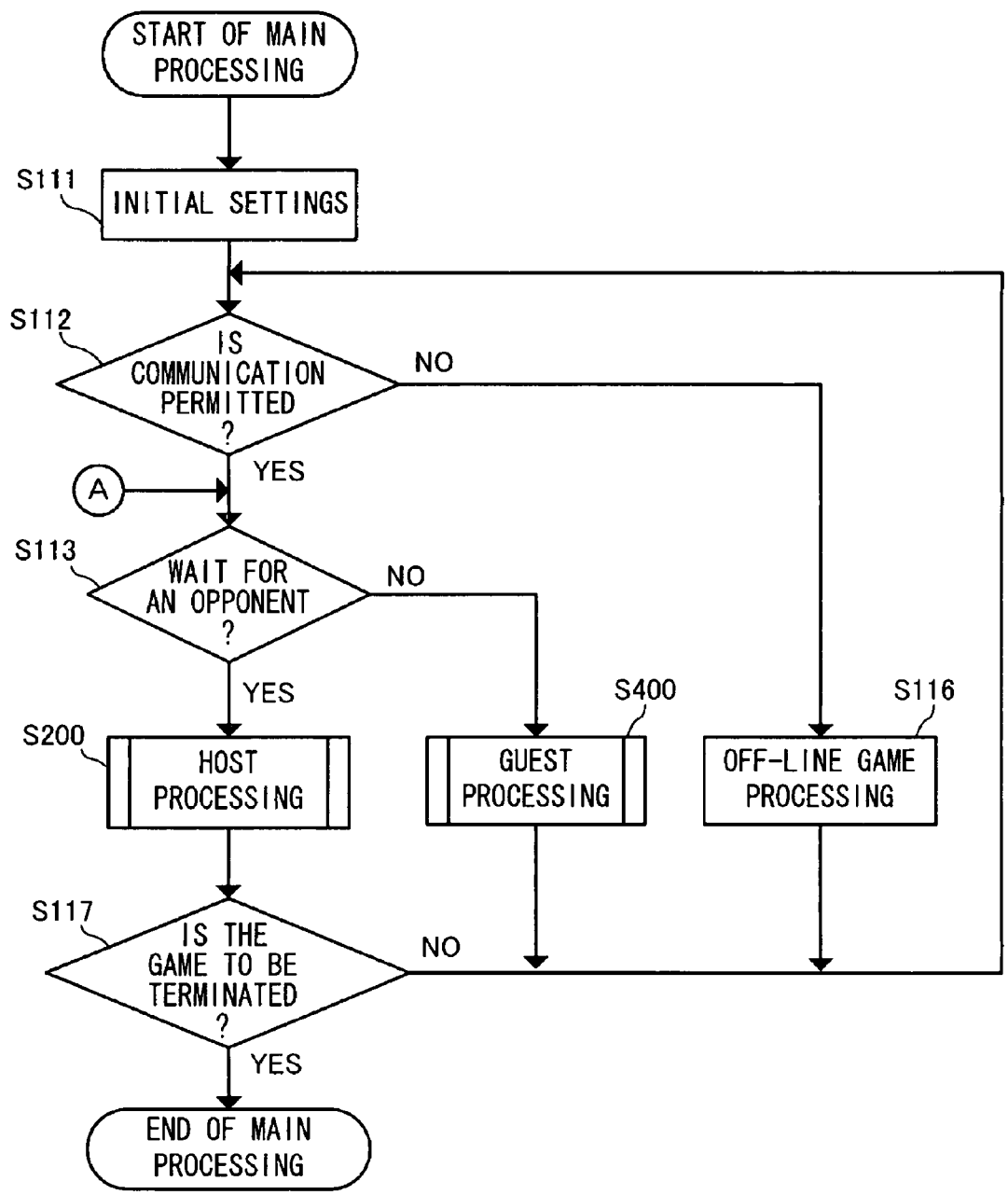
FIG. 41 is a flowchart illustrating on-line fighting game processing executed by the game apparatus 3 in the fourth embodiment.

On-line fighting game processing according to the fourth embodiment will be described in detail. FIG. 41 is a flowchart illustrating the on-line fighting game processing (main processing) executed by the game apparatus 3 according to the fourth embodiment. The processing in the fourth embodiment is substantially the same as that in the second embodiment. Hereinafter, the difference from the second embodiment (mainly, the guest processing in step S400) will be mainly described.

In the fourth embodiment, when the host apparatus transmits a host registration request to the matching server 50, the host apparatus also transmits the region code of its own. Therefore, when transmitting the host registration request to the matching server 50 in step S121 described above with reference to FIG. 29, the CPU 10 of the host apparatus reads the region code 177 from the flash memory 17 and transmits the region code 177 together with the host registration request. Except for this, the host processing is substantially the same as that in the second embodiment.

Figure 42:
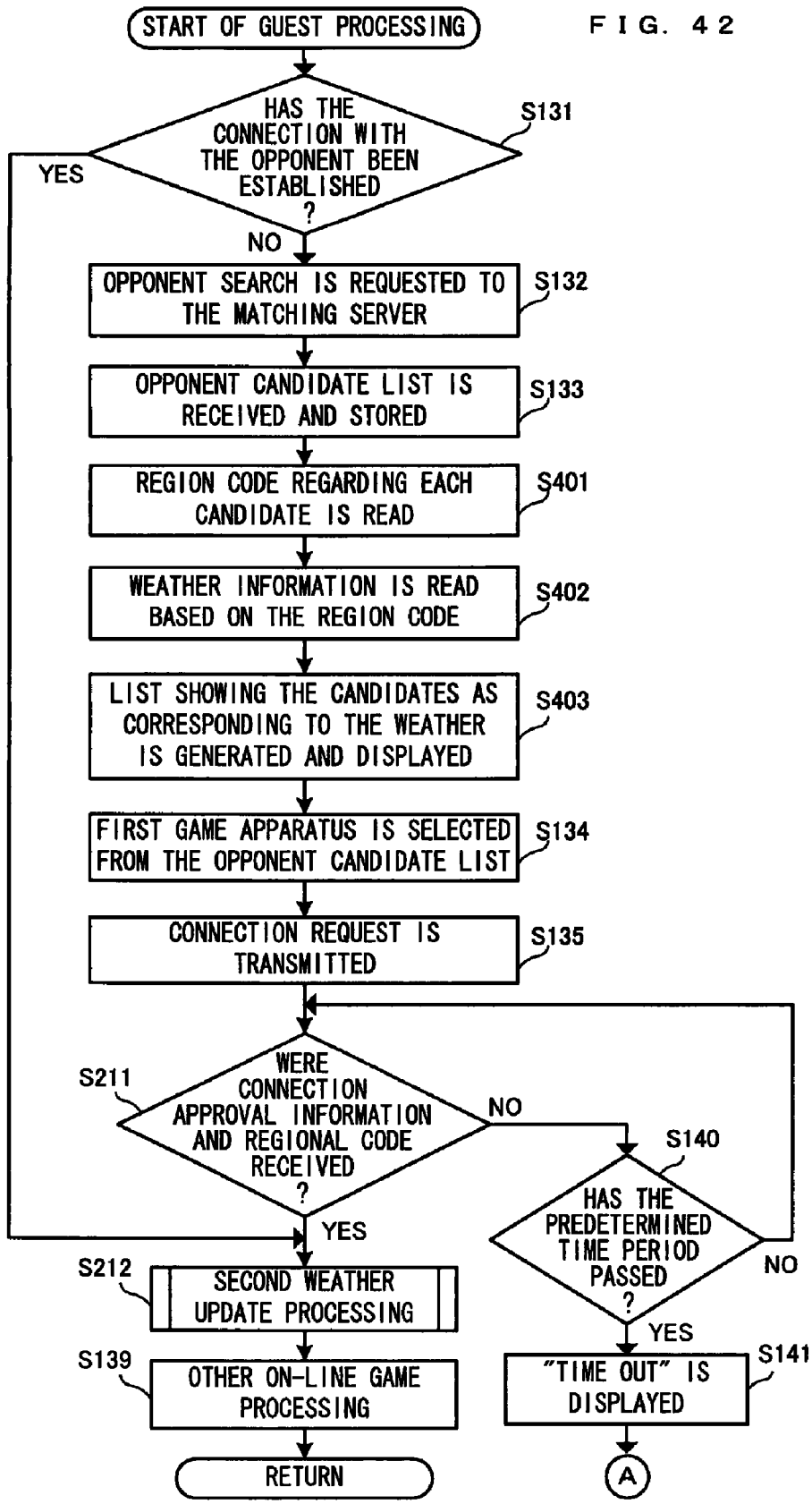
FIG. 42 is a flowchart illustrating guest processing in step S400 shown in FIG. 41 in detail.

Now, the guest processing will be described. FIG. 42 is a flowchart illustrating the guest processing (step S400) according to the fourth embodiment in detail. In FIG. 42, the processing in steps S131 through S133 and steps S134 et seq. is substantially the same as the processing in the second embodiment shown in FIG. 31 and will not be described in detail.

After the candidate list is received and stored in step S133, the CPU 10 of the guest apparatus reads the region code of each candidate from the candidate list (step S401).

Based on the region code, the CPU 10 reads the weather information 1762 from the weather information master 176 based on the comprehensive weather data 173 for each candidate (step S402).

Based on the weather information 1762 regarding each candidate and data on each candidate included in the candidate list, the CPU 10 generates the list as shown in FIG. 39 and displays the list on the screen (step S403).

The processing after step S134 is substantially the same as the processing in the second embodiment and will not be described.

As described above, in the fourth embodiment, the game apparatus can refer to the weather of the region where each opponent candidate lives when selecting an opponent. Owing to such an arrangement, for example, a player living in a region usually having no snow can intentionally select an opponent living in a region with snow in order to see snow.

In the fourth embodiment, the host apparatus transmits the region code thereof together with the connection approval information to the guest apparatus. The guest apparatus obtains the weather information based on the received region code. Alternatively, the guest apparatus may use the weather information obtained when generating the candidate list. Thus, the processing is simplified and executed faster. The list may include information on the region where each candidate lives (for example, the region name) based on the region code.

Fifth Embodiment

Figure 43:
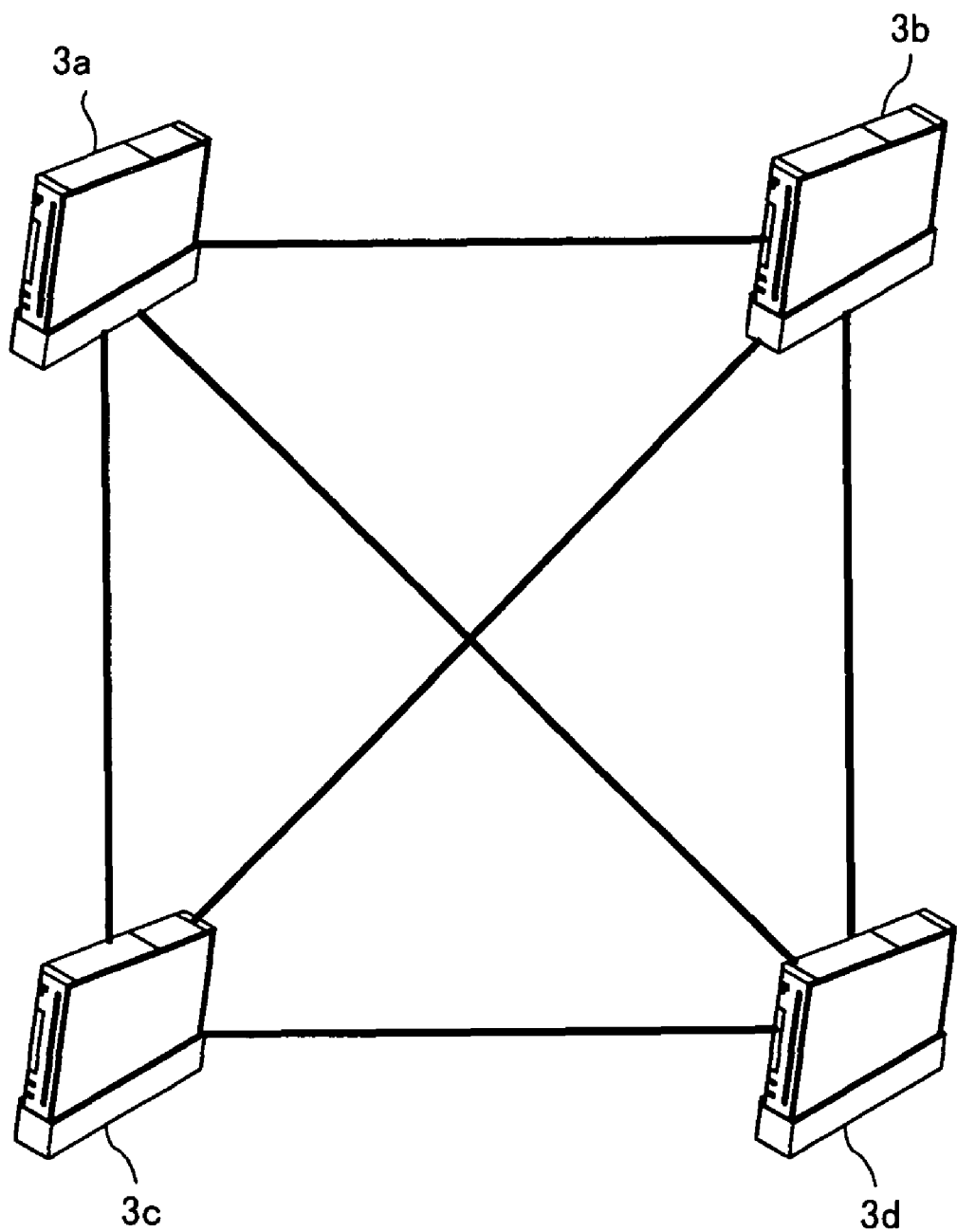
FIG. 43 shows an overview of a network connection according to a fifth embodiment of the present invention.
Figure 44:
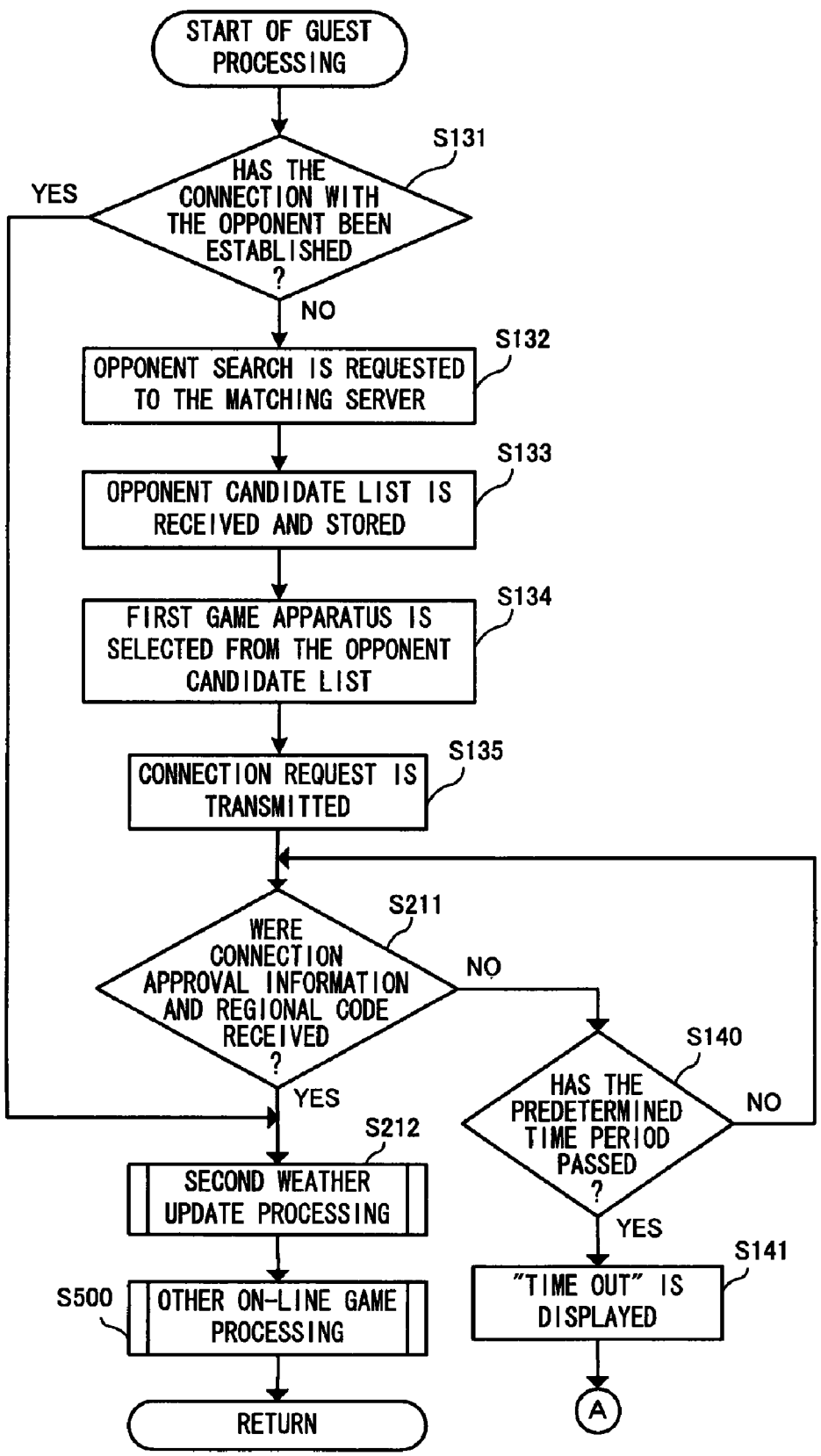
FIG. 44 is a flowchart illustrating guest processing according to the fifth embodiment.
Figure 45:
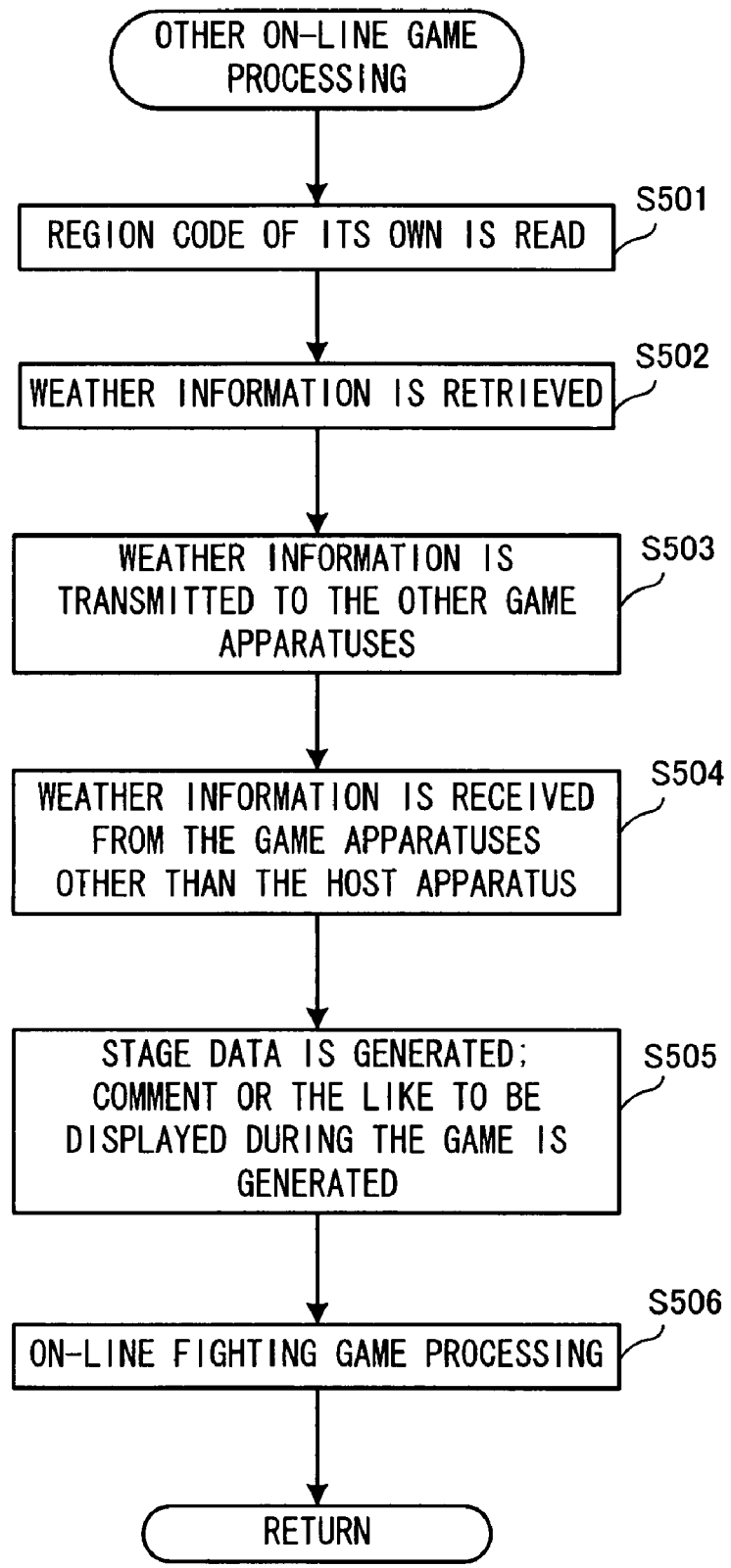
FIG. 45 is a flowchart illustrating other on-line game processing in step S500 in FIG. 44 in detail.

With reference to FIG. 43 through FIG. 45, a fifth embodiment of the present invention will be described. In the first and second embodiments, the on-line fighting game is mainly played one to one, and the weather of the region where the host apparatus is located is reflected on the game processing. In the fifth embodiment, three or more players play the on-line fighting game, for example, an on-line racing game. On the virtual space as the stage of the fight (racing course), the weather of the region of the host apparatus is reflected. In addition, the weather of the region where each guest apparatus is located is reflected on the game. For example, the weather of the region of each guest apparatus is displayed as a comment made by the player character of each guest apparatus or displayed in a signboard in the racing course.

FIG. 43 shows an overview of a network connection according to the fifth embodiment. As shown in FIG. 43, four game apparatuses 3 are connected so as to form a mesh-type network when playing an on-line fighting game. In the example shown in FIG. 43, one of the game apparatuses 3 is the host apparatus (the game apparatus 3a), and the remaining three game apparatuses are the guest apparatuses (game apparatuses 3b through 3d). These game apparatuses 3 are matched via the matching server 50. The flow of the game processing according to the fifth embodiment is substantially the same as the processing in the second embodiment before the on-line fighting is actually started except for the following points. Each time the host apparatus newly permits a connection with a guest apparatus, the host apparatus transmits the network address and other information on the newly permitted guest apparatus to the other guest apparatuses so as to construct the mesh-type network; and the game is not started until four players are ready to play, until a predetermined time period passes, or until the player of the host apparatus determines to start. The processing for constructing the mesh-type network is known to those skilled in the art and will not be described here in detail.

FIG. 44 is a flowchart illustrating guest processing according to the fifth embodiment. In FIG. 44, the processing except for step S500 is substantially the same as the processing described in second embodiment with reference to FIG. 31 and will not be described here in detail.

FIG. 45 is a flowchart illustrating the other on-line game processing in step S500 in detail. As shown in FIG. 45, the CPU 10 of each guest apparatus reads the region code 177 stored on the flash memory 17 (step S501). The CPU 10 then searches for and retrieves the weather information 1762 from the weather information master 176 based on the comprehensive weather data 173 using the region code 177 as the key (step S502). Namely, each guest apparatus searches for and retrieves the weather information 1762 of the region of its own. Next, the CPU 10 transmits the weather information 1762 to each of the other game apparatuses via the mesh-type network (step S503).

Then, the CPU 10 of each guest apparatus receives the weather information of the region where each of the other guest apparatus transmitted therefrom as a result of the processing in step S503 (step S504). Based on the received weather information 1762, the CPU 10 generates a comment or object (for example, a signboard) to be displayed in the game space (step S505). The CPU 10 also generates stage data including such a comment or object.

The CPU 10 then performs the on-line fighting game processing (step S506). During the processing, the comment or object generated in step S505 is displayed when necessary.

As described above, in the fifth embodiment, the weather information of the region where each guest apparatus is located can be reflected on the game as well as the weather information of the region where the host apparatus is located. Thus, while the race is performed in a course reflecting the weather of the region of the host apparatus, each player can recognize the weather of the region where each guest apparatus is located. This makes the on-line fighting game more amusing.

In the fifth embodiment, the weather information is transmitted to the other game apparatuses. Alternatively, data on the comment itself or the like may be transmitted instead of the weather information. Namely, each guest apparatus reads the weather information of the region of its own and generates a comment or object reflecting the weather information. Data on such a comment or object may be transmitted to the other game apparatuses as a part of the game data which is transmitted or received during the on-line fight (for example, during the race). Each game apparatus, which received the data on the comment or object, displays the comment or object on the screen when necessary.

In the case of the racing game as described above, the weather of the region of each guest apparatus may be reflected on the course in each circuit. For example, the weather of the region of the host apparatus is reflected in the first circuit of the race, the weather of the region of guest apparatus A is reflected in the second circuit of the race, and the weather of the region of guest apparatus B is reflected in the third circuit of the race. This brings a variety of changes to the game using the weather, which makes the on-line fighting game more entertaining.

In the above embodiments, the matching server 50 is used. Alternatively, it may be set such that the opponent may be retrieved and connected without using the matching server. For example, regarding an opponent against which the game apparatus played once, the network address or the like of the game apparatus 3 of that opponent is stored on the flash memory 17 as address book data referred to as a "friend list". When the game apparatus 3 wishes to play with this opponent again, the connection request is directly transmitted to the network address stored in the friend list without using the matching server. At this point, the first game apparatus 3a as the host apparatus may transmit data equivalent to the host registration request to the network addresses in the friend list stored thereon. Namely, the host apparatus may transmit data, indicating that the host apparatus is waiting for a connection request, to all the players registered in its friend list. Then, for example, the second game apparatus 3b transmits a connection request together with its own network address to the network address of the first game apparatus 3a which is waiting for a connection request, among the game apparatuses registered in the friend list. The game apparatus which received the connection request (the first game apparatus 3a) determines whether or not to permit the connection, and transmits the connection approval information. Upon receiving the connection approval information, the second game apparatus 3b establishes the connection with the first game apparatus 3a. An apparatus with which the game apparatus played different games, or an apparatus with which the game apparatus exchanged mails, may be stored in the friend list. In this case, an apparatus with which the game apparatus has never played an on-line fighting game can be selected as the opponent (with the premise that such an apparatus performs the same on-line fighting game).

While the invention has been described in detail, the foregoing description is in all aspects illustrative and not restrictive. It is understood that numerous other modifications and variations can be devised without departing from the scope of the invention.

What is claimed is:

1. A network game system, comprising:
   a plurality of game apparatuses communicable to each other; and
   a distribution server connected to at least a first game apparatus which is one of the plurality of game apparatuses via a communication network, the distribution server distributing region-by-region meteorological data; wherein:
   the distribution server comprises a processor and a non-transitory storage device storing a program executed by the processor for the distribution server, which causes the distribution server to distribute meteorological data to at least the first game apparatus;
   the first game apparatus comprising a processor and a non-transitory storage device storing a program executed by the processor for the first game apparatus which causes the first game apparatus to performs steps comprising:
      setting region data in the non-transitory storage device for the first game apparatus;
      obtaining, from the distribution server, meteorological data corresponding to the region data set in the non-transitory storage device for the first game apparatus;
      transmitting the meteorological data to a second game apparatus, which is different from the first game apparatus, among the plurality of game apparatuses; and
      executing an on-line game with the second game apparatus using the meteorological data; and
   the second game apparatus comprising a processor and a non-transitory storage device storing a program executed by the processor for the first game apparatus, which causes the second game apparatus to performs steps comprising:
      receiving the meteorological data transmitted from the first game apparatus; and
      executing the on-line game with the first game apparatus using the meteorological data.

2. A network game system according to claim 1, wherein:
   the program executed by the processor for the second game apparatus further causes the second game apparatus to perform:
      presenting meteorological information to a player of the second game apparatus, wherein the presented meteorological information uses the meteorological data received from the first game apparatus and selecting whether or not to execute the on-line game with the first game apparatus based on an operation performed by the player; and
      connecting the second game apparatus to the first game apparatus, if the selection is made to execute the on-line game with the first game apparatus;
      communicating with the first game apparatus connected to the second game apparatus to execute the on-line game;
   the program executed by processor for the first game apparatus further causes the first game apparatus to:

establish a communication connected between the first game apparatus and the second game apparatus selected to execute the on-line game with the first game apparatus; and communicating with the second game apparatus connected to the first game apparatus to execute the on-line game.

3. A network game system according to claim 1, wherein:

the program executed by the processor of the first game apparatus further causes the game apparatus to transmit the region data set for the first game apparatus to the second game apparatus;

the program executed by the processor for the second game apparatus further causes the second game apparatus to:

receive the region data transmitted by the first game apparatus;

present region information to a player of the second game apparatus using the region data received from the first game apparatus and select whether or not to execute the on-line game with the first game apparatus based on an operation performed by the player; and if the selection is to execute the on-line game with the first game apparatus, connects the second game apparatus to the first game apparatus;

communicate with the first game apparatus connected to the second game apparatus to execute the on-line game;

the program executed by the processor of the first game apparatus further causes the first game apparatus to:

connect the first game apparatus to the second game apparatus which has selected to execute the on-line game with the first game apparatus; and communicate with the second game apparatus connected to the first game apparatus to execute the on-line game.

4. A network game system according to claim 1, wherein:

the distribution server distributes meteorological data to each or the plurality of game apparatuses;

the program executed by the process of the second game apparatus further causes the second game apparatus to:

set region data corresponding to the second game apparatus; and obtain, from the distribution server, meteorological data corresponding to the region data set for the second game apparatus;

the program executed by the processor for the first game apparatus further causes the first game apparatus to transmit the region data to the second game apparatus;

the processor executed by the second game apparatus further causes the second game apparatus to:

receive the region data from the first game apparatus;

obtain, from the distribution server, meteorological data corresponding to the region data received from the first game apparatus;

present meteorological information to a player of the second game apparatus using the meteorological data obtained from the distribution server and select whether or not to execute the on-line game with the first game apparatus based on an operation performed by the player; and if the selection is to execute the on-line game with the first game apparatus, connect the second game apparatus to the first game apparatus;

communicate with the first game apparatus connected to the second game apparatus to execute the on-line game;

the program executed by the processor for the first game apparatus further causes the first game apparatus to:

connect the first game apparatus to the second game apparatus which has selected to execute the on-line game with the first game apparatus; and communicate with the second game apparatus connected to the first game apparatus to execute the on-line game.

5. A network game system according to claim 1, further comprising a matching server including a processor and a non-transitory storage medium storing a program executed by the processor which causes the matching server to match at least two of the plurality of game apparatuses, wherein the matching server matches the first game apparatus and the second game apparatus to each other as connection targets based on a predetermined condition.

6. A network game system according to claim 1, wherein:

the program executed by the processor for the first game apparatus further causes the first game apparatus to:

receive a connection request signal from the second game apparatus; and transmit a connection permission signal in response to the connection request signal to the second game apparatus; and the program executed by the second game apparatus further causes the second game apparatus to:

store a network address of the first game apparatus;

transmit the connection request signal to the network address of the first game apparatus; and receive from the first game apparatus, the connection permission signal in response to the connection request signal.

7. A network game system according to claim 1, wherein the meteorological data is data on weather.

8. A network game system according to claim 1, wherein the meteorological data is data on temperature.

9. A network game system according to claim 1, wherein the meteorological data is obtained by executing an application program which is different from a game program executed by the processor for the first or second game apparatus.

10. A network game system according to claim 9, wherein the region data is changeable only by executing the application program.

11. A network game system according to claim 10, wherein:

the region data includes data by a first classification and data by a second classification;

the data by the first classification represents a country in which a corresponding game apparatus is located;

the data by the second classification represents a region in the country in which the corresponding game apparatus is located; and the dedicated application program is capable of changing only the data by the second classification.

12. A network game system, comprising:

a plurality of game apparatuses communicable to each other; and a distribution server connected to the plurality of game apparatuses via a communication network, the distribution server distributes region-by-region meteorological data; wherein:

the distribution server distributes meteorological data to each of the plurality of game apparatuses;

each of the plurality of game apparatuses includes a processor and a non-transitory storage device wherein a program stored on the storage device causes each of the game apparatuses to:
 set region data which is stored on the storage device; and
 obtain from the distribution server, meteorological data corresponding to the region data stored on the storage device;
among the plurality of game apparatuses, a first game apparatus and a second game apparatus execute an on-line game;
the program executed by the processor of the first game apparatus causes the first game apparatus to:
 transmit the region data to the second game apparatus; and
 communicate with the second game apparatus to execute the on-line game with the second game apparatus using the meteorological data obtained by the first game apparatus; and
the program executed by the processor for the second game apparatus causes the second game apparatus to:
 receive the region data from the first game apparatus;
 obtain from the distribution server, meteorological data corresponding to the region data received from the first game apparatus; and
 communicate with the first game apparatus to execute the on-line game with the first game apparatus using the meteorological data obtained from the distribution server.

13. A network game system according to claim 12, further comprising a matching server for matching at least two of the plurality of game apparatuses;
 wherein the matching server includes a non-transitory storage device and a processor, wherein a program stored on the storage device is executed by the processor to cause the matching server to match the first game apparatus and the second game apparatus to each other as connection targets based on a predetermined condition.

14. A network game system according to claim 12, wherein:
 the program executed by the processor for the first game apparatus further causes the first game apparatus to:
  receive a connection request signal from the second game apparatus; and
  transmit a connection permission signal in response to the connection request signal to the second game apparatus; and
 the program executed by the processor for the second game apparatus further causes the second game apparatus to:
  store a network address of the first game apparatus;
  transmit the connection request signal to the network address of the first game apparatus; and
  receive from the first game apparatus, the connection permission signal in response to the connection request signal.

15. A network game system according to claim 12, wherein:
 the program executed by the processor for the first game apparatus further causes the first game apparatus to:
  transmit connection request waiting information to a predetermined server or the second game apparatus, the connection request waiting information representing a state of waiting for a connection request from other game apparatuses; and
 the program executed by the processor for the second game apparatus further causes the second game apparatus to:
  obtain connection request waiting information regarding at least one of the plurality of game apparatuses;
  display in a list on a screen, information on the at least one game apparatus represented by the obtained connection request waiting information; and
  receive selection information inputted by a player of as a desired game apparatus as the first game apparatus based on the displayed information on the at least one displayed game apparatus.

16. A network game system according to claim 15, wherein:
 the program executed by the processor for the second game apparatus further causes the second game apparatus to:
  transmit the region data as a part of the connection request waiting information;
  obtain the meteorological data corresponding to the region data included in the obtained connection request waiting information; and
  display on the screen, the obtained meteorological data as corresponding to the information on the game apparatus represented by the connection request waiting information.

17. A network game system according to claim 12, wherein the meteorological data is data on weather.

18. A network game system according to claim 12, wherein the meteorological data is data on temperature.

19. A network game system according to claim 12, wherein the program causes the first and the second game apparatuses to obtain the meteorological data is an application program which is different from a game program executed by processor in each of the first game apparatus and second game apparatus.

20. A network game system according to claim 19, wherein the region data is changeable only by executing the application program.

21. A network game system according to claim 20, wherein:
 the region data includes data by a first classification and data by a second classification;
 the data by the first classification represents a country in which a corresponding game apparatus is located;
 the data by the second classification represents a region in the country in which the corresponding game apparatus is located; and
 the dedicated application program changes only the data by the second classification.

22. A network game system according to claim 12, wherein:
 the program executed by the processor of the second game apparatus further causes the second game apparatus to:
  store at least one piece of the region data in the non-transitory storage device;
  present game data based on the region data stored on the non-transitory storage device such that game data is selectable by a player; and
  select predetermined game data based on a selection operation by the player from the displayed game data; and
  execute game processing using the selected game data.

23. A network game system according to claim 12, wherein:
 the program executed by the second game apparatus further causes the second game apparatus to:
  obtain from the distribution server, the meteorological data corresponding to region data set for the second game apparatus; and the on-line game uses the meteorological data corresponding to the region data set for the first game apparatus and the meteorological data corresponding to the region data set for the second game apparatus to generate a virtual game space 24. A network game system, comprising:

a plurality of game apparatuses communicating with each other; and a distribution server connected to the plurality of game apparatuses via a communication network, the distribution server distributing region-by-region meteorological data; wherein:

the distribution server comprises a processor and a non-transitory storage device having a program executable by the processor to cause the distribution server to distribute meteorological data to each of the plurality of game apparatuses;

each of the plurality of game apparatuses comprises a processor and a non-transitory storage device, wherein a program stored by the non-transitory storage device causes the game apparatus to:

set region data corresponding to the game apparatus; and obtain, from the distribution server, meteorological data corresponding to the region data set for the game apparatus;

among the plurality of game apparatuses, a first game apparatus and a second game apparatus execute an on-line game stored on their respective non-transitory storage devices;

the program stored on the non-transitory storage device for the first game apparatus causes the first gape apparatus to:

transmit the region data to the second game apparatus; and communicate with the second game apparatus to execute the on-line game with the second game apparatus; and the program stored on the non-transitory storage device for the second game apparatus causes the second game apparatus to:

communicate with the first game apparatus to execute the on-line game with the first game apparatus;

receive the region data from the first game apparatus;

store the region data received from the first game apparatus in the non-transitory storage device for the second game apparatus;

obtain, from the distribution server, the meteorological data corresponding to the region data received from the first game apparatus and stored on the non-transitory storage device for the second game apparatus; and execute a game using the meteorological data obtained from the distribution server.

25. A network game system according to claim 24, further comprising a matching server in communication with the plurality of game apparatuses via the computer network, and having a processor and a non-transitory storage device storing a program causing the matching server to match at least two of the plurality of game apparatuses; wherein the matching server matches the first game apparatus and the second game apparatus to each other as connection targets based on a predetermined condition.

26. A network game system according to claim 24, wherein:

the program stored on the non-transitory storage device for the first game apparatus causes the first game apparatus to further :

receive a connection request signal from the second game apparatus; and transmit a connection permission signal in response to the connection request signal to the second game apparatus; and the program stored on the non-transitory storage device for the second game apparatus causes the second game apparatus to further:

store a network address of the first game apparatus;

transmit the connection request signal to the network address of the first game apparatus; and receive, from the first game apparatus, the connection permission signal in response to the connection request signal.

27. A network game system according to claim 24, wherein the meteorological data is data on weather.

28. A network game system according to claim 24, wherein the meteorological data is data on temperature.

29. A network game system including a data communications network comprising:

a plurality of game apparatuses connectable to the network, wherein the plurality of game apparatuses include a first game apparatus and a second game apparatus;

a distribution server connectable to the network and in communication with at least the first computer game apparatus to distribute regional meteorological data for a geographic region associated with the first computer game apparatus;

the first game apparatus comprises a processor for executing at least one executable program stored on non-transitory memory in the first game apparatus, wherein the at least one executable program causes the first game apparatus to perform:

storing in the non-transitory computer media information regarding a region data identifying a geographic region corresponding to the first game apparatus;

storing in the non-transitory computer media regional meteorological data downloaded from the distribution server, wherein the regional meteorological data indicates a meteorological condition of the geographic region identified by the region data stored in the non-transitory computer media of the first game apparatus;

transmitting the stored meteorological data to the second game apparatus, and executing an on-line game to be played in conjunction with an on-line game executed by the second game apparatus, wherein the meteorological data is used to generate a virtual game world for the on-line game, and the second game apparatus comprises a processor for executing at least one executable program stored on non-transitory memory in the first game apparatus, wherein the at least one executable program causes the second game apparatus to perform:

receiving the stored meteorological data transmitted from the first game apparatus, and executing the on-line game with the first game apparatus using the meteorological data received first game apparatus.

* * * * *